(12) United States Patent
Villagra et al.

(10) Patent No.: US 12,485,174 B2
(45) Date of Patent: Dec. 2, 2025

(54) HDAC6-ACTIVATED MACROPHAGES, COMPOSITIONS, AND USES THEREOF

(71) Applicants: The George Washington University, A Congressionally Chartered Not-for-Profit Corporation, Washington, DC (US); MEDSTAR HEALTH, INC., Columbia, MD (US)

(72) Inventors: Alejandro Villagra, Falls Church, VA (US); Nima Aghdam, Alexandria, VA (US); Satish Noonepalle, Falls Church, VA (US)

(73) Assignees: THE GEORGE WASHINGTON UNIVERSITY, A CONGRESSIONALLY CHARTERED NOT-FOR-PROFIT CORPORATION, Washington, DC (US); MEDSTAR HEALTH, INC., Columbia, MD (US)

( * ) Notice: Subject to any disclaimer, the term of this patent is extended or adjusted under 35 U.S.C. 154(b) by 950 days.

(21) Appl. No.: 17/623,050

(22) PCT Filed: Jun. 26, 2020

(86) PCT No.: PCT/US2020/040003
§ 371 (c)(1),
(2) Date: Dec. 27, 2021

(87) PCT Pub. No.: WO2020/264437
PCT Pub. Date: Dec. 30, 2020

(65) Prior Publication Data
US 2022/0401474 A1   Dec. 22, 2022

Related U.S. Application Data

(60) Provisional application No. 62/867,390, filed on Jun. 27, 2019.

(51) Int. Cl.
| | | |
|---|---|---|
| *A61K 45/06* | (2006.01) | |
| *A61K 40/17* | (2025.01) | |
| *A61K 40/24* | (2025.01) | |
| *A61K 40/42* | (2025.01) | |
| *A61P 35/04* | (2006.01) | |
| *C12N 5/0786* | (2010.01) | |

(52) U.S. Cl.
CPC .............. *A61K 45/06* (2013.01); *A61K 40/17* (2025.01); *A61K 40/24* (2025.01); *A61K 40/42* (2025.01); *A61P 35/04* (2018.01); *C12N 5/0645* (2013.01); *A61K 2239/57* (2023.05)

(58) Field of Classification Search
CPC ........ A61K 40/42; A61K 40/24; A61K 40/17; C12N 5/0645
See application file for complete search history.

(56) References Cited

U.S. PATENT DOCUMENTS

| | | |
|---|---|---|
| 5,770,581 A | 6/1998 | Weichselbaum et al. |
| 6,207,156 B1 | 3/2001 | Kuchroo et al. |
| 6,808,710 B1 | 10/2004 | Wood et al. |
| 6,984,720 B1 | 1/2006 | Korman et al. |
| 7,595,048 B2 | 9/2009 | Honjo et al. |
| 8,008,449 B2 | 8/2011 | Korman et al. |
| 8,114,845 B2 | 2/2012 | Langermann et al. |
| 8,217,149 B2 | 7/2012 | Irving et al. |
| 8,522,156 B2 | 8/2013 | Kumagai et al. |
| 8,728,474 B2 | 5/2014 | Honjo et al. |
| 8,779,105 B2 | 7/2014 | Korman et al. |
| 8,900,587 B2 | 12/2014 | Carven et al. |
| 8,907,053 B2 | 12/2014 | Sasikumar et al. |
| 8,952,136 B2 | 2/2015 | Carven et al. |
| 9,073,994 B2 | 7/2015 | Honjo et al. |
| 9,084,776 B2 | 7/2015 | Korman et al. |
| 2011/0123591 A1 | 5/2011 | Knezevich et al. |
| 2011/0150892 A1 | 6/2011 | Thudium et al. |
| 2013/0022623 A1 | 1/2013 | Karsunky et al. |
| 2013/0071403 A1 | 3/2013 | Rolland et al. |
| 2013/0309250 A1 | 11/2013 | Cogswell et al. |
| 2014/0093511 A1 | 4/2014 | Lonberg et al. |
| 2014/0286935 A1 | 9/2014 | Hamblin et al. |
| 2014/0341917 A1 | 11/2014 | Nastri et al. |

(Continued)

FOREIGN PATENT DOCUMENTS

| | | |
|---|---|---|
| CN | 102596223 A | 7/2012 |
| JP | 2017014234 A | 1/2017 |

(Continued)

OTHER PUBLICATIONS

Noonepalle, S.K.R., et al., "Abstract 900: Reprogramming macrophages with HDAC6 inhibitors for anti-cancer macrophage-based cell therapy," Cancer Research 83(Suppl 7):900, American Association for Cancer Research, United States (Apr. 2023).

Knox, T., et al., "Selective HDAC6 Inhibitors Improve Anti-PD-I Immune Checkpoint Blockade Therapy by Decreasing the Anti-Inflammatory Phenotype of Macrophages and Down-Regulation of Immunosuppressive Proteins in Tumor Cells," Scientific Reports 9(1):6136, Springer Nature, Germany (Apr. 2019).

Anderson, A.C., "Tim-3: an Emerging Target in the Cancer Immunotherapy Landscape," Cancer Immunology Research 2(5):393-398, American Association for Cancer Research, United States (2014).

Bergman, J.A., et al., "Selective Histone Deacetylase 6 Inhibitors Bearing Substituted Urea Linkers Inhibit Melanoma Cell Growth," Journal of Medicinal Chemistry 55(22):9891-9899, American Chemical Society, United States (Nov. 2012).

Huang, C., et al., "Role of LAG-3 in regulatory T cells," Immunity, 21(4):503-13 (Oct. 2004).

(Continued)

*Primary Examiner* — Alicia L Otton
(74) *Attorney, Agent, or Firm* — Sterne, Kessler, Goldstein & Fox P.L.L.C.; Michael Gross, III

(57) ABSTRACT

The present disclosure provides histone deacetylase 6 (HDAC6)-activated macrophages, compositions comprising HDAC6-activated macrophages, methods of making HDAC6-activated macrophages, and methods of treating diseases, e.g., cancer, by administering a therapeutically effective amount of HDAC6-activated macrophages.

10 Claims, 36 Drawing Sheets

Specification includes a Sequence Listing.

(56) References Cited

U.S. PATENT DOCUMENTS

| | | |
|---|---|---|
| 2015/0023937 A1 | 1/2015 | Vera Valdes et al. |
| 2015/0225457 A1 | 8/2015 | Blumberg et al. |
| 2015/0239869 A1 | 8/2015 | Mazitschek et al. |
| 2015/0250853 A1 | 9/2015 | Mak |
| 2015/0259420 A1 | 9/2015 | Triebel et al. |
| 2016/0221973 A1 | 8/2016 | Zheng et al. |
| 2016/0221997 A1 | 8/2016 | Zheng et al. |
| 2016/0222022 A1 | 8/2016 | Zheng et al. |
| 2017/0056402 A1 | 3/2017 | Sotomayor et al. |
| 2019/0093075 A1 | 3/2019 | Ratajczak et al. |

FOREIGN PATENT DOCUMENTS

| | | | | |
|---|---|---|---|---|
| WO | WO-2014011813 A1 | 1/2014 | | |
| WO | WO-2014072714 A1 | 5/2014 | | |
| WO | WO-2014178606 A1 | 11/2014 | | |
| WO | WO-2014181137 A1 | 11/2014 | | |
| WO | WO-2015036499 A1 | 3/2015 | | |
| WO | WO-2015054474 A1 | 4/2015 | | |
| WO | WO-2015087151 A1 | 6/2015 | | |
| WO | WO-2015102426 A1 | 7/2015 | | |
| WO | WO-2015137750 A1 | 9/2015 | | |
| WO | WO-2016031815 A1 | 3/2016 | | |
| WO | WO-2016067038 A1 | 5/2016 | | |
| WO | WO-2016067040 A1 | 5/2016 | | |
| WO | WO-2016168598 A1 | 10/2016 | | |
| WO | WO-2016168660 A1 | 10/2016 | | |
| WO | WO-2016190630 A1 | 12/2016 | | |
| WO | WO-2017014170 A1 | 1/2017 | | |
| WO | WO-2017014321 A1 | 1/2017 | | |
| WO | WO-2017018803 A1 | 2/2017 | | |
| WO | WO-2017018805 A1 | 2/2017 | | |
| WO | WO-2017023133 A2 | 2/2017 | | |
| WO | WO-2017033946 A1 | 3/2017 | | |
| WO | WO 2017/068164 | * | 4/2017 | ............... C07K 6/28 |
| WO | WO-2017065473 A1 | 4/2017 | | |
| WO | WO-2017075192 A1 | 5/2017 | | |
| WO | WO-2017208032 A1 | 12/2017 | | |
| WO | WO-2017218950 A1 | 12/2017 | | |
| WO | WO-2017222950 A1 | 12/2017 | | |
| WO | WO-2017222951 A1 | 12/2017 | | |
| WO | WO-2017222952 A1 | 12/2017 | | |
| WO | WO-2018089651 A1 | 5/2018 | | |
| WO | WO-2018130155 A1 | 7/2018 | | |
| WO | WO-2018183447 A1 | 10/2018 | | |
| WO | WO-2018183701 A1 | 10/2018 | | |
| WO | WO-2018189340 A1 | 10/2018 | | |
| WO | WO-2019027054 A1 | 2/2019 | | |
| WO | WO-2019110663 A1 | 6/2019 | | |
| WO | WO-2019126538 A1 | 6/2019 | | |
| WO | WO-2019139921 A1 | 7/2019 | | |
| WO | WO-2019166824 A1 | 9/2019 | | |
| WO | WO-2020264437 A1 | 12/2020 | | |

OTHER PUBLICATIONS

Huang, P., et al., "Selective HDAC Inhibition by ACY-241 Enhances the Activity of Paclitaxel in Solid Tumor Models," Oncotarget 8(2):2694-2707, Impact Journals, United States (Jan. 2017).

International Search Report and Written Opinion for Application No. PCT/US2020/040003, European Patent Office, Virginia, mailed on Sep. 24, 2020, 9 pages.

Jochems, J., et al., "Antidepressant-Like Properties of Novel HDAC6-selective Inhibitors With Improved Brain Bioavailability," Neuropsychopharmacology 39(2):389-400, Nature Publishing Group, England (Jan. 2014).

Knox, T., et al., "Author Correction: Selective HDAC6 Inhibitors Improve Anti-PD-1 Immune Checkpoint Blockade Therapy by Decreasing the Anti-Inflammatory Phenotype of Macrophages and Down-Regulation of Immunosuppressive Proteins in Tumor Cells," Scientific Reports 9(1):14824, Nature Publishing Group, England (Oct. 2019).

Laino, A.S., et al., "HDAC6 Selective Inhibition of Melanoma Patient T-cells Augments Anti-tumor Characteristics," Journal for Immuno Therapy of Cancer, 7(1):33, BMJ Publishing Group Ltd., United Kingdom, (Feb. 2019).

Lee, S., et al., "Macrophage-Based Cell Therapies: The Long and Winding Road," Journal of Controlled Release: Official Journal of the Controlled Release Society 240:527-540, Elsevier Science Publishers, Netherlands (Oct. 2016).

Lob, S., et al., "IDO1 and IDO2 are Expressed in Human Tumors: Levo- but Not Dextro-1-methyl Tryptophan Inhibits Tryptophan Catabolism" Cancer Immunology, Immunotherapy 58(1):153-157, Springer Verlag, Germany (Jan. 2009).

Maeda, H., et al., "Tumor Vascular Permeability and the EPR Effect in Macromolecular Therapeutics: a Review," Journal of Controlled Release 65(1-2):271-284, Elsevier Science Publishers, Netherlands (Mar. 2000).

Mills, C.D., et al., "A Breakthrough: Macrophage-Directed Cancer Immunotherapy," Cancer Research 76(3):513-516, American Association for Cancer Research, United States (Feb. 2016).

Moroni, F., et al., "Safety Profile of Autologous Macrophage Therapy for Liver Cirrhosis," Nature Medicine 25(10):1560-1565, Nature Publishing Company, United States (Oct. 2019).

Naidoo, J., et al., "Immune Modulation for Cancer Therapy," British Journal of Cancer 111(12):2214-2219, Nature Publishing Group on behalf of Cancer Research UK, England (Dec. 2014).

Ngiow, S.F., et al., "Anti-TIM3 Antibody Promotes T Cell IFN-γ-mediated Antitumor Immunity and Suppresses Established Tumors," Cancer Research 71(10):3540-3451, American Association for Cancer Research, United States (2011).

Pardoll, D.M., "The Blockade of Immune Checkpoints in Cancer Immunotherapy," Nature Reviews Cancer 12(4):252-264, Nature Publishing Group, England (Mar. 2012).

Qian, F., et al., "Efficacy of Levo-1-methyl Tryptophan and Dextro-1-methyl Tryptophan in Reversing Indoleamine-2,3-dioxygenase-mediated Arrest of T-cell Proliferation in Human Epithelial Ovarian Cancer," Cancer Research 69(13):5498-5504, American Association for Cancer Research, United States (Jul. 2009).

Rubio, C., et al., "Macrophage Polarization as a Novel Weapon in Conditioning Tumor Microenvironment for Bladder Cancer: Can We Turn Demons Into Gods?," Clinical & translational oncology 21(4):391-403, Springer Italia, Italy (Apr. 2019).

Santo, L., et al., "Preclinical Activity, Pharmacodynamic, and Pharmacokinetic Properties of a Selective HDAC6 Inhibitor, ACY-1215, in Combination With Bortezomib in Multiple Myeloma," Blood 119(11):2579-2589, Elsevier, United States (Mar. 2012).

Shen, S. and Kozikowski, A.P., "A Patent Review of Histone Deacetylase 6 Inhibitors in Neurodegenerative Diseases (2014-2019)," Expert Opinion on Therapeutic Patents 30(2):121-136, Informa Healthcare, England (Feb. 2020).

Shen, S., et al., "Discovery of a New Isoxazole-3-hydroxamate-Based Histone Deacetylase 6 Inhibitor SS-208 with Antitumor Activity in Syngeneic Melanoma Mouse Models," Journal of Medicinal Chemistry 62(18):8557-8577, American Chemical Society, United States (Sep. 2019).

Unanue, E.R.,, "Perspectives on Anti-CD47 Antibody Treatment for Experimental Cancer," Proceedings of the National Academy of Sciences of the United States of America 110(27):10886-10887, National Academy of Sciences, United States (Jul. 2013).

Vishwakarma, S., et at., "Tubastatin, a Selective Histone Deacetylase 6 Inhibitor Shows Anti-inflammatory and Anti-rheumatic Effects," International Immunopharmacology, 16(1):72-8, Elsevier Science, Netherlands (May 2013).

Deng, Z., et al., "Development of a Cell-Based High-Throughput Screening Assay to Identify Porcine Host Defense Peptide-Inducing Compounds," J Immunol Res 2018:5492941, Hindawi, United Kingdom (Nov. 2018).

Dersh, D., et al., "A SIINFEKL-Based System to Measure MHC Class I Antigen Presentation Efficiency and Kinetics," Methods Mol Biol 1988:109-122, Springer Nature, Germany (May 2019).

Lohman, R.J., et al., "Differential Anti-inflammatory Activity of HDAC Inhibitors in Human Macrophages and Rat Arthritis," J Pharmacol Exp Ther 356(2):387-396, American Society for Pharmacology and Experimental Therapeutics, United States (Feb. 2016).

(56) References Cited

OTHER PUBLICATIONS

Supplementary European Search Report for EP Application No. EP 20 83 2149, Munich, Germany, mailed on Jul. 10, 2023, 15 pages.

Zhang, W.B., et al., "Inhibition of HDAC6 attenuates LPS-induced inflammation in macrophages by regulating oxidative stress and suppressing the TLR4-MAPK/NF-KB pathways," Biomed Pharmacother 117:109166, Elsevier, Netherlands (Sep. 2019).

Ngiow, S.F., et al., "Prospects for TIM3-Targeted Antitumor Immunotherapy," Cancer Research 71(21):6567-6571, American Association for Cancer Research, United States (Nov. 2011).

* cited by examiner

|  | IC$_{50}$ (nM) HDAC1 | IC$_{50}$ (nM) HDAC6 | Fold HDAC1/6 |
|---|---|---|---|
| Nexturastat A | 3020 | 5.02 | 602 |
| ACY241 | 35 | 2.6 | 13 |
| ACY1215 | 58 | 4.7 | 12 |
| ACY738 | 94 | 1.7 | 55 |

FIG. 31

HDAC6-ACTIVATED MACROPHAGES, COMPOSITIONS, AND USES THEREOF

TECHNICAL FIELD

This disclosure provides histone deacetylase 6 (HDAC6)-activated macrophages, compositions comprising HDAC6-activated macrophages, methods of making HDAC6-activated macrophages, and methods of treating diseases, e.g., cancer, by administering a therapeutically effective amount of HDAC6-activated macrophages or a pharmaceutical composition comprising HDAC6-activated macrophages.

BACKGROUND OF THE INVENTION

Macrophages play an important role in host innate and adaptive immune responses. They help maintain tissue homeostasis, repair, and fight infections. Macrophages exhibit functional heterogeneity based on their phenotype. They are classified into "M1" or "classically activated" and "M2" or "alternatively activated" macrophages. M2 macrophages secrete anti-inflammatory cytokines such as TGFβ and IL-10, which are generally associated with tumors and function by promoting tumor growth, angiogenesis, tumor invasion, and migration. On the contrary, M1 macrophages secrete pro-inflammatory cytokines such as IL-12 and TNFα and have an anti-tumor function. M1 macrophages also actively scan the tumor microenvironment (TME) for tumor-associated antigens (TAA) and present them to CD8 T-cells to elicit anti-tumor immunity. Thus, the ratio of M1/M2 macrophages in the TME plays a critical role in the TME.

There exists a need for therapeutic strategies that decrease M2 macrophages or increase M1 macrophages in the TME in order to increase anti-tumor immunity.

SUMMARY OF THE INVENTION

Applicant has unexpectedly discovered that isolated macrophages are reprogrammed outside the body (ex vivo) and polarized towards the anti-tumor M1 phenotype by treatment with a selective HDAC6 inhibitor. These HDAC6-activated macrophages can be administered to a subject to treat cancer and other diseases.

In one aspect, the present disclosure provides HDAC6-activated macrophages.

In another aspect, the present disclosure provides a composition comprising HDAC6-activated macrophages.

In another aspect, the present disclosure provides a method of making HDAC6-activated macrophages, the method comprising isolating naïve macrophages from a subject and treating the isolated naïve macrophages ex vivo with a selective HDAC6 inhibitor.

In another aspect, the present disclosure provides a method of treating a subject in need thereof comprising administering to the subject a therapeutically effective amount of HDAC6-activated macrophages or a composition comprising HDAC6-activated macrophages, wherein the subject has cancer, pulmonary fibrosis, liver fibrosis, or heart fibrosis.

BRIEF DESCRIPTION OF THE DRAWINGS

FIG. 31 is a table showing the HDAC1 and HDAC6 activity of NextA, ACY241, ACY1215, and ACY738.

DETAILED DESCRIPTION OF THE INVENTION

I. Compositions of the Disclosure

Figure 1:
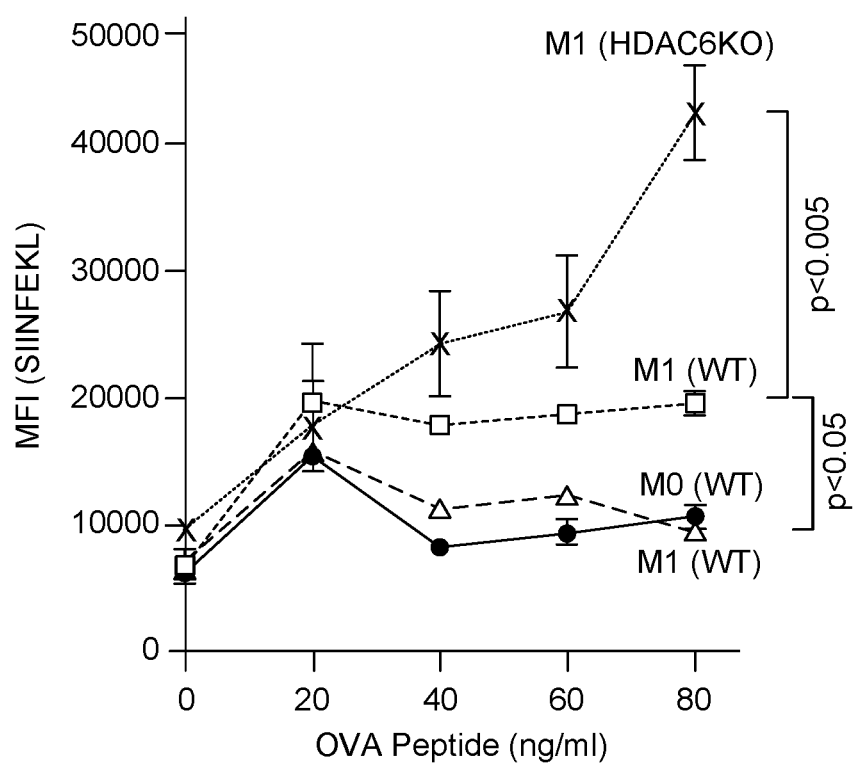
FIG. 1 is a line graph showing the SIINFEKL antigen levels derived from OVA peptide and detected by MHCI-SIINFEKL specific antibody as measured by FACS in bone marrow-derived macrophages from wild type or HDAC6 KO (knockout) mice. Macrophages were pre-treated with Nexturastat A (NextA) 5 µM and then polarized for 24 hours.

In one aspect, the present disclosure provides HDAC6-activated macrophages.

In another aspect, the present disclosure provides compositions comprising HDAC6-activated macrophages.

In another aspect, the HDAC6-activated macrophages are produced from naïve macrophages that have been isolated from a subject and treated ex vivo with a selective HDAC6 inhibitor. In another aspect, the subject is a mammal. In another aspect, the subject is a human. In another aspect, the naïve macrophages are allogeneic macrophages, autologous macrophages, or a combination of allogeneic macrophages and autologous macrophages. In another aspect, the naïve macrophages are allogeneic macrophages. In another aspect, the naïve macrophages are autologous macrophages.

In another aspect, HDAC6-activated macrophages are produced from naïve macrophages that have been isolated from a subject and treated ex vivo one time with a selective HDAC6 inhibitor.

In another aspect, the HDAC6-activated macrophages are produced from naïve macrophages that have been isolated from a subject and treated ex vivo two or more times with a selective HDAC6 inhibitor.

In another aspect, the HDAC6-activated macrophages are produced from naïve macrophages that have been isolated from a subject and treated ex vivo with a selective HDAC6 inhibitor for 6 hours or less, e.g., 5 hours or less, 4 hours or less, 3 hours or less, 2 hours or less, 1 hour or less, or 30 minutes or less.

In another aspect, the HDAC6-activated macrophages are produced from naïve macrophages that have been isolated from a subject and treated ex vivo with a selective HDAC6 inhibitor and a macrophage polarizing agent. In another aspect, the macrophage polarizing agent comprises lipopolysaccharide (LPS), interferon-gamma, interleukin-4, or interleukin-13, or a combination thereof. In another aspect, the isolated naïve macrophages are treated with the selective HDAC6 inhibitor before treatment with the macrophage polarizing agent. In another aspect, the isolated naïve macrophages are treated with the selective HDAC6 inhibitor after treatment with the macrophage polarizing agent. In another aspect, the isolated naïve macrophages are simultaneously treated with the selective HDAC6 inhibitor and the macrophage polarizing agent. In another aspect, the ex vivo treatment with the macrophage polarizing agent is for 6 hours or less, e.g., 5 hours or less, 4 hours or less, 3 hours or less, 2 hours or less, 1 hour or less, or 30 minutes or less.

In another aspect, the HDAC6-activated macrophages are produced from naïve macrophages that have been isolated from a subject and treated ex vivo with a selective HDAC6 inhibitor and a tumor antigen. In another aspect, the antigen comprises alphafetoprotein (AFP), carcinoembryonic antigen (CEA), CA-125, MUC-1, Epithelial tumor antigen (ETA), tyrosinase, or melanoma-associated antigen (MAGE), p53, or a combination thereof. In another aspect, the isolated naïve macrophages are treated with the selective HDAC6 inhibitor before treatment with the tumor antigen. In another aspect, the isolated naïve macrophages are treated with the selective HDAC6 inhibitor after treatment with the tumor antigen. In another aspect, the isolated naïve macrophages are simultaneously treated with the selective HDAC6 inhibitor and the tumor antigen. In another aspect, the ex vivo treatment with the tumor antigen is for 6 hours or less, e.g., 5 hours or less, 4 hours or less, 3 hours or less, 2 hours or less, 1 hour or less, or 30 minutes or less.

In another aspect, the HDAC6-activated macrophages are produced from naïve macrophages that have been isolated from a subject and treated ex vivo with a selective HDAC6 inhibitor, a macrophage polarizing agent, and a tumor antigen. The naïve macrophages can be treated with the selective HDAC6 inhibitor, the macrophage polarizing agent, and the tumor antigen simultaneously or separately in any order. For example, the naïve macrophages can be treated ex vivo first with the selective HDAC6 inhibitor followed by the macrophage polarizing agent followed by the tumor antigen; the naïve macrophages can be treated ex vivo first with the macrophage polarizing agent followed by the selective HDAC6 inhibitor followed by the tumor antigen; the naïve macrophages can be treated ex vivo first with the selective HDAC6 inhibitor followed by the tumor antigen followed by the macrophage polarizing agent; and so on. In another aspect, the ex vivo treatment is a selective HDAC6 inhibitor, a macrophage polarizing agent, and a tumor antigen, independently for each agent, for 6 hours or less, e.g., 5 hours or less, 4 hours or less, 3 hours or less, 2 hours or less, 1 hour or less, or 30 minutes or less.

HDAC6-activated macrophages may be formulated as pharmaceutical compositions or medicaments for clinical use and may comprise a pharmaceutically acceptable carrier, diluent, excipient or adjuvant. Thus, in one aspect, the present disclosure provides compositions comprising HDAC6-activated macrophages and a pharmaceutically acceptable carrier, adjuvant, excipient or diluent. Pharmaceutically acceptable carriers, diluents, excipients, or adjuvants are known in the art.

The composition may be formulated for parenteral, systemic, intracavitary, intravenous, intra-arterial, intramuscular, intrathecal, intraocular, intraconjunctival, intratumoral, subcutaneous, intradermal, intrathecal, oral or transdermal routes of administration which may include injection or infusion.

Suitable formulations may comprise HDAC6-activated macrophages in a sterile or isotonic medium, e.g, water for injection (WFI). Medicaments and pharmaceutical compositions may be formulated in fluid, including gel, form. Fluid formulations maybe formulated for administration by injection or infusion (e.g. via catheter) to a selected region of the human or animal body.

In one aspect, compositions comprising HDAC6-activated macrophages are formulated for intratumoral or intravenous administration, e.g., for macrophage-directed cancer immunotherapy. See, e.g., Mills et al., *Cancer Research* 76:513-516 (2016); Lee et al., *J Control Release* 240:527-540 (2016).

In accordance with the present disclosure, methods are provided for the production of pharmaceutically useful compositions, such methods of production may comprise one or more steps selected from isolating/purifying HDAC6-activated macrophages produced according to the methods described herein; and/or mixing HDAC6-activated macrophages produced according with a pharmaceutically acceptable carrier, adjuvant, excipient or diluent.

For example, one aspect of the present disclosure relates to a method of formulating or producing a medicament or pharmaceutical composition, the method comprising formulating a pharmaceutical composition or medicament by mixing HDAC6-activated macrophages produced according to the methods described herein with a pharmaceutically acceptable carrier, adjuvant, excipient or diluent.

In another aspect, the selective HDAC6 inhibitor is a compound of Formula I:

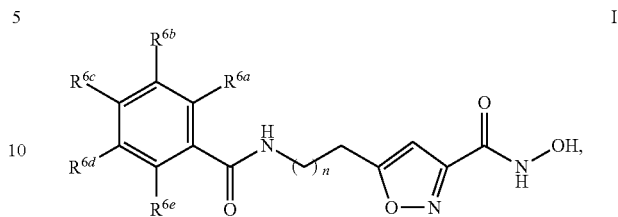

or a pharmaceutically acceptable salt thereof, wherein:
$R^{6a}$, $R^{6b}$, $R^{6c}$, $R^{6d}$, and $R^{6e}$ are each independently selected from the group consisting of hydrogen, halogen, hydroxy, nitro, cyano, —$NR^aR^b$, —C(=O)$NR^aR^b$, —C(=O)$R^c$, $C_{1-6}$ alkyl, $C_{2-6}$ alkenyl, $C_{2-6}$ alkynyl, $C_{1-6}$ alkoxy, $C_{1-6}$ haloalkyl, haloalkoxy, optionally substituted $C_{3-6}$ cycloalkyl, optionally substituted phenyl, optionally substituted 5- or 6-membered heteroaryl, and optionally substituted 5- or 6-membered heterocyclo;
$R^a$ and $R^b$ are independently selected from the group consisting of hydrogen and $C_{1-4}$ alkyl; or
$R^a$ and $R^b$ taken together with the nitrogen atom to which they are attached form a 3- to 10-membered heterocyclo;
$R^c$ is $C_{1-4}$ alkyl; and
n is 1, 2, or 3.

In another aspect, the present disclosure provides that the selective HDAC6 inhibitor is a compound of Formula I, or a pharmaceutically acceptable salt thereof, wherein $R^{6a}$, $R^{6b}$, $R^{6c}$, $R^{6d}$, and $R^{6e}$ are each independently selected from the group consisting of hydrogen, halogen, hydroxy, nitro, cyano, —$NR^aR^b$, —C(=O)$NR^aR^b$, —C(=O)$R^c$, $C_{1-4}$ alkyl, $C_{1-4}$ alkoxy, and $C_{1-4}$ haloalkyl. In another aspect, $R^{6a}$, $R^{6b}$, $R^{6c}$, $R^{6d}$, and $R^{6e}$ are each independently selected from the group consisting of hydrogen, halogen, cyano, $C_{1-4}$ alkyl, and $C_{1-4}$ alkoxy.

In another aspect, the present disclosure provides that the selective HDAC6 inhibitor is a compound of Formula I, or a pharmaceutically acceptable salt thereof, wherein n is 1. In another aspect, n is 2. In another aspect, n is 3.

In another aspect, the selective HDAC6 inhibitor is a compound of Formula II:

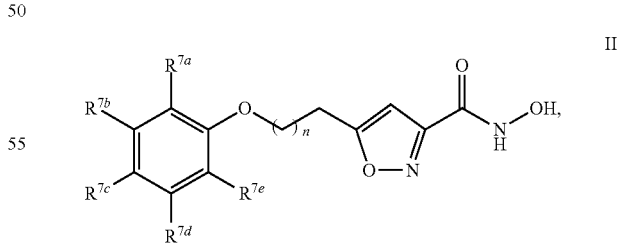

or a pharmaceutically acceptable salt thereof, wherein:
$R^{7a}$, $R^{7b}$, $R^{7c}$, $R^{7d}$, and $R^{7e}$ are each independently selected from the group consisting of hydrogen, halogen, hydroxy, nitro, cyano, —$NR^aR^b$, —C(=O)$NR^aR^b$, —C(=O)$R^e$, $C_{1-6}$ alkyl, $C_{2-6}$ alkenyl, $C_{2-6}$ alkynyl, $C_{1-6}$ alkoxy, $C_{1-6}$ haloalkyl, haloalkoxy, optionally substituted $C_{3-6}$ cycloalkyl, optionally substituted phenyl, optionally substituted 5- or 6-membered heteroaryl, and optionally substituted 5- or 6-membered heterocyclo;

$R^a$ and $R^b$ are independently selected from the group consisting of hydrogen and $C_{1-4}$ alkyl; or $R^a$ and $R^b$ taken together with the nitrogen atom to which they are attached form a 3- to 10-membered heterocyclo;

$R^c$ is $C_{1-4}$ alkyl; and n is 1, 2, or 3.

In another aspect, the present disclosure provides that the selective HDAC6 inhibitor is a compound of Formula II, or a pharmaceutically acceptable salt thereof, wherein $R^{7a}$, $R^{7b}$, $R^{7c}$, $R^{7d}$, and $R^{7e}$ are each independently selected from the group consisting of hydrogen, halogen, hydroxy, nitro, cyano, —$NR^aR^b$, —$C(=O)NR^aR^b$, —$C(=O)R^c$, $C_{1-4}$ alkyl, $C_{1-4}$ alkoxy, and $C_{1-4}$ haloalkyl. In another aspect, $R^{7a}$, $R^{7b}$, $R^{7c}$, $R^{7d}$, and $R^{7e}$ are each independently selected from the group consisting of hydrogen, halogen, cyano, $C_{1-4}$ alkyl, and $C_{1-4}$ alkoxy.

In another aspect, the selective HDAC6 inhibitor is a compound of Formula II, or a pharmaceutically acceptable salt thereof, wherein n is 1. In another aspect, n is 2. In another aspect, n is 3.

In another aspect, the selective HDAC6 inhibitor is a compound of Formula III:

![Formula III structure]

III or a pharmaceutically acceptable salt thereof, wherein:

$R^{4a}$ and $R^{4b}$ are independently selected from the group consisting of hydrogen, halogen, cyano, $C_{1-4}$ alkyl, and $C_{1-4}$ alkoxy;

$R^{4c}$ and $R^{4d}$ are independently selected from the group consisting of hydrogen and methyl;

m is 0 or 1;

n is 1, 2, or 3; and

==== represents a single or double bond.

In another aspect, the selective HDAC6 inhibitor is a compound of Formula III, or a pharmaceutically acceptable salt thereof, wherein m is 0 and ==== can represent a double bond.

In another aspect, the selective HDAC6 inhibitor is a compound of Formula III, or a pharmaceutically acceptable salt thereof, wherein m is 1 and ==== is a single bond.

In another aspect, the selective HDAC6 inhibitor is a compound of Formula III, or a pharmaceutically acceptable salt thereof, wherein n is 1. In another aspect, n is 2. In another aspect, n is 3.

In another aspect, the selective HDAC6 inhibitor that is a compound of Formula IV:

![Formula IV structure]

IV or a pharmaceutically acceptable salt thereof, wherein:

$R^{5a}$ and $R^{5c}$ are independently selected from the group consisting of hydrogen, halogen, cyano, $C_{1-4}$ alkyl, and $C_{1-4}$ alkoxy; and n is 1, 2, or 3.

In another aspect, the selective HDAC6 inhibitor is a compound of Formula IV, or a pharmaceutically acceptable salt thereof, wherein n is 1. In another aspect, n is 2. In another aspect, n is 3.

In another aspect, the selective HDAC6 inhibitor is a compound of Table 1, see below, or a pharmaceutically acceptable salt thereof.

In another aspect, the selective HDAC6 inhibitor is at least 20-fold selective over one or more other HDAC isoforms, e.g., HDAC1, HDAC2, HDAC3, HDAC4, HDAC5, HDAC7, HDAC8, HDAC9, HDAC10, or HDAC11.

In another aspect, the selective HDAC6 inhibitor is at least 100-fold selective over one or more other HDAC isoforms.

In another aspect, the selective HDAC6 inhibitor is at least 600-fold selective over one or more other HDAC isoforms.

II. Methods of Producing HDAC6-Activated Macrophages

In one aspect, the present disclosure provides methods of producing HDAC6-activated macrophages, the methods comprising isolating naïve macrophages from a subject and treating the isolated naïve macrophages ex vivo with a selective HDAC6 inhibitor. In another aspect, the subject is a mammal. In another aspect, the subject is a human. In another aspect, the naïve macrophages are allogeneic macrophages, autologous macrophages, or a combination of allogeneic macrophages and autologous macrophages. In another aspect, the naïve macrophages are allogeneic macrophages. In another aspect, the naïve macrophages are autologous macrophages.

In another aspect, HDAC6-activated macrophages are produced from naïve macrophages that have been isolated from a subject and treated ex vivo one time with a selective HDAC6 inhibitor.

In another aspect, the HDAC6-activated macrophages are produced from naïve macrophages that have been isolated from a subject and treated ex vivo two or more times with a selective HDAC6 inhibitor.

In another aspect, the HDAC6-activated macrophages are produced from naïve macrophages that have been isolated from a subject and treated ex vivo with a selective HDAC6 inhibitor for 6 hours or less, e.g., 5 hours or less, 4 hours or less, 3 hours or less, 2 hours or less, 1 hour or less, or 30 minutes or less.

In another aspect, the HDAC6-activated macrophages are produced from naïve macrophages that have been isolated from a subject and treated ex vivo with a selective HDAC6 inhibitor and a macrophage polarizing agent. In another aspect, the macrophage polarizing agent comprises lipopolysaccharide (LPS), interferon-gamma, interleukin-4, or interleukin-13, or a combination thereof. In another aspect, the isolated naïve macrophages are treated with the selective HDAC6 inhibitor before treatment with the macrophage polarizing agent. In another aspect, the isolated naïve macrophages are treated with the selective HDAC6 inhibitor after treatment with the macrophage polarizing agent. In another aspect, the isolated naïve macrophages are simultaneously treated with the selective HDAC6 inhibitor and the macrophage polarizing agent. In another aspect, the isolated naïve macrophages are treated with the macrophage polarizing agent for 6 hours or less, e.g., 5 hours or less, 4 hours or less, 3 hours or less, 2 hours or less, 1 hour or less, or 30 minutes or less.

In another aspect, the HDAC6-activated macrophages are produced from naïve macrophages that have been isolated from a subject and treated ex vivo with a selective HDAC6 inhibitor and a tumor antigen. In another aspect, the antigen comprises alphafetoprotein (AFP), carcinoembryonic antigen (CEA), CA-125, MUC-1, Epithelial tumor antigen (ETA), tyrosinase, or melanoma-associated antigen (MAGE), p53, or a combination thereof. In another aspect, the isolated naïve macrophages are treated with the selective HDAC6 inhibitor before treatment with the tumor antigen. In another aspect, the isolated naïve macrophages are treated with the selective HDAC6 inhibitor after treatment with the tumor antigen. In another aspect, the isolated naïve macrophages are simultaneously treated with the selective HDAC6 inhibitor and the tumor antigen. In another aspect, the isolated naïve macrophages are treated with the tumor antigen for 6 hours or less, e.g., 5 hours or less, 4 hours or less, 3 hours or less, 2 hours or less, 1 hour or less, or 30 minutes or less.

In another aspect, the selective HDAC6 inhibitor is a compound of Formula I, or a pharmaceutically acceptable salt thereof. See above. In another aspect, wherein $R^{6a}$, $R^{6b}$, $R^{6c}$, $R^{6d}$, and $R^{6e}$ are independently selected from the group consisting of hydrogen, halogen, hydroxy, nitro, cyano, —$NR^aR^b$, —$C(=O)NR^aR^b$, —$C(=O)R^c$, $C_{1-4}$ alkyl, $C_{1-4}$ alkoxy, and $C_{1-4}$ haloalkyl. In another aspect, $R^{6a}$, $R^{6b}$, $R^{6c}$, $R^{6d}$, and $R^{6e}$ are each independently selected from the group consisting of hydrogen, halogen, cyano, $C_{1-4}$ alkyl, and $C_{1-4}$ alkoxy. In another aspect n is 1. In another aspect, n is 2. In another aspect, n can be 3.

In another aspect, the selective HDAC6 inhibitor is a compound of Formula II, or a pharmaceutically acceptable salt thereof. See above. In another aspect, $R^{7a}$, $R^{7b}$, $R^{7c}$, $R^{7d}$, and $R^{7e}$ are each independently selected from the group consisting of hydrogen, halogen, hydroxy, nitro, cyano, —$NR^aR^b$, —$C(=O)NR^aR^b$, —$C(=O)R^c$, $C_{1-4}$ alkyl, $C_{1-4}$ alkoxy, and $C_{1-4}$ haloalkyl. In another aspect, $R^{7a}$, $R^{7b}$, $R^{7c}$, $R^{7d}$, and $R^{7e}$ are each independently selected from the group consisting of hydrogen, halogen, cyano, $C_{1-4}$ alkyl, and $C_{1-4}$ alkoxy. In another aspect, n is 1. In another aspect, n is 2. In another aspect, n is 3.

In another aspect, the selective HDAC6 inhibitor is a compound of Formula III, or a pharmaceutically acceptable salt thereof. See above. In another aspect, m is 0 and ==== is a double bond. In another aspect, m is 1 and ==== is a single bond. In another aspect, n is 1. In another aspect, n is 2. In another aspect, n is 3.

In another aspect, the selective HDAC6 inhibitor that is a compound of Formula IV, or a pharmaceutically acceptable salt thereof. See above. In another aspect, n is 1. In another aspect, n is 2. In another aspect, n is 3.

In another aspect, the selective HDAC6 inhibitor is a compound of Table 1, or a pharmaceutically acceptable salt thereof.

In another aspect, the selective HDAC6 inhibitor is at least 20-fold selective over one or more other HDAC isoforms, e.g., HDAC1, HDAC2, HDAC3, HDAC4, HDAC5, HDAC7, HDAC8, HDAC9, HDAC10, or HDAC11.

In another aspect, the selective HDAC6 inhibitor is at least 100-fold selective over one or more other HDAC isoforms.

In another aspect, the selective HDAC6 inhibitor is at least 600-fold selective over one or more other HDAC isoforms.

III. Treating Disease by Adoptive Transfer

HDAC6-activated macrophages or pharmaceutical compositions comprising HDAC6-activated macrophages may be useful for adoptive cell therapy. Adoptive cell therapy involves the introduction of cells into a subject in need of treatment. In some cases, the cells are derived from the subject that they are introduced to (autologous cell therapy). See, e.g., Moroni et al., *Nature Medicine* 25:1560-1565 (2019). That is, cells, e.g., macrophages, may have been obtained from the patient, activated according to methods described herein, and then returned to the same subject. Methods disclosed herein may also be used in allogenic cell therapy, in which cells obtained from a different individual are introduced into the subject.

In one aspect, the present disclosure provides methods of treating or preventing a disease or disorder a subject in need thereof, the methods comprising administering to the subject a therapeutically effective amount of HDAC6-activated macrophages or a composition comprising HDAC6-activated macrophages. In another aspect, the disease or disorder is cancer, pulmonary fibrosis, liver fibrosis, or heart fibrosis.

In another aspect, the present disclosure provides methods of treating or preventing a disease or disorder in a subject in need thereof, the methods comprising:
(a) isolating naïve macrophages from a subject;
(b) treating the naïve macrophages ex vivo with a selective HDAC6 inhibitor to produce HDAC6-activated macrophages; and;
(c) administering the HDAC6-activated macrophages to the subject.

In another aspect, the present disclosure provides methods of treating or preventing a disease or disorder in a subject in need thereof, the methods comprising:
(a) isolating naïve macrophages from a subject;
(b) treating the naïve macrophages ex vivo with a selective HDAC6 inhibitor to produce HDAC6-activated macrophages;
(c) treating the HDAC6-activated macrophages with a macrophage polarizing agent; and
(d) administering the HDAC6-activated macrophages to the subject.

In another aspect, the present disclosure provides methods of treating or preventing a disease or disorder in a subject in need thereof, the methods comprising:

(a) isolating naïve macrophages from a subject;
(b) treating the naïve macrophages ex vivo with a selective HDAC6 inhibitor to produce HDAC6-activated macrophages;
(c) treating the HDAC6-activated macrophages with a tumor antigen; and
(d) administering the HDAC6-activated macrophages to the subject.

In another aspect, the present disclosure provides methods of treating or preventing a disease or disorder in a subject in need thereof, the methods comprising:
(a) isolating naïve macrophages from a subject;
(b) treating the naïve macrophages ex vivo with a selective HDAC6 inhibitor to produce HDAC6-activated macrophages;
(c) treating the HDAC6-activated macrophages with a macrophage polarizing agent;
(d) treating the HDAC6-activated macrophages with a tumor antigen; and
(e) administering the HDAC6-activated macrophages to the subject.

In one aspect, the subject from which the naïve macrophages are isolated is the subject administered with HDAC6-activated macrophages, i.e., adoptive transfer is of autologous cells. In some aspects, the subject from which the naïve macrophages are isolated is a different subject than the subject to which the HDAC6-activated macrophages are administered, i.e., adoptive transfer is of allogenic cells.

In one aspect, methods of treating or preventing a disease or disorder in a subject comprise one or more of the following steps: taking a biological sample from the subject; isolating naïve macrophages from the biological sample; treating the naïve macrophages ex vivo with a selective HDAC6 inhibitor; treating the treated macrophages with a macrophage polarizing agent; collecting the HDAC6-activated macrophages; mixing the HDAC6-activated macrophages with an adjuvant, diluent, or carrier; administering the HDAC6-activated macrophages or composition thereof to the subject.

In one aspect, the disease or disorder to be treated/prevented is pulmonary fibrosis.

In another aspect, the disease or disorder to be treated/prevented is liver fibrosis.

In another aspect, the disease or disorder to be treated/prevented is heart fibrosis.

In another aspect, the disease or disorder to be treated/prevented is cancer. HDAC6-activated macrophages and pharmaceutical compositions comprising HDAC6-activated macrophages are capable of treating or preventing a cancer, e.g. inhibit the development/progression of the cancer, delay/prevent onset of the cancer, reduce/delay/prevent tumor growth, reduce/delay/prevent metastasis, reduce the severity of the symptoms of the cancer, reduce the number of cancer cells, reduce tumor size/volume, and/or increase survival (e.g. progression free survival)).

In one aspect, the cancer is a solid tumor. In another aspect, the cancer is a hematological cancer. In another aspect, the cancer is any one or more of the cancers of Table 2.

TABLE 2

| | | | |
|---|---|---|---|
| adrenal cancer | acinic cell carcinoma | acoustic neuroma | acral lentigious melanoma |
| acrospiroma | acute eosinophilic leukemia | acute erythroid leukemia | acute lymphoblastic leukemia |
| acute megakaryoblastic leukemia | acute monocytic leukemia | acute promyelocytic leukemia | adenocarcinoma |
| adenoid cystic carcinoma | adenoma | adenomatoid odontogenic tumor | adenosquamous carcinoma |
| adipose tissue neoplasm | adrenocortical carcinoma | adult T-cell leukemia/lymphoma | aggressive NK-cell leukemia |
| AIDS-related lymphoma | alveolar rhabdomyosarcoma | alveolar soft part sarcoma | ameloblastic fibroma |
| anaplastic large cell lymphoma | anaplastic thyroid cancer | angioimmunoblastic T-cell lymphoma | angiomyolipoma |
| angiosarcoma | astrocytoma | atypical teratoid rhabdoid tumor | B-cell chronic lymphocytic leukemia |
| B-cell prolymphocytic leukemia | B-cell lymphoma | basal cell carcinoma | biliary tract cancer |
| bladder cancer | blastoma | bone cancer | Brenner tumor |
| Brown tumor | Burkitt's lymphoma | breast cancer | brain cancer |
| carcinoma | carcinoma in situ | carcinosarcoma | cartilage tumor |
| cementoma | myeloid sarcoma | chondroma | chordoma |
| choriocarcinoma | choroid plexus papilloma | clear-cell sarcoma of the kidney | craniopharyngioma |
| cutaneous T-cell lymphoma | cervical cancer | colorectal cancer | Degos disease |
| desmoplastic small round cell tumor | diffuse large B-cell lymphoma | dysembryoplastic neuroepithelial tumor | dysgerminoma |
| embryonal carcinoma | endocrine gland neoplasm | endodermal sinus tumor | enteropathy-associated T-cell lymphoma |
| esophageal cancer | fetus in fetu | fibroma | fibrosarcoma |
| follicular lymphoma | follicular thyroid cancer | ganglioneuroma | gastrointestinal cancer |
| germ cell tumor | gestational choriocarcinoma | giant cell fibroblastoma | giant cell tumor of the bone |
| glial tumor | glioblastoma multiforme | glioma | gliomatosis cerebri |

TABLE 2-continued

| | | | |
|---|---|---|---|
| glucagonoma | gonadoblastoma | granulosa cell tumor | gynandroblastoma |
| gallbladder cancer | gastric cancer | hairy cell leukemia | hemangioblastoma |
| head and neck cancer | hemangiopericytoma | hematological cancer | hepatoblastoma |
| hepatosplenic T-cell lymphoma | Hodgkin's lymphoma | non-Hodgkin's lymphoma | invasive lobular carcinoma |
| intestinal cancer | kidney cancer | laryngeal cancer | lentigo maligna |
| lethal midline carcinoma | leukemia | leydig cell tumor | liposarcoma |
| lung cancer | lymphangioma | lymphangiosarcoma | lymphoepithelioma |
| lymphoma | acute lymphocytic leukemia | acute myelogeous leukemia | chronic lymphocytic leukemia |
| liver cancer | small cell lung cancer | non-small cell lung cancer | MALT lymphoma |
| malignant fibrous histiocytoma | malignant peripheral nerve sheath tumor | malignant triton tumor | mantle cell lymphoma |
| marginal zone B-cell lymphoma | mast cell leukemia | mediastinal germ cell tumor | medullary carcinoma of the breast |
| medullary thyroid cancer | medulloblastoma | melanoma | meningioma |
| merkel cell cancer | mesothelioma | metastatic urothelial carcinoma | mixed Mullerian tumor |
| mucinous tumor | multiple myeloma | muscle tissue neoplasm | mycosis fungoides |
| myxoid liposarcoma | myxoma | myxosarcoma | nasopharyngeal carcinoma |
| neurinoma | neuroblastoma | neurofibroma | neuroma |
| nodular melanoma | ocular cancer | oligoastrocytoma | oligodendroglioma |
| oncocytoma | optic nerve sheath meningioma | optic nerve tumor | oral cancer |
| osteosarcoma | ovarian cancer | Pancoast tumor | papillary thyroid cancer |
| paraganglioma | pinealoblastoma | pineocytoma | pituicytoma |
| pituitary adenoma | pituitary tumor | plasmacytoma | polyembryoma |
| precursor T-lymphoblastic lymphoma | primary central nervous system lymphoma | primary effusion lymphoma | preimary peritoneal cancer |
| prostate cancer | pancreatic cancer | pharyngeal cancer | pseudomyxoma periotonei |
| renal cell carcinoma | renal medullary carcinoma | retinoblastoma | rhabdomyoma |
| rhabdomyosarcoma | Richter's transformation | rectal cancer | sarcoma |
| Schwannomatosis | seminoma | Sertoli cell tumor | sex cord-gonadal stromal tumor |
| signet ring cell carcinoma | skin cancer | small blue round cell tumors | small cell carcinoma |
| soft tissue sarcoma | somatostatinoma | soot wart | spinal tumor |
| splenic marginal zone lymphoma | squamous cell carcinoma | synovial sarcoma | Sezary's disease |
| small intestine cancer | squamous carcinoma | stomach cancer | T-cell lymphoma |
| testicular cancer | thecoma | thyroid cancer | transitional cell carcinoma |
| throat cancer | urachal cancer | urogenital cancer | urothelial carcinoma |
| uveal melanoma | uterine cancer | verrucous carcinoma | visual pathway glioma |
| vulvar cancer | vaginal cancer | Waldenstrom's macroglobulinemia | Warthin's tumor |
| Wilms' tumor | | | |

Exemplary hematological cancers include, but are not limited to, the cancers listed in Table 3. In another aspect, the hematological cancer is acute lymphocytic leukemia, chronic lymphocytic leukemia (including B-cell chronic lymphocytic leukemia), or acute myeloid leukemia.

TABLE 3

| | |
|---|---|
| acute lymphocytic leukemia (ALL) | acute eosinophilic leukemia |
| acute myeloid leukemia (AML) | acute erythroid leukemia |
| chronic lymphocytic leukemia (CLL) | acute lymphoblastic leukemia |
| small lymphocytic lymphoma (SLL) | acute megakaryoblastic leukemia |
| multiple myeloma (MM) | acute monocytic leukemia |
| Hodgkins lymphoma (HL) | acute promyelocytic leukemia |
| non-Hodgkin's lymphoma (NHL) | acute myelogeous leukemia |
| mantle cell lymphoma (MCL) | B-cell prolymphocytic leukemia |
| marginal zone B-cell lymphoma | B-cell lymphoma |
| splenic marginal zone lymphoma | MALT lymphoma |
| follicular lymphoma (FL) | precursor T-lymphoblastic lymphoma |
| Waldenstrom's macroglobulinemia (WM) | T-cell lymphoma |

TABLE 3-continued

| | |
|---|---|
| diffuse large B-cell lymphoma (DLBCL) | mast cell leukemia |
| marginal zone lymphoma (MZL) | adult T cell leukemia/lymphoma |
| hairy cell leukemia (HCL) | aggressive NK-cell leukemia |
| Burkitt's lymphoma (BL) | angioimmunoblastic T-cell lymphoma |
| Richter's transformation | |

In one aspect, administration of a HDAC6-activated macrophage or a composition comprising a HDAC6-activated macrophage is in a "therapeutically effective" or "prophylactically effective" amount, this being sufficient to show benefit to the subject.

The actual amount administered, and rate and time-course of administration, will depend on the nature and severity of the disease or disorder. Prescription of treatment, e.g. decisions on dosage etc., is within the responsibility of general practitioners and other medical doctors, and typically takes account of the disease/disorder to be treated, the condition of the individual subject, the site of delivery, the method of administration and other factors known to practitioners. Examples of the techniques and protocols mentioned above can be found in Remington's Pharmaceutical Sciences, 20th Edition, 2000, pub. Lippincott, Williams & Wilkins.

Multiple doses of a HDAC6-activated macrophage or pharmaceutical composition comprising a HDAC6-activated macrophage may be administered to a subject. One or more, or each, of the doses may be accompanied by simultaneous or sequential administration of another therapeutic agent.

Multiple doses may be separated by a predetermined time interval, which may be selected to be one of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or 31 days, or 1, 2, 3, 4, 5, 6, 7, 8, 9, 10, 11, or 12 months. By way of example, doses may be given once every 7, 14, 21 or 28 days (plus or minus 3, 2, or 1 days).

In another aspect, the present disclosure provides the method further comprising administering to a subject one or more of local radiation therapy, immune checkpoint blockade therapy, photothermal therapy, or chemotherapy.

Radiation Therapy

In one aspect, methods provided herein comprise administering HDAC6-activated macrophages or a composition comprising HDAC6-activated macrophages to a subject in combination with radiation therapy. The methods provided herein are not limited by the types, amounts, or delivery and administration systems used to deliver the therapeutic dose of radiation to a subject. For example, the subject may receive photon radiotherapy, particle beam radiation therapy, other types of radiotherapies, and combinations thereof. In some aspects, the radiation is delivered to the subject using a linear accelerator. In still other aspects, the radiation is delivered using a gamma knife.

The source of radiation can be external or internal to the subject. External radiation therapy is most common and involves directing a beam of high-energy radiation to a tumor site through the skin using, for instance, a linear accelerator. While the beam of radiation is localized to the tumor site, it is nearly impossible to avoid exposure of normal, healthy tissue. However, external radiation is usually well tolerated by subjects. Internal radiation therapy involves implanting a radiation-emitting source, such as beads, wires, pellets, capsules, particles, and the like, inside the body at or near the tumor site including the use of delivery systems that specifically target cancer cells (e.g., using particles attached to cancer cell binding ligands). Such implants can be removed following treatment, or left in the body inactive. Types of internal radiation therapy include, but are not limited to, brachytherapy, interstitial irradiation, intracavity irradiation, radioimmunotherapy, and the like.

The subject may optionally receive radiosensitizers (e.g., metronidazole, misonidazole, intra-arterial Budr, intravenous iododeoxyuridine (IudR), nitroimidazole, 5-substituted-4-nitroimidazoles, 2H-isoindolediones, [[(2-bromoethyl)-amino]methyl]-nitro-1H-imidazole-1-ethanol, nitroaniline derivatives, DNA-affinic hypoxia selective cytotoxins, halogenated DNA ligand, 1,2,4 benzotriazine oxides, 2-nitroimidazole derivatives, fluorine-containing nitroazole derivatives, benzamide, nicotinamide, acridine-intercalator, 5-thiotretrazole derivative, 3-nitro-1,2,4-triazole, 4,5-dinitroimidazole derivative, hydroxylated texaphrins, cisplatin, mitomycin, tiripazamine, nitrosourea, mercaptopurine, methotrexate, fluorouracil, bleomycin, vincristine, carboplatin, epirubicin, doxorubicin, cyclophosphamide, vindesine, etoposide, paclitaxel, heat (hyperthermia), and the like), radioprotectors (e.g., cysteamine, aminoalkyl dihydrogen phosphorothioates, amifostine (WR 2721), IL-1, IL-6, and the like). Radiosensitizers enhance the killing of tumor cells. Radioprotectors protect healthy tissue from the harmful effects of radiation.

Any type of radiation can be administered to a subject, so long as the dose of radiation is tolerated by the subject without unacceptable negative side-effects. Suitable types of radiotherapy include, for example, ionizing (electromagnetic) radiotherapy (e.g., X-rays or gamma rays) or particle beam radiation therapy (e.g., high linear energy radiation). Ionizing radiation is defined as radiation comprising particles or photons that have sufficient energy to produce ionization, i.e., gain or loss of electrons (as described in, for example, U.S. Pat. No. 5,770,581 incorporated herein by reference in its entirety). The effects of radiation can be at least partially controlled by the clinician. In one aspect, the dose of radiation is fractionated for maximal target cell exposure and reduced toxicity.

In one aspect, the total dose of radiation administered to a subject is about 0.01 Gray (Gy) to about 100 Gy. In another aspect, about 10 Gy to about 65 Gy (e.g., about 15 Gy, 20 Gy, 25 Gy, 30 Gy, 35 Gy, 40 Gy, 45 Gy, 50 Gy, 55 Gy, or 60 Gy) are administered over the course of treatment. While in some aspects a complete dose of radiation can be administered over the course of one day, the total dose is ideally fractionated and administered over several days. Desirably, radiotherapy is administered over the course of at least about 3 days, e.g., at least 3, 4, 5, 7, 10, 14, 17, 21, 25, 28, 32, 35, 38, 42, 46, 52, or 56 days (about 1-8 weeks). Accordingly, a daily dose of radiation will comprise approximately 1-5 Gy (e.g., about 1 Gy, 1.5 Gy, 1.8 Gy, 2 Gy, 2.5 Gy, 2.8 Gy, 3 Gy, 3.2 Gy, 3.5 Gy, 3.8 Gy, 4 Gy, 4.2 Gy, or 4.5 Gy), or 1-2 Gy (e.g., 1.5-2 Gy). The daily dose of radiation should be sufficient to induce destruction of the targeted cells. If stretched over a period, in one aspect, radiation is not administered every day, thereby allowing the animal to rest and the effects of the therapy to be realized. For example, in one aspect, radiation is administered on 5 consecutive days, and not administered for 2 days, for each week of treatment, thereby allowing 2 days of rest per week. However, in other aspects, radiation is administered 1 day/week, 2 days/week, 3 days/week, 4 days/week, 5 days/week, 6 days/week, or all 7 days/week, depending on the mammal's responsiveness and any potential side effects. Radiation therapy can be initiated at any time in the therapeutic period. In one aspect, radiation is initiated in week 1 or week 2, and is administered for the remaining duration of the therapeutic period. For example, radiation is administered in weeks 1-6 or in weeks 2-6 of a therapeutic period comprising 6 weeks for treating, for instance, a solid tumor. Alternatively, radiation is administered in weeks 1-5 or weeks 2-5 of a therapeutic period comprising 5 weeks. These exemplary radiotherapy administration schedules are not intended, however, to limit the methods provided herein.

Immune Checkpoint Blockade Therapy

In one aspect, methods provided herein comprise administering HDAC6-activated macrophages or a composition comprising HDAC6-activated macrophages to a subject in combination with immune checkpoint blockade therapy. Immune checkpoint inhibitors are therapies that block immune system inhibitor checkpoints. Immune checkpoints can be stimulatory or inhibitory. Blockade of inhibitory immune checkpoints activates immune system function and is useful for cancer immunotherapy. Pardoll, *Nature Reviews. Cancer* 12:252-64 (2012). Tumor cells turn off activated T cells when they attach to specific T-cell receptors. Immune checkpoint inhibitors prevent tumor cells from attaching to T cells, which results in T cells remaining activated. In effect, the coordinated action by cellular and soluble components combats pathogens and injuries by cancers. The modulation of immune system pathways may involve changing the expression or the functional activity of at least one component of the pathway to then modulate the response by the immune system. U.S. 2015/0250853. Examples of immune checkpoint inhibitors include PD-1 inhibitors, PD-L1 inhibitors, CTLA-4 inhibitors, LAG3 inhibitors, TIM3 inhibitors, cd47 inhibitors, and B7-H1 inhibitors. Thus, in one aspect, the immune checkpoint inhibitor is selected from the group consisting of a PD-1 inhibitor, a PD-L1 inhibitor, a CTLA-4 inhibitor, a LAG3 inhibitor, a TIM3 inhibitor, and a cd47 inhibitor.

In another aspect, the immune checkpoint inhibitor is a programmed cell death protein (PD-1) inhibitor. PD-1 is a T-cell coinhibitory receptor that plays a pivotal role in the ability of tumor cells to evade the host's immune system. Blockage of interactions between PD-1 and PD-L1, a ligand of PD-1, enhances immune function and mediates antitumor activity. Examples of PD-1 inhibitors include antibodies that specifically bind to PD-1. Particular anti-PD-1 antibodies include, but are not limited to, nivolumab, pembrolizumab, STI-A1014, and pidilzumab. For a general discussion of the availability, methods of production, mechanism of action, and clinical studies of anti-PD-1 antibodies, see U.S. 2013/0309250, U.S. Pat. Nos. 6,808,710, 7,595,048, 8,008,449, 8,728,474, 8,779,105, 8,952,136, 8,900,587, 9,073,994, 9,084,776, and Naido et al., *British Journal of Cancer* 111:2214-19 (2014).

In another aspect, the immune checkpoint inhibitor is a PD-L1 (also known as B7-H1 or CD274) inhibitor. Examples of PD-L1 inhibitors include antibodies that specifically bind to PD-L1. Particular anti-PD-L1 antibodies include, but are not limited to, avelumab, atezolizumab, durvalumab, and BMS-936559. For a general discussion of the availability, methods of production, mechanism of action, and clinical studies, see U.S. Pat. No. 8,217,149, U.S. 2014/0341917, U.S. 2013/0071403, WO 2015036499, and Naido et al., *British Journal of Cancer* 111:2214-19 (2014).

In another aspect, the immune checkpoint inhibitor is a CTLA-4 inhibitor. CTLA-4, also known as cytotoxic T-lymphocyte antigen 4, is a protein receptor that downregulates the immune system. CTLA-4 is characterized as a "brake" that binds costimulatory molecules on antigen-presenting cells, which prevents interaction with CD28 on T cells and also generates an overtly inhibitory signal that constrains T cell activation. Examples of CTLA-4 inhibitors include antibodies that specifically bind to CTLA-4. Particular anti-CTLA-4 antibodies include, but are not limited to, ipilimumab and tremelimumab. For a general discussion of the availability, methods of production, mechanism of action, and clinical studies, see U.S. Pat. Nos. 6,984,720, 6,207,156, and Naido et al., *British Journal of Cancer* 111:2214-19 (2014).

In another aspect, the immune checkpoint inhibitor is a LAG3 inhibitor. LAG3, Lymphocyte Activation Gene 3, is a negative co-stimulatory receptor that modulates T cell homeostatis, proliferation, and activation. In addition, LAG3 has been reported to participate in regulatory T cells (Tregs) suppressive function. A large proportion of LAG3 molecules are retained in the cell close to the microtubule-organizing center, and only induced following antigen specific T cell activation. U.S. 2014/0286935. Examples of LAG3 inhibitors include antibodies that specifically bind to LAG3. Particular anti-LAG3 antibodies include, but are not limited to, GSK2831781. For a general discussion of the availability, methods of production, mechanism of action, and studies, see, U.S. 2011/0150892, U.S. 2014/0093511, U.S. 20150259420, and Huang et al., *Immunity* 21:503-13 (2004).

In another aspect, the immune checkpoint inhibitor is a TIM3 inhibitor. TIM3, T-cell immunoglobulin and mucin domain 3, is an immune checkpoint receptor that functions to limit the duration and magnitude of $T_H1$ and $T_C1$ T-cell responses. The TIM3 pathway is considered a target for anticancer immunotherapy due to its expression on dysfunctional $CD8^+$ T cells and Tregs, which are two reported immune cell populations that constitute immunosuppression in tumor tissue. Anderson, *Cancer Immunology Research* 2:393-98 (2014). Examples of TIM3 inhibitors include antibodies that specifically bind to TIM3. For a general discussion of the availability, methods of production, mechanism of action, and studies of TIM3 inhibitors, see U.S. 20150225457, U.S. 20130022623, U.S. Pat. No. 8,522,156, Ngiow et al., *Cancer Res* 71: 6567-71 (2011), Ngiow, et al., *Cancer Res* 71:3540-51 (2011), and Anderson, *Cancer Immunology Res* 2:393-98 (2014).

In another aspect, the immune checkpoint inhibitor is a CD47 inhibitor. See Unanue, E. R., *PNAS* 110:10886-87 (2013).

The term "antibody" is meant to include intact monoclonal antibodies, polyclonal antibodies, and multispecific antibodies formed from at least two intact antibodies, so long as they exhibit the desired biological activity. In one aspect, the antibodies are humanized monoclonal antibodies made by means of recombinant genetic engineering.

Another class of immune checkpoint inhibitors include polypeptides that bind to and block PD-1 receptors on T-cells without triggering inhibitor signal transduction. Such peptides include B7-DC polypeptides, B7-H1 polypeptides, B7-1 polypeptides and B7-2 polypeptides, and soluble fragments thereof, as disclosed in U.S. Pat. No. 8,114,845.

Another class of immune checkpoint inhibitors include compounds with peptide moieties that inhibit PD-1 signaling. Examples of such compounds are disclosed in U.S. Pat. No. 8,907,053.

Another class of immune checkpoint inhibitors include inhibitors of certain metabolic enzymes, such as indoleamine 2,3 dioxygenase (IDO), which is expressed by infiltrating myeloid cells and tumor cells. The IDO enzyme inhibits immune responses by depleting amino acids that are necessary for anabolic functions in T cells or through the synthesis of particular natural ligands for cytosolic receptors that are able to alter lymphocyte functions. Pardoll, *Nature Reviews. Cancer* 12:252-64 (2012); Löb, *Cancer Immunol Immunother* 58:153-57 (2009). Particular IDO blocking agents include, but are not limited to levo-1-methyl typtophan (L-1MT) and 1-methyl-tryptophan (1MT). Qian et al., *Cancer Res* 69:5498-504 (2009); and Löb et al., *Cancer Immunol Immunother* 58:153-7 (2009).

In one aspect, the immune checkpoint inhibitor is nivolumab, pembrolizumab, pidilizumab, STI-A1110, avelumab, atezolizumab, durvalumab, STI-A1014, ipilimumab, tremelimumab, GSK2831781, BMS-936559, or MED14736.

Chemotherapy

In one aspect, methods provided herein comprise administering a composition comprising HDAC6-activated macrophages or a composition comprising HDAC6-activated macrophages to a subject in combination with chemotherapy. In one aspect, the chemotherapy comprises one of the anti-cancer drugs or anti-cancer drug combinations listed in Table 4.

TABLE 4

| | | | |
|---|---|---|---|
| Abemaciclib | Abiraterone Acetate | Abraxane (Paclitaxel Albumin-stabilized Nanoparticle Formulation) | ABVD |
| ABVE | ABVE-PC | AC | Acalabrutinib |
| AC-T | Actemra (Tocilizumab) | Adcetris (Brentuximab Vedotin) | ADE |
| Ado-Trastuzumab Emtansine | Adriamycin (Doxorubicin Hydrochloride) | Afatinib Dimaleate | Afinitor (Everolimus) |
| Akynzeo (Netupitant and Palonosetron Hydrochloride) | Aldara (Imiquimod) | Aldesleukin | Alecensa (Alectinib) |
| Alectinib | Alemtuzumab | Alimta (Pemetrexed Disodium) | Aliqopa (Copanlisib Hydrochloride) |
| Alkeran for Injection (Melphalan Hydrochloride) | Alkeran Tablets (Melphalan) | Aloxi (Palonosetron Hydrochloride) | Alunbrig (Brigatinib) |
| Ameluz (Aminolevulinic Acid) | Amifostine | Aminolevulinic Acid | Anastrozole |
| Apalutamide | Aprepitant | Aranesp (Darbepoetin Alfa) | Aredia (Pamidronate Disodium) |
| Arimidex (Anastrozole) | Aromasin (Exemestane) | Arranon (Nelarabine) | Arsenic Trioxide |
| Arzerra (Ofatumumab) | Asparaginase *Erwinia chrysanthemi* | Atezolizumab | Avastin (Bevacizumab) |
| Avelumab | Axicabtagene Ciloleucel | Axitinib | Azacitidine |
| Azedra (Iobenguane I 131) | Bavencio (Avelumab) | BEACOPP | Beleodaq (Belinostat) |
| Belinostat | Bendamustine Hydrochloride | Bendeka (Bendamustine Hydrochloride) | BEP |
| Besponsa (Inotuzumab Ozogamicin) | Bevacizumab | Bexarotene | Bicalutamide |
| BiCNU (Carmustine) | Binimetinib | Bleomycin | Blinatumomab |
| Blincyto (Blinatumomab) | Bortezomib | Bosulif (Bosutinib) | Bosutinib |
| Braftovi (Encorafenib) | Brentuximab Vedotin | Brigatinib | BuMel |
| Busulfan | Busulfex (Busulfan) | Cabazitaxel | Cabometyx (Cabozantinib-S-Malate) |
| Cabozantinib-S-Malate | CAF | Calquence (Acalabrutinib) | Campath (Alemtuzumab) |
| Camptosar (Irinotecan Hydrochloride) | Capecitabine | CAPOX | Carac (Fluorouracil--Topical) |
| Carboplatin | CARBOPLATIN-TAXOL | Carfilzomib | Carmustine |

TABLE 4-continued

| | | | |
|---|---|---|---|
| Carmustine Implant | Casodex (Bicalutamide) | CEM | Cemiplimab-rwlc |
| Ceritinib | Cerubidine (Daunorubicin Hydrochloride) | Cervarix (Recombinant HPV Bivalent Vaccine) | Cetuximab |
| CEV | Chlorambucil | CHLORAMBUCIL-PREDNISONE | CHOP |
| Cisplatin | Cladribine | Clofarabine | Clolar (Clofarabine) |
| CMF | Cobimetinib | Cometriq (Cabozantinib-S-Malate) | Copanlisib Hydrochloride |
| COPDAC | Copiktra (Duvelisib) | COPP | COPP-ABV |
| Cosmegen (Dactinomycin) | Cotellic (Cobimetinib) | Crizotinib | CVP |
| Cyclophosphamide | Cyramza (Ramucirumab) | Cytarabine | Cytarabine Liposome |
| Cytosar-U (Cytarabine) | Dabrafenib | Dacarbazine | Dacogen (Decitabine) |
| Dacomitinib | Dactinomycin | Daratumumab | Darbepoetin Alfa |
| Darzalex (Daratumumab) | Dasatinib | Daunorubicin Hydrochloride | Daunorubicin Hydrochloride and Cytarabine Liposome |
| Decitabine | Defibrotide Sodium | Defitelio (Defibrotide Sodium) | Degarelix |
| Denileukin Diftitox | Denosumab | DepoCyt (Cytarabine Liposome) | Dexamethasone |
| Dexrazoxane Hydrochloride | Dinutuximab | Docetaxel | Doxil (Doxorubicin Hydrochloride Liposome) |
| Doxorubicin Hydrochloride | Doxorubicin Hydrochloride Liposome | Dox-SL (Doxorubicin Hydrochloride Liposome) | Durvalumab |
| Duvelisib | Efudex (Fluorouracil--Topical) | Eligard (Leuprolide Acetate) | Elitek (Rasburicase) |
| Ellence (Epirubicin Hydrochloride) | Elotuzumab | Eloxatin (Oxaliplatin) | Eltrombopag Olamine |
| Emend (Aprepitant) | Empliciti (Elotuzumab) | Enasidenib Mesylate | Encorafenib |
| Enzalutamide | Epirubicin Hydrochloride | EPOCH | Epoetin Alfa |
| Epogen (Epoetin Alfa) | Erbitux (Cetuximab) | Eribulin Mesylate | Erivedge (Vismodegib) |
| Erleada (Apalutamide) | Erlotinib Hydrochloride | Erwinaze (Asparaginase *Erwinia chrysanthemi*) | Ethyol (Amifostine) |
| Etopophos (Etoposide Phosphate) | Etoposide | Etoposide Phosphate | Evacet (Doxorubicin Hydrochloride Liposome) |
| Everolimus | Evista (Raloxifene Hydrochloride) | Evomela (Melphalan Hydrochloride) | Exemestane |
| 5-FU (Fluorouracil Injection) | 5-FU (Fluorouracil--Topical) | Fareston (Toremifene) | Farydak (Panobinostat) |
| Faslodex (Fulvestrant) | FEC | Femara (Letrozole) | Filgrastim |
| Firmagon (Degarelix) | Fludarabine Phosphate | Fluoroplex (Fluorouracil--Topical) | Fluorouracil Injection |
| Fluorouracil--Topical | Flutamide | FOLFIRI | FOLFIRI-BEVACIZUMAB |
| FOLFIRI-CETUXIMAB | FOLFIRINOX | FOLFOX | Folotyn (Pralatrexate) |
| Fostamatinib Disodium | FU-LV | Fulvestrant | Fusilev (Leucovorin Calcium) |

TABLE 4-continued

| | | | |
|---|---|---|---|
| Gardasil (Recombinant HPV Quadrivalent Vaccine) | Gardasil 9 (Recombinant HPV Nonavalent Vaccine) | Gazyva (Obinutuzumab) | Gefitinib |
| Gemcitabine Hydrochloride | GEMCITABINE-CISPLATIN | GEMCITABINE-OXALIPLATIN | Gemtuzumab Ozogamicin |
| Gemzar (Gemcitabine Hydrochloride) | Gilotrif (Afatinib Dimaleate) | Gleevec (Imatinib Mesylate) | Gliadel Wafer (Carmustine Implant) |
| Glucarpidase | Goserelin Acetate | Granisetron | Granisetron Hydrochloride |
| Granix (Filgrastim) | Halaven (Eribulin Mesylate) | Hemangeol (Propranolol Hydrochloride) | Herceptin (Trastuzumab) |
| HPV Bivalent Vaccine, Recombinant | HPV Nonavalent Vaccine, Recombinant | HPV Quadrivalent Vaccine, Recombinant | Hycamtin (Topotecan Hydrochloride) |
| Hydrea (Hydroxyurea) | Hydroxyurea | Hyper-CVAD | Ibrance (Palbociclib) |
| Ibritumomab Tiuxetan | Ibrutinib | ICE | Iclusig (Ponatinib Hydrochloride) |
| Idarubicin Hydrochloride | Idelalisib | Idhifa (Enasidenib Mesylate) | Ifex (Ifosfamide) |
| Ifosfamide | IL-2 (Aldesleukin) | Imatinib Mesylate | Imbruvica (Ibrutinib) |
| Imfinzi (Durvalumab) | Imiquimod | Imlygic (Talimogene Laherparepvec) | Inlyta (Axitinib) |
| Inotuzumab Ozogamicin | Interferon Alfa-2b, Recombinant | Interleukin-2 (Aldesleukin) | Intron A (Recombinant Interferon Alfa-2b) |
| Iobenguane I 131 | Ipilimumab | Iressa (Gefitinib) | Irinotecan Hydrochloride |
| Irinotecan Hydrochloride Liposome | Istodax (Romidepsin) | Ivosidenib | Ixabepilone |
| Ixazomib Citrate | Ixempra (Ixabepilone) | Jakafi (Ruxolitinib Phosphate) | JEB |
| Jevtana (Cabazitaxel) | Kadcyla (Ado-Trastuzumab Emtansine) | Kepivance (Palifermin) | Keytruda (Pembrolizumab) |
| Kisqali (Ribociclib) | Kymriah (Tisagenlecleucel) | Kyprolis (Carfilzomib) | Lanreotide Acetate |
| Lapatinib Ditosylate | Larotrectinib Sulfate | Lartruvo (Olaratumab) | Lenalidomide |
| Lenvatinib Mesylate | Lenvima (Lenvatinib Mesylate) | Letrozole | Leucovorin Calcium |
| Leukeran (Chlorambucil) | Leuprolide Acetate | Levulan Kerastik (Aminolevulinic Acid) | Libtayo (Cemiplimab-rwlc) |
| LipoDox (Doxorubicin Hydrochloride Liposome) | Lomustine | Lonsurf (Trifluridine and Tipiracil Hydrochloride) | Lorbrena (Lorlatinib) |
| Lorlatinib | Lumoxiti (Moxetumomab Pasudotox-tdfk) | Lupron (Leuprolide Acetate) | Lupron Depot (Leuprolide Acetate) |
| Lutathera (Lutetium Lu 177-Dotatate) | Lutetium (Lu 177-Dotatate) | Lynparza (Olaparib) | Marqibo (Vincristine Sulfate Liposome) |
| Matulane (Procarbazine Hydrochloride) | Mechlorethamine Hydrochloride | Megestrol Acetate | Mekinist (Trametinib) |
| Mektovi (Binimetinib) | Melphalan | Melphalan Hydrochloride | Mercaptopurine |
| Mesna | Mesnex (Mesna) | Methotrexate | Methylnaltrexone Bromide |
| Midostaurin | Mitomycin C | Mitoxantrone Hydrochloride | Mogamulizumab-kpkc |
| Moxetumomab Pasudotox-tdfk | Mozobil (Plerixafor) | Mustargen (Mechlorethamine Hydrochloride) | MVAC |

TABLE 4-continued

| | | | |
|---|---|---|---|
| Myleran (Busulfan) | Mylotarg (Gemtuzumab Ozogamicin) | Nanoparticle Paclitaxel (Paclitaxel Albumin-stabilized Nanoparticle Formulation) | Navelbine (Vinorelbine Tartrate) |
| Necitumumab | Nelarabine | Neratinib Maleate | Nerlynx (Neratinib Maleate) |
| Netupitant and Palonosetron Hydrochloride | Neulasta (Pegfilgrastim) | Neupogen (Filgrastim) | Nexavar (Sorafenib Tosylate) |
| Nilandron (Nilutamide) | Nilotinib | Nilutamide | Ninlaro (Ixazomib Citrate) |
| Niraparib Tosylate Monohydrate | Nivolumab | Nplate (Romiplostim) | Obinutuzumab |
| Odomzo (Sonidegib) | OEPA | Ofatumumab | OFF |
| Olaparib | Olaratumab | Omacetaxine Mepesuccinate | Oncaspar (Pegaspargase) |
| Ondansetron Hydrochloride | Onivyde (Irinotecan Hydrochloride Liposome) | Ontak (Denileukin Diftitox) | Opdivo (Nivolumab) |
| OPPA | Osimertinib | Oxaliplatin | Paclitaxel |
| Paclitaxel Albumin-stabilized Nanoparticle Formulation | PAD | Palbociclib | Palifermin |
| Palonosetron Hydrochloride | Palonosetron Hydrochloride and Netupitant | Pamidronate Disodium | Panitumumab |
| Panobinostat | Pazopanib Hydrochloride | PCV | PEB |
| Pegaspargase | Pegfilgrastim | Peginterferon Alfa-2b | PEG-Intron (Peginterferon Alfa-2b) |
| Pembrolizumab | Pemetrexed Disodium | Perjeta (Pertuzumab) | Pertuzumab |
| Plerixafor | Pomalidomide | Pomalyst (Pomalidomide) | Ponatinib Hydrochloride |
| Portrazza (Necitumumab) | Poteligeo (Mogamulizumab-kpkc) | Pralatrexate | Prednisone |
| Procarbazine Hydrochloride | Procrit (Epoetin Alfa) | Proleukin (Aldesleukin) | Prolia (Denosumab) |
| Promacta (Eltrombopag Olamine) | Propranolol Hydrochloride | Provenge (Sipuleucel-T) | Purinethol (Mercaptopurine) |
| Purixan (Mercaptopurine) | Radium 223 Dichloride | Raloxifene Hydrochloride | Ramucirumab |
| Rasburicase | R-CHOP | R-CVP | Recombinant Human Papillomavirus (HPV) Bivalent Vaccine |
| Recombinant Human Papillomavirus (HPV) Nonavalent Vaccine | Recombinant Human Papillomavirus (HPV) Quadrivalent Vaccine | Recombinant Interferon Alfa-2b | Regorafenib |
| Relistor (Methylnaltrexone Bromide) | R-EPOCH | Retacrit (Epoetin Alfa) | Revlimid (Lenalidomide) |
| Rheumatrex (Methotrexate) | Ribociclib | R-ICE | Rituxan (Rituximab) |
| Rituxan Hycela (Rituximab and Hyaluronidase Human) | Rituximab | Rituximab and Hyaluronidase Human | Rolapitant Hydrochloride |
| Romidepsin | Romiplostim | Rubidomycin (Daunorubicin Hydrochloride) | Rubraca (Rucaparib Camsylate) |
| Rucaparib Camsylate | Ruxolitinib Phosphate | Rydapt (Midostaurin) | Sancuso (Granisetron) |

TABLE 4-continued

| | | | |
|---|---|---|---|
| Sclerosol Intrapleural Aerosol (Talc) | Siltuximab | Sipuleucel-T | Somatuline Depot (Lanreotide Acetate) |
| Sonidegib | Sorafenib Tosylate | Sprycel (Dasatinib) | STANFORD V |
| Sterile Talc Powder (Talc) | Steritalc (Talc) | Stivarga (Regorafenib) | Sunitinib Malate |
| Sustol (Granisetron) | Sutent (Sunitinib Malate) | Sylatron (Peginterferon Alfa-2b) | Sylvant (Siltuximab) |
| Synribo (Omacetaxine Mepesuccinate) | Tabloid (Thioguanine) | TAC | Tafinlar (Dabrafenib) |
| Tagrisso (Osimertinib) | Talc | Talimogene Laherparepvec | Tamoxifen Citrate |
| Tarabine PFS (Cytarabine) | Tarceva (Erlotinib Hydrochloride) | Targretin (Bexarotene) | Tasigna (Nilotinib) |
| Tavalisse (Fostamatinib Disodium) | Taxol (Paclitaxel) | Taxotere (Docetaxel) | Tecentriq (Atezolizumab) |
| Temodar (Temozolomide) | Temozolomide | Temsirolimus | Thalidomide |
| Thalomid (Thalidomide) | Thioguanine | Thiotepa | Tibsovo (Ivosidenib) |
| Tisagenlecleucel | Tocilizumab | Tolak (Fluorouracil-- Topical) | Topotecan Hydrochloride |
| Toremifene | Torisel (Temsirolimus) | Totect (Dexrazoxane Hydrochloride) | TPF |
| Trabectedin | Trametinib | Trastuzumab | Treanda (Bendamustine Hydrochloride) |
| Trexall (Methotrexate) | Trifluridine and Tipiracil Hydrochloride | Trisenox (Arsenic Trioxide) | Tykerb (Lapatinib Ditosylate) |
| Unituxin (Dinutuximab) | Uridine Triacetate | VAC | Valrubicin |
| Valstar (Valrubicin) | Vandetanib | VAMP | Varubi (Rolapitant Hydrochloride) |
| Vectibix (Panitumumab) | VeIP | Velcade (Bortezomib) | Vemurafenib |
| Venclexta (Venetoclax) | Venetoclax | Verzenio (Abemaciclib) | Vidaza (Azacitidine) |
| Vinblastine Sulfate | Vincristine Sulfate | Vincristine Sulfate Liposome | Vinorelbine Tartrate |
| VIP | Vismodegib | Vistogard (Uridine Triacetate) | Vitrakvi (Larotrectinib Sulfate) |
| Vizimpro (Dacomitinib) | Voraxaze (Glucarpidase) | Vorinostat | Votrient (Pazopanib Hydrochloride) |
| Vyxeos (Daunorubicin Hydrochloride and Cytarabine Liposome) | Xalkori (Crizotinib) | Xeloda (Capecitabine) | XELIRI |
| XELOX | Xgeva (Denosumab) | Xofigo (Radium 223 Dichloride) | Xtandi (Enzalutamide) |
| Yervoy (Ipilimumab) | Yescarta (Axicabtagene Ciloleucel) | Yondelis (Trabectedin) | Zaltrap (Ziv- Aflibercept) |
| Zarxio (Filgrastim) | Zejula (Niraparib Tosylate Monohydrate) | Zelboraf (Vemurafenib) | Zevalin (Ibritumomab Tiuxetan) |
| Zinecard (Dexrazoxane Hydrochloride) | Ziv- Aflibercept | Zofran (Ondansetron Hydrochloride) | Zoladex (Goserelin Acetate) |
| Zoledronic Acid | Zolinza (Vorinostat) | Zometa (Zoledronic Acid) | Zydelig (Idelalisib) |
| Zykadia (Ceritinib) | Zytiga (Abiraterone Acetate) | | |

Photothermal Therapy

In one aspect, methods provided herein comprise administering HDAC6-activated macrophages or a composition comprising HDAC6-activated macrophages to a subject in combination with photothermal therapy. Photothermal therapy refers to efforts to use electromagnetic radiation (most often in infrared wavelengths) for the treatment of various medical conditions, including cancer. This approach is an extension of photodynamic therapy, in which a photosensitizer is excited with specific band light. This activation brings the sensitizer to an excited state where it then releases vibrational energy (heat), which is what kills the targeted cells. Unlike photodynamic therapy, photothermal therapy does not require oxygen to interact with the target cells or tissues. Current studies also show that photothermal therapy is able to use longer wavelength light, which is less energetic and therefore less harmful to other cells and tissues.

Most materials of interest currently being investigated for photothermal therapy are on the nanoscale. One of the key reasons behind this is the enhanced permeability and retention effect observed with particles in a certain size range (typically 20-300 nm). Maeda et. al., *Journal of Controlled Release*, 65 (1-2), 271-284 (2000). Molecules in this range have been observed to preferentially accumulate in tumor tissue. When a tumor forms, it requires new blood vessels in order to fuel its growth; these new blood vessels in/near tumors have different properties as compared to regular blood vessels, such as poor lymphatic drainage and a disorganized, leaky vasculature. These factors lead to a significantly higher concentration of certain particles in a tumor as compared to the rest of the body. Coupling this phenomenon with active targeting modalities (e.g., antibodies) has recently been investigated by researchers.

IV. Definitions

The term "HDAC6-activated macrophage" refers to a naïve macrophage that has been treated ex vivo with a selective HDAC6 inhibitor. In another aspect, the HDAC6-activated macrophage is first treated ex vivo with a selective HDAC6 inhibitor and then treated ex vivo with a macrophage polarizing agent and/or tumor antigen. In another aspect, the HDAC6-activated macrophage is first treated ex vivo with a macrophage polarizing agent and/or tumor antigen and then treated ex vivo with a selective HDAC6 inhibitor.

The terms "selective HDAC6 inhibitor," "HDAC6 selective inhibitor," and the like as used herein refer to a compound that preferentially inhibits histone deacetylase 6 over one or more other histone deacetylase isoforms, e.g., HDAC1, HDAC2, HDAC3, HDAC4, HDAC5, HDAC7, HDAC8, HDAC9, HDAC10, and/or HDAC11, in a cell-based in vitro assay. For example, a compound having a HDAC6 $IC_{50}$=5 nM and a HDAC1 $IC_{50}$ of 500 nM is a selective HDAC6 inhibitor that is 100-fold more selective over HDAC1; a compound having a HDAC6 $IC_{50}$=5 nM, a HDAC1 $IC_{50}$=500 nM, and a HDAC3 $IC_{50}$=50 nM is a selective HDAC6 inhibitor that is 100-fold more selective over HDAC1 and 10-fold more selective over HDAC3; and so on. In one aspect, the selective HDAC6 inhibitor preferentially inhibits HDAC6 over HDAC1. In another aspect, the selective HDAC6 inhibitor preferentially inhibits HDAC6 over HDAC1 and one or more other HDAC isoforms.

In one aspect, the selective HDAC6 inhibitor is at least about 5-fold more selective over one or more other HDAC isoforms. In another aspect, the selective HDAC6 inhibitor is at least about 10-fold more selective over one or more other HDAC isoforms. In another aspect, the selective HDAC6 inhibitor is at least about 15-fold more selective over one or more other HDAC isoforms. In another aspect, the selective HDAC6 inhibitor is at least about 20-fold more selective over one or more other HDAC isoforms. In another aspect, the selective HDAC6 inhibitor is at least about 30-fold more selective over one or more other HDAC isoforms. In another aspect, the selective HDAC6 inhibitor is at least about 40-fold more selective over one or more other HDAC isoforms. In another aspect, the selective HDAC6 inhibitor is at least about 50-fold more selective over one or more other HDAC isoforms. In another aspect, the selective HDAC6 inhibitor is at least about 100-fold more selective over one or more other HDAC isoforms. In another aspect, the selective HDAC6 inhibitor is at least about 150-fold more selective over one or more other HDAC isoforms. In another aspect, the selective HDAC6 inhibitor is at least about 200-fold more selective over one or more other HDAC isoforms. In another aspect, the selective HDAC6 inhibitor is at least about 250-fold more selective over one or more other HDAC isoforms. In another aspect, the selective HDAC6 inhibitor is at least about 500-fold more selective over one or more other HDAC isoforms. In another aspect, the selective HDAC6 inhibitor is at least about 750-fold more selective over one or more other HDAC isoforms. In another aspect, the selective HDAC6 inhibitor is at least about 1000-fold more selective over one or more other HDAC isoforms. In another aspect, the selective HDAC6 inhibitor is at least about 2000-fold more selective over one or more other HDAC isoforms. In another aspect, the selective HDAC6 inhibitor is at least about 3000-fold more selective over one or more other HDAC isoforms. HDAC6 selectivity over the other HDAC isoforms in cell-based assays can be determined using methods known in the art.

In another aspect, the selective HDAC6 inhibitor is at about 10-fold to about 3000-fold more selective over one or more other HDAC isoforms. In another aspect, the selective HDAC6 inhibitor is at about 20-fold to about 3000-fold more selective over one or more other HDAC isoforms. In another aspect, the selective HDAC6 inhibitor is at about 50-fold to about 3000-fold more selective over one or more other HDAC isoforms. In another aspect, the selective HDAC6 inhibitor is at about 100-fold to about 3000-fold more selective over one or more other HDAC isoforms. In another aspect, the selective HDAC6 inhibitor is at about 500-fold to about 3000-fold more selective over one or more other HDAC isoforms.

In one aspect, HDAC6 selectivity is determined using an isolated human, recombinant full-length HDAC from a baculovirus expression system in Sf9 cells. An acetylated fluorogenic peptide is used as the substrate depending on the HDAC isoform that is being tested, e.g., one derived from residues 379-382 of p53. See http://www.reactionbiology-.com/webapps/site/HDACAssay.aspx?page=HDACs&id=-%203. The reaction buffer is made up of 50 mM Tris-HCl pH 8.0, 127 mM NaCl, 2.7 mM KCl, 1 mM $MgCl_2$, 1 mg/mL BSA, and a final concentration of 1% DMSO. The test compound is delivered in DMSO to the enzyme mixture with a pre-incubation of 5-10 min followed by substrate addition and incubation for 2 h at 30° C. Trichostatin A and developer are added to quench the reaction and generate fluorescence, respectively. A dose-response curve is generated and the $IC_{50}$ value is determined from the resulting plot. See Bergman et al., *J Med Chem.* 55:9891-9899 (2012). The selective HDAC6 inhibitor is meant to include the parent compound and any pharmaceutically acceptable salts or solvates thereof.

In one aspect, the selective HDAC6 inhibitor is a compound disclosed in Shen and Kozikowski, *Expert Opinion on Therapeutic Patents* 30:121-136 (2020).

In another aspect, the selective HDAC6 inhibitor is a compound disclosed in Bergman et al., *J Med Chem.* 55:9891-9899 (2012).

In another aspect, the selective HDAC6 inhibitor is a compound disclosed in WO 2014072714.

In another aspect, the selective HDAC6 inhibitor is a compound disclosed in WO 2016067040.

In another aspect, the selective HDAC6 inhibitor is a compound disclosed in WO 2016190630.

In another aspect, the selective HDAC6 inhibitor is a compound disclosed in WO 2019139921.

In another aspect, the selective HDAC6 inhibitor is a compound disclosed in US 20150239869.

In another aspect, the selective HDAC6 inhibitor is a compound disclosed in WO 2015054474.

In another aspect, the selective HDAC6 inhibitor is a compound disclosed in WO 2017075192.

In another aspect, the selective HDAC6 inhibitor is a compound disclosed in WO 2018089651.

In another aspect, the selective HDAC6 inhibitor is a compound disclosed in WO 2014181137.

In another aspect, the selective HDAC6 inhibitor is a compound disclosed in WO 2016067038.

In another aspect, the selective HDAC6 inhibitor is a compound disclosed in WO 2017208032.

In another aspect, the selective HDAC6 inhibitor is a compound disclosed in WO 2016168598.

In another aspect, the selective HDAC6 inhibitor is a compound disclosed in WO 2016168660.

In another aspect, the selective HDAC6 inhibitor is a compound disclosed in WO 2017218950.

In another aspect, the selective HDAC6 inhibitor is a compound disclosed in US 20160221973.

In another aspect, the selective HDAC6 inhibitor is a compound disclosed in US 20160222022.

In another aspect, the selective HDAC6 inhibitor is a compound disclosed in US 20160221997.

In another aspect, the selective HDAC6 inhibitor is a compound disclosed in WO 2014178606.

In another aspect, the selective HDAC6 inhibitor is a compound disclosed in WO 2015087151.

In another aspect, the selective HDAC6 inhibitor is a compound disclosed in WO 2015102426.

In another aspect, the selective HDAC6 inhibitor is a compound disclosed in WO 2015137750.

In another aspect, the selective HDAC6 inhibitor is a compound disclosed in WO 2018189340.

In another aspect, the selective HDAC6 inhibitor is a compound disclosed in WO 2018130155.

In another aspect, the selective HDAC6 inhibitor is a compound disclosed in WO 2017222950.

In another aspect, the selective HDAC6 inhibitor is a compound disclosed in WO 2017222951.

In another aspect, the selective HDAC6 inhibitor is a compound disclosed in WO 2017222952.

In another aspect, the selective HDAC6 inhibitor is a compound disclosed in WO 2016031815.

In another aspect, the selective HDAC6 inhibitor is a compound disclosed in WO 2017014170.

In another aspect, the selective HDAC6 inhibitor is a compound disclosed in WO 2017014321.

In another aspect, the selective HDAC6 inhibitor is a compound disclosed in WO 2017033946.

In another aspect, the selective HDAC6 inhibitor is a compound disclosed in WO 2019027054.

In another aspect, the selective HDAC6 inhibitor is a compound disclosed in WO 2019166824.

In another aspect, the selective HDAC6 inhibitor is a compound disclosed in WO 2019110663.

In another aspect, the selective HDAC6 inhibitor is a compound disclosed in WO 2017018803.

In another aspect, the selective HDAC6 inhibitor is a compound disclosed in WO 2017018805.

In another aspect, the selective HDAC6 inhibitor is a compound disclosed in WO 2017023133.

In another aspect, the selective HDAC6 inhibitor is a compound disclosed in WO 2017065473.

In another aspect, the selective HDAC6 inhibitor is a compound disclosed in WO 2018183701.

In another aspect, the selective HDAC6 inhibitor is a compound having Formula V:

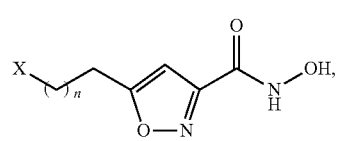

wherein:

X is selected from the group consisting of:

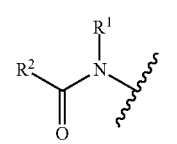

X-1

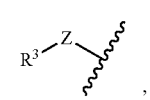

X-2

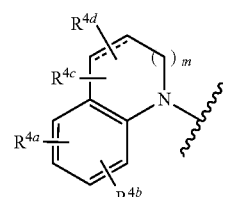

X-3

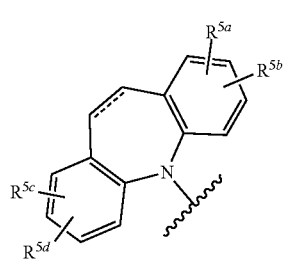

X-4 and

-continued

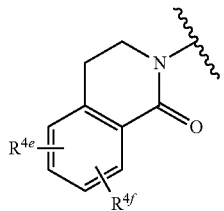

X-5

$R^1$ is selected from the group consisting of hydrogen and $C_{1-4}$ alkyl;

$R^2$ is selected from the group consisting of optionally substituted $C_6$-$C_{14}$ aryl and aralkyl;

$R^3$ is selected from the group consisting of optionally substituted $C_6$-$C_{14}$ aryl, optionally substituted 5- to 14-membered heteroaryl, and —C(=O)NR$^d$R$^e$;

$R^{4a}$, $R^{4b}$, $R^{4e}$, and $R^{4f}$ are independently selected from the group consisting of hydrogen, halogen, hydroxy, nitro, cyano, —NR$^a$R$^b$, —C(=O)NR$^a$R$^b$, —C(=O)R$^c$, $C_{1-6}$ alkyl, $C_{2-6}$ alkenyl, $C_{2-6}$ alkynyl, $C_{1-6}$ alkoxy, $C_{1-6}$ haloalkyl, and haloalkoxy;

$R^{4c}$ and $R^{4d}$ are independently selected from the group consisting of hydrogen and $C_{1-4}$ alkyl; or $R^{4c}$ and $R^{4d}$ taken together form a —C(=O)— with the carbon atom to which they are attached;

$R^{5a}$, $R^{5b}$, $R^{5c}$, and $R^{5d}$ are independently selected from the group consisting of hydrogen, halogen, hydroxy, nitro, cyano, —NR$^a$R$^b$, —C(=O)NR$^a$R$^b$, —C(=O)R$^c$, $C_{1-6}$ alkyl, $C_{2-6}$ alkenyl, $C_{2-6}$ alkynyl, $C_{1-6}$ alkoxy, $C_{1-6}$ haloalkyl, and haloalkoxy;

Z is selected from the group consisting of —O—, —N(R$^8$)—, and —C(=O)—; or

Z is absent;

$R^8$ is selected from the group consisting of hydrogen, $C_{1-4}$ alkyl, optionally substituted $C_{3-6}$ cycloalkyl, optionally substituted $C_6$-$C_{14}$ aryl, aralkyl, optionally substituted 5- to 14-membered heteroaryl, and heteroaralkyl;

m is 0, 1, or 2;

n is 1, 2, 3, 4, 5, or 6;

==== represents a single or double bond;

$R^a$, $R^b$, $R^d$, and $R^e$ are independently selected from the group consisting of hydrogen, $C_{1-6}$ alkyl, optionally substituted $C_{3-6}$ cycloalkyl, optionally substituted $C_6$-$C_{14}$ aryl, optionally substituted 5- to 14-membered heteroaryl; or $R^a$ and $R^b$ taken together with the nitrogen atom to which they are attached form an optionally substituted 3- to 12-membered heterocyclo;

$R^d$ and $R^e$ taken together with the nitrogen atom to which they are attached form an optionally substituted 3- to 12-membered heterocyclo; and $R^c$ is $C_{1-4}$ alkyl.

In another aspect, the selective HDAC6 inhibitor is a compound having Formula V, and the pharmaceutically acceptable salts, and solvates thereof, with the proviso that when Z is absent, $R^3$ is a bicyclic or tricyclic $C_{10-14}$ aryl, a bicyclic or tricyclic 9- to 14-membered heteroaryl, or —C(=O)NR$^d$R$^e$.

In another aspect, the selective HDAC6 inhibitor is a compound having Formula V, and the pharmaceutically acceptable salts, and solvates thereof, wherein X is X-1, X-2, X-3, or X-4;

Z is —O—;

$R^1$ is selected from the group consisting of hydrogen and $C_{1-4}$ alkyl;

$R^2$ is optionally substituted $C_6$-$C_{14}$ aryl;

$R^3$ is selected from the group consisting of optionally substituted $C_6$-$C_{14}$ aryl and optionally substituted 5- to 14-membered heteroaryl;

$R^{4a}$ and $R^{4b}$ are independently selected from the group consisting of hydrogen, halogen, hydroxy, nitro, cyano, —NR$^a$R$^b$, —C(=O)NR$^a$R$^b$, —C(=O)R$^c$, $C_{1-6}$ alkyl, $C_{2-6}$ alkenyl, $C_{2-6}$ alkynyl, $C_{1-6}$ alkoxy, $C_{1-6}$ haloalkyl, and haloalkoxy;

$R^{4c}$ and $R^{4d}$ are independently selected from the group consisting of hydrogen and $C_{1-4}$ alkyl;

$R^{5a}$, $R^{5b}$, $R^{5c}$, and $R^{5d}$ are independently selected from the group consisting of hydrogen, halogen, hydroxy, nitro, cyano, —NR$^a$R$^b$, —C(=O)NR$^a$R$^b$, —C(=O)R$^c$, $C_{1-6}$ alkyl, $C_{2-6}$ alkenyl, $C_{2-6}$ alkynyl, $C_{1-6}$ alkoxy, $C_{1-6}$ haloalkyl, and haloalkoxy;

$R^a$ and $R^b$ are independently selected from the group consisting of hydrogen and $C_{1-6}$ alkyl; or $R^a$ and $R^b$ taken together with the nitrogen atom to which they are attached form a 3- to 7-membered heterocyclo; and $R^c$ is $C_{1-4}$ alkyl.

In another aspect, the selective HDAC6 inhibitor is a compound having Formula V, wherein X is X-1. In another aspect, $R^1$ is hydrogen. In another aspect, $R^2$ is optionally substituted phenyl. In another aspect, $R^2$ is optionally substituted 1-naphthyl. In another aspect, $R^2$ is optionally substituted 2-naphthyl. In another aspect, $R^2$ is aralkyl.

In another aspect, the selective HDAC6 inhibitor is a compound having Formula V, wherein X is X-2. In another aspect, Z is —O—. In another aspect, Z is —N(R$^8$)—. In another aspect, Z is —C(=O)—. In another aspect, $R^3$ is optionally substituted $C_6$-$C_{14}$ aryl. In another aspect, $R^3$ is optionally substituted 5- to 14-membered heteroaryl. In another aspect, $R^3$ is —C(=O)NR$^d$R$^e$. In another aspect, Z is absent and $R^3$ is a bicyclic or tricyclic $C_{10-14}$ aryl, a bicyclic or tricyclic 9- to 14-membered heteroaryl, or —C(=O)NR$^d$R$^e$.

In another aspect, the selective HDAC6 inhibitor is a compound having Formula V, wherein X is X-3.

In another aspect, the selective HDAC6 inhibitor is a compound having Formula V, wherein X is X-4.

In another aspect, the selective HDAC6 inhibitor is a compound having Formula V, wherein X is X-5.

In another aspect, the selective HDAC6 inhibitor is a compound having Formula I:

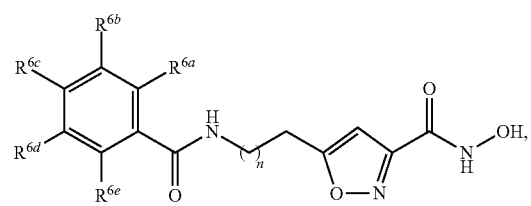

I or a pharmaceutically acceptable salt thereof, wherein:

$R^{6a}$, $R^{6b}$, $R^{6c}$, $R^{6d}$, and $R^{6e}$ are each independently selected from the group consisting of hydrogen, halogen, hydroxy, nitro, cyano, —NR$^a$R$^b$, —C(=O) NR$^a$R$^b$, —C(=O)R$^e$, $C_{1-6}$ alkyl, $C_{2-6}$ alkenyl, $C_{2-6}$ alkynyl, $C_{1-6}$ alkoxy, $C_{1-6}$ haloalkyl, haloalkoxy, optionally substituted $C_{3-6}$ cycloalkyl, optionally substituted phenyl, optionally substituted 5- or 6-membered heteroaryl, and optionally substituted 5- or 6-membered heterocyclo;

$R^a$ and $R^b$ are independently selected from the group consisting of hydrogen and $C_{1-4}$ alkyl; or $R^a$ and $R^b$ taken together with the nitrogen atom to which they are attached form a 3- to 7-membered heterocyclo;

$R^c$ is $C_{1-4}$ alkyl; and n is 1, 2, or 3.

In another aspect, the selective HDAC6 inhibitor is a compound having Formula I, wherein $R^{6a}$, $R^{6b}$, $R^{6c}$, $R^{6d}$, and $R^{6e}$ are each independently selected from the group consisting of hydrogen, halogen, hydroxy, nitro, cyano, $-NR^aR^b$, $-C(=O)NR^aR^b$, $-C(=O)R^c$, $C_{1-4}$ alkyl, $C_{1-4}$ alkoxy, and $C_{1-4}$ haloalkyl. In another aspect, $R^{6a}$, $R^{6b}$, $R^{6c}$, $R^{6d}$, and $R^{6e}$ are each independently selected from the group consisting of hydrogen, halogen, cyano, $C_{1-4}$ alkyl, and $C_{1-4}$ alkoxy.

In another aspect, the selective HDAC6 inhibitor is a compound having Formula I, wherein n is 1. In another aspect, n is 2. In another aspect, n is 3.

In another aspect, the selective HDAC6 inhibitor is a compound having Formula II:

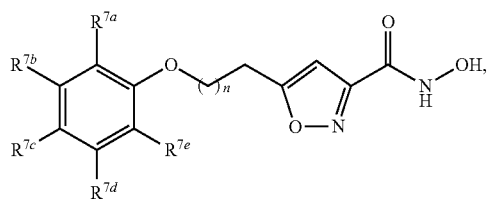

II or a pharmaceutically acceptable salt thereof, wherein:

$R^{7a}$, $R^{7b}$, $R^{7c}$, $R^{7d}$, and $R^{7e}$ are each independently selected from the group consisting of hydrogen, halogen, hydroxy, nitro, cyano, $-NR^aR^b$, $-C(=O)NR^aR^b$, $-C(=O)R^c$, $C_{1-6}$ alkyl, $C_{2-6}$ alkenyl, $C_{2-6}$ alkynyl, $C_{1-6}$ alkoxy, $C_{1-6}$ haloalkyl, haloalkoxy, optionally substituted $C_{3-6}$ cycloalkyl, optionally substituted phenyl, optionally substituted 5- or 6-membered heteroaryl, and optionally substituted 5- or 6-membered heterocyclo;

$R^a$ and $R^b$ are independently selected from the group consisting of hydrogen and $C_{1-4}$ alkyl; or $R^a$ and $R^b$ taken together with the nitrogen atom to which they are attached form a 3- to 7-membered heterocyclo;

$R^c$ is $C_{1-4}$ alkyl; and n is 1, 2, or 3.

In another aspect, the selective HDAC6 inhibitor is a compound having Formula II, wherein $R^{7a}$, $R^{7b}$, $R^{7c}$, $R^{7d}$, and $R^{7e}$ are each independently selected from the group consisting of hydrogen, halogen, hydroxy, nitro, cyano, $-NR^aR^b$, $-C(=O)NR^aR^b$, $-C(=O)R^c$, $C_{1-4}$ alkyl, $C_{1-4}$ alkoxy, and $C_{1-4}$ haloalkyl. In another aspect, $R^{7a}$, $R^{7b}$, $R^{7c}$, $R^{7d}$, and $R^{7e}$ are each independently selected from the group consisting of hydrogen, halogen, cyano, $C_{1-4}$ alkyl, and $C_{1-4}$ alkoxy.

In another aspect, the selective HDAC6 inhibitor is a compound having Formula II, wherein n is 1. In another aspect, n is 2. In another aspect, n is 3.

In another aspect, the selective HDAC6 inhibitor is a compound having Formula III:

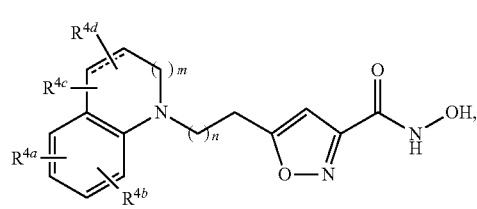

III or a pharmaceutically acceptable salt thereof, wherein:

$R^{4a}$ and $R^{4b}$ are independently selected from the group consisting of hydrogen, halogen, cyano, $C_{1-4}$ alkyl, and $C_{1-4}$ alkoxy;

$R^{4c}$ and $R^{4d}$ are independently selected from the group consisting of hydrogen and methyl;

m is 0 or 1;

n is 1, 2, or 3; and

==== represents a single or double bond.

In another aspect, the selective HDAC6 inhibitor is a compound having Formula III, wherein m is 0 and ==== represents a double bond.

In another aspect, the selective HDAC6 inhibitor is a compound having Formula III, wherein m is 1 and ==== represents a single bond.

In another aspect, the selective HDAC6 inhibitor is a compound having Formula III, wherein n is 1. In another aspect, n is 2. In another aspect, n is 3.

In another aspect, the selective HDAC6 inhibitor is a compound having Formula IV:

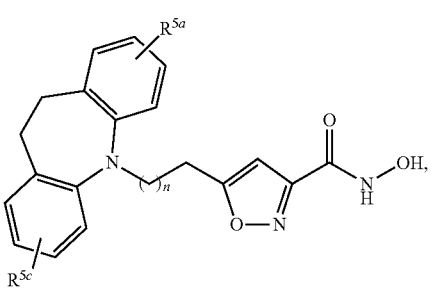

IV or a pharmaceutically acceptable salt thereof, wherein:

$R^{5a}$ and $R^{5c}$ are independently selected from the group consisting of hydrogen, halogen, cyano, $C_{1-4}$ alkyl, and $C_{1-4}$ alkoxy; and n is 1, 2, or 3.

In another aspect, the selective HDAC6 inhibitor is a compound having Formula IV, wherein n is 1. In another aspect, n is 2. In another aspect, n is 3.

In another aspect, the selective HDAC6 inhibitor is a compound of Table 1, or a pharmaceutically acceptable salt thereof.

TABLE 1

| Compound | Name of Compound | Structure |
|---|---|---|
| 1 | Nexturastat A (NextA) | |
| 2 | ACY-1215 | |
| 3 | ACY-241 | |
| 4 | ACY-738 | |
| 5 | ACY-775 | |
| 6 | Tubastatin A | |

TABLE 1-continued

| Compound | Name of Compound | Structure |
|---|---|---|
| 7 | Benzimidazole 23d | |
| 8 | SW-100 | |
| 9 | W-2 | |
| 10 | 5-Aroylindole 6 | |
| 11 | MPT0G211 | |
| 12 | | |
| 13 | | |

TABLE 1-continued

| Compound | Name of Compound | Structure |
|---|---|---|
| 14 | | |
| 15 | SP-2-225 | |
| 16 | ACY-1083 | |
| 17 | | |
| 18 | | |
| 19 | | |

TABLE 1-continued
| Compound | Name of Compound | Structure |
|---|---|---|
| 20 | | 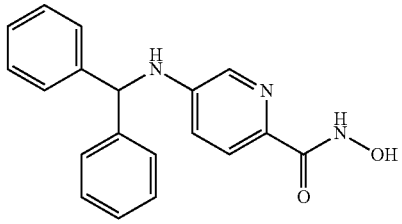 [SMILES: O=C(NO)c1ccc(NC(c2ccccc2)c2ccccc2)cn1] |
| 21 | | 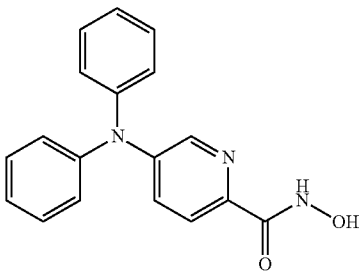 [SMILES: O=C(NO)c1ccc(N(c2ccccc2)c2ccccc2)cn1] |
| 22 | | 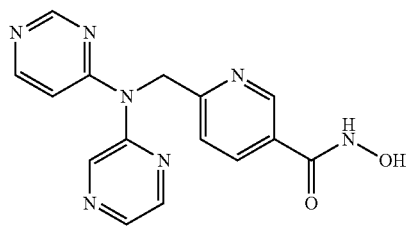 [SMILES: O=C(NO)c1ccc(CN(c2ccncn2)c2cnccn2)nc1] |
| 23 | | 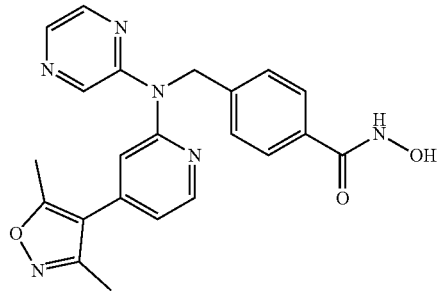 [SMILES: Cc1noc(C)c1-c1ccnc(N(Cc2ccc(C(=O)NO)cc2)c2cnccn2)c1] |
| 24 | | 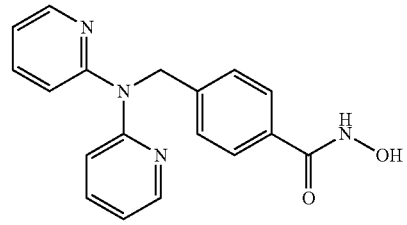 [SMILES: O=C(NO)c1ccc(CN(c2ccccn2)c2ccccn2)cc1] |
| 25 | | 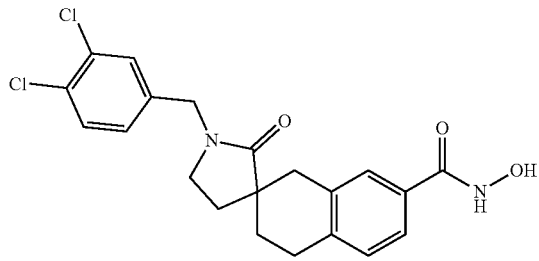 [SMILES: O=C(NO)c1ccc2c(c1)CC1(CC2)CCN(Cc2ccc(Cl)c(Cl)c2)C1=O] |

TABLE 1-continued
| Compound | Name of Compound | Structure |
|---|---|---|
| 26 | | 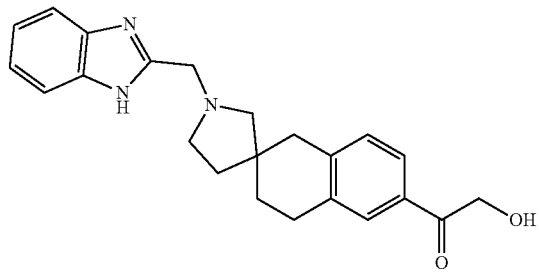 [SMILES: O=C(CO)c1ccc2c(c1)CCC1(CCN(Cc3nc4ccccc4[nH]3)C1)C2] |
| 27 | | 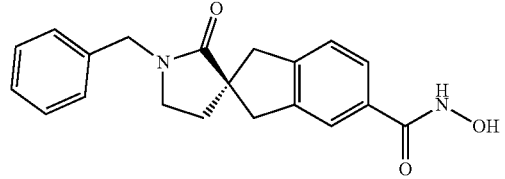 [SMILES: O=C(NO)c1ccc2c(c1)C[C@]1(CCN(Cc3ccccc3)C1=O)C2] |
| 28 | | 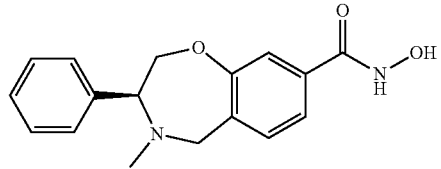 [SMILES: CN1Cc2ccc(C(=O)NO)cc2OC[C@@H]1c1ccccc1] |
| 29 | | 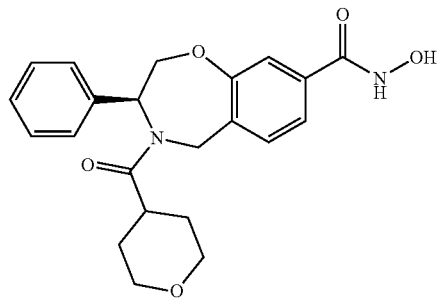 [SMILES: O=C(NO)c1ccc2c(c1)OC[C@H](c1ccccc1)N(C(=O)C1CCOCC1)C2] |
| 30 | | 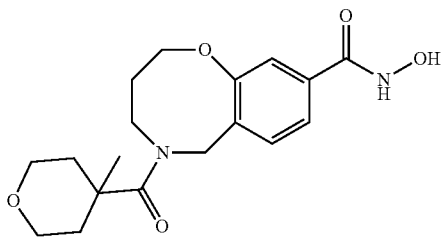 [SMILES: CC1(C(=O)N2CCCOc3cc(C(=O)NO)ccc3C2)CCOCC1] |
| 31 | | 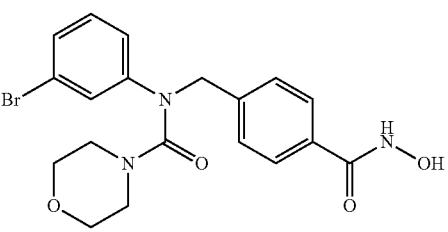 [SMILES: O=C(NO)c1ccc(CN(C(=O)N2CCOCC2)c2cccc(Br)c2)cc1] |

TABLE 1-continued
| Compound | Name of Compound | Structure |
|---|---|---|
| 32 | | 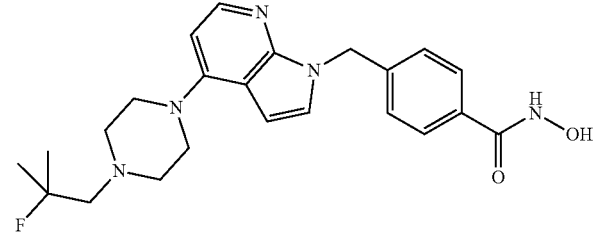 [SMILES: CC(C)(F)CN1CCN(c2ccnc3c2ccn3Cc2ccc(C(=O)NO)cc2)CC1] |
| 33 | | 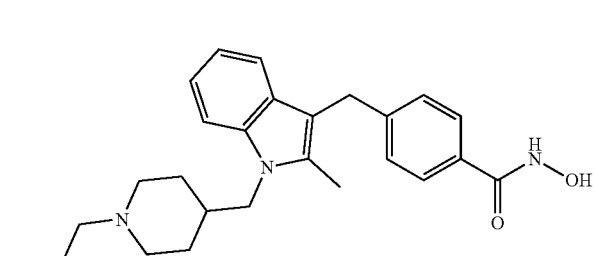 |
| 34 | | 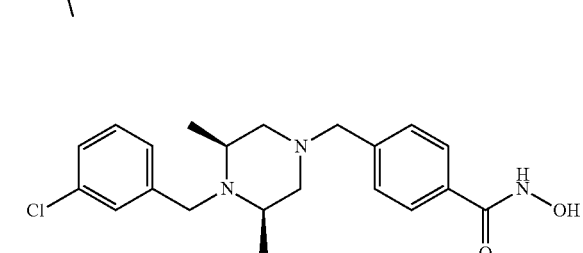 |
| 35 | | 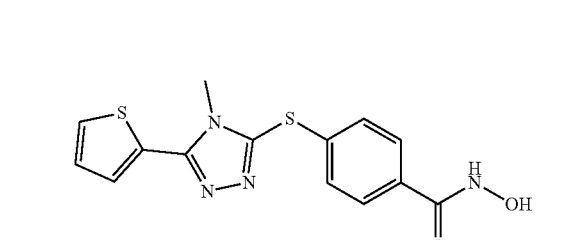 |
| 36 | | 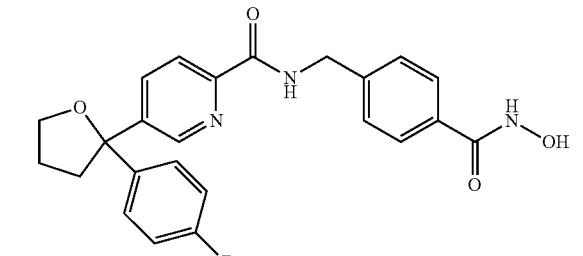 |
| 37 | | 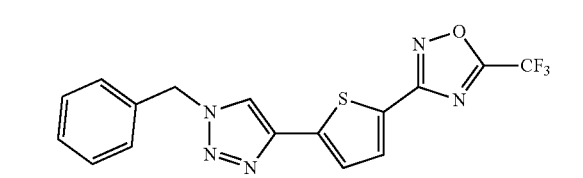 [SMILES: FC(F)(F)c1nc(-c2ccc(-c3cn(Cc4ccccc4)nn3)s2)no1] |

TABLE 1-continued

| Compound | Name of Compound | Structure |
|---|---|---|
| 38 | | |
| 39 | | |
| 40 | | |
| 41 | | |
| 42 | | |

TABLE 1-continued

| Compound | Name of Compound | Structure |
|---|---|---|
| 43 | | |
| 44 | | |
| 45 | | |
| 46 | | |
| 47 | | |

TABLE 1-continued

| Compound | Name of Compound | Structure |
|---|---|---|
| 48 | | |
| 49 | | |
| 50 | | |
| 51 | | |
| 52 | | |
| 53 | | |

TABLE 1-continued

| Compound | Name of Compound | Structure |
|---|---|---|
| 54 | | |
| 55 | SS-1-100 | |
| 56 | SS-2-08 | |
| 57 | SS-3-66 | |
| 58 | SS-3-67 | |
| 59 | SS-3-94 | |
| 60 | SS-4-01 | |

TABLE 1-continued
| Compound | Name of Compound | Structure |
|---|---|---|
| 61 | SS-4-02 | 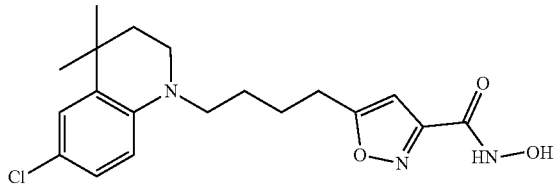 [SMILES: CC1(C)CCN(CCCCc2cc(C(=O)NO)no2)c2ccc(Cl)cc21] |
| 62 | SS-4-10 | 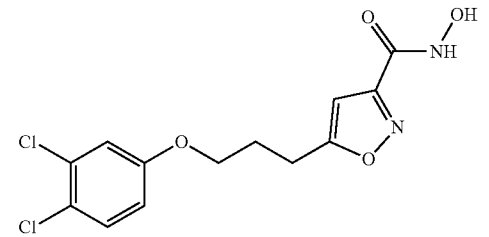 [SMILES: O=C(NO)c1cc(CCCOc2ccc(Cl)c(Cl)c2)on1] |
| 63 | SS-1-54 | 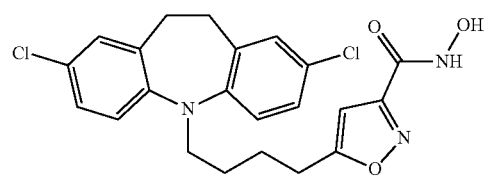 [SMILES: O=C(NO)c1cc(CCCCN2c3ccc(Cl)cc3CCc3cc(Cl)ccc32)on1] |
| 64 | | 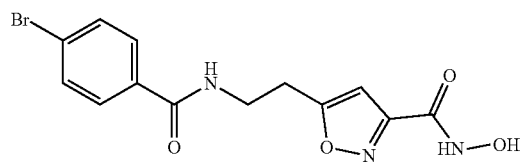 |
| 65 | | 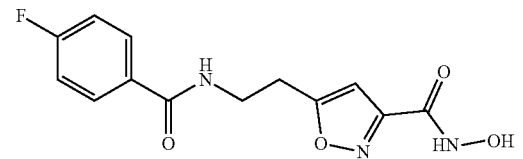 [SMILES: O=C(NCCc1cc(C(=O)NO)no1)c1ccc(F)cc1] |
| 66 | | 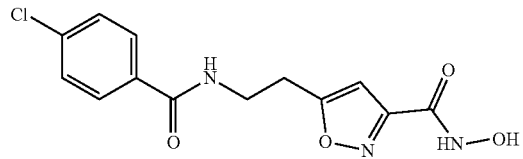 [SMILES: O=C(NCCc1cc(C(=O)NO)no1)c1ccc(Cl)cc1] |
| 67 | | 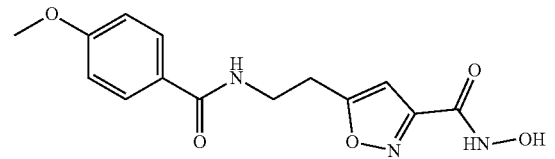 [SMILES: COc1ccc(C(=O)NCCc2cc(C(=O)NO)no2)cc1] |
| 68 | | 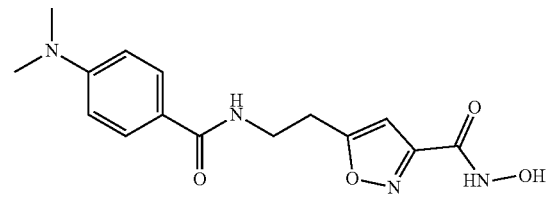 [SMILES: CN(C)c1ccc(C(=O)NCCc2cc(C(=O)NO)no2)cc1] |

TABLE 1-continued

| Compound | Name of Compound | Structure |
|---|---|---|
| 69 | | |
| 70 | | |
| 71 | | |
| 72 | | |
| 73 | | |
| 74 | | |
| 75 | | |
| 76 | | |

TABLE 1-continued
| Compound | Name of Compound | Structure |
|---|---|---|
| 77 | | 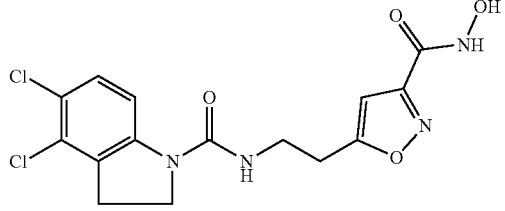 [SMILES: O=C(NO)c1cc(CCNC(=O)N2CCc3c2ccc(Cl)c3Cl)on1] |
| 78 | | 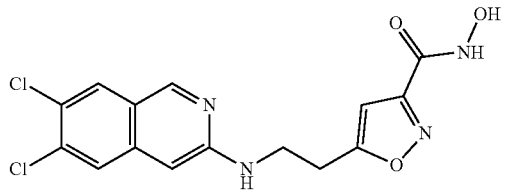 [SMILES: O=C(NO)c1cc(CCNc2cc3cc(Cl)c(Cl)cc3cn2)on1] |
| 79 | | 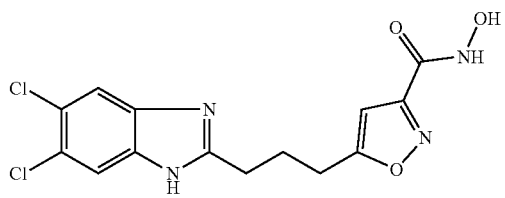 [SMILES: O=C(NO)c1cc(CCCc2nc3cc(Cl)c(Cl)cc3[nH]2)on1] |
| 80 | | 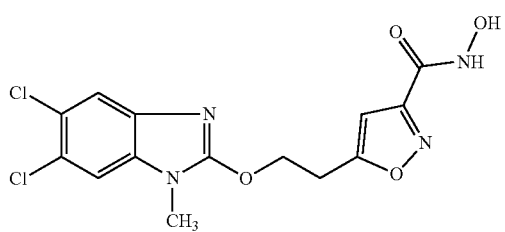 [SMILES: Cn1c(OCCc2cc(C(=O)NO)no2)nc2cc(Cl)c(Cl)cc21] |
| 81 | | 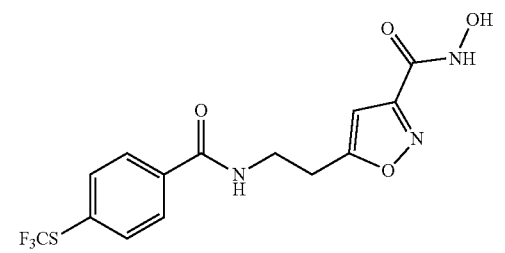 |
| 82 | | 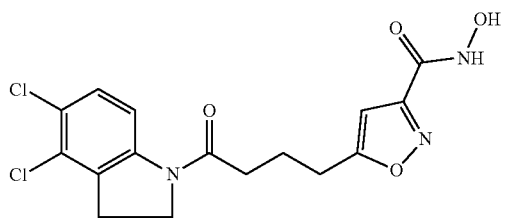 [SMILES: O=C(NO)c1cc(CCCC(=O)N2CCc3c2ccc(Cl)c3Cl)on1] |
| 83 | | 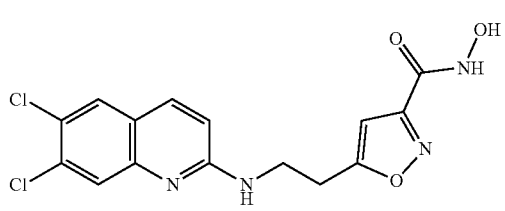 [SMILES: O=C(NO)c1cc(CCNc2ccc3cc(Cl)c(Cl)cc3n2)on1] |

TABLE 1-continued

| Compound | Name of Compound | Structure |
|---|---|---|
| 84 | | |
| 85 | | |
| 86 | | |
| 87 | | |
| 88 | | |
| 89 | | |
| 90 | | |

TABLE 1-continued
| Compound | Name of Compound | Structure |
|---|---|---|
| 91 | | 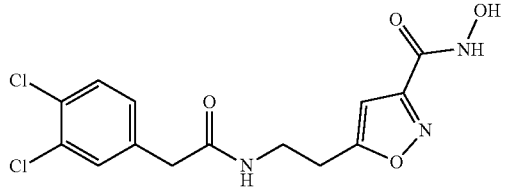 [SMILES: O=C(Cc1ccc(Cl)c(Cl)c1)NCCc1cc(C(=O)NO)no1] |
| 92 | | 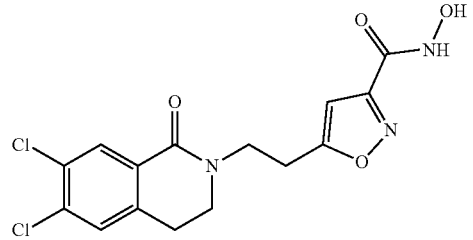 [SMILES: O=C(NO)c1cc(CCN2CCc3cc(Cl)c(Cl)cc3C2=O)on1] |
| 93 | | 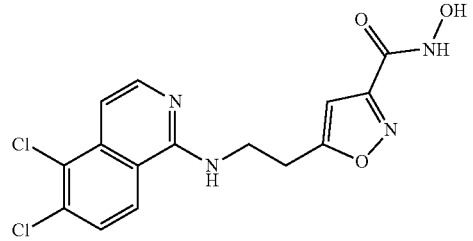 [SMILES: O=C(NO)c1cc(CCNc2nccc3c(Cl)c(Cl)ccc23)on1] |
| 94 | | 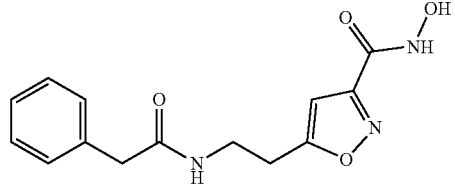 [SMILES: O=C(Cc1ccccc1)NCCc1cc(C(=O)NO)no1] |
| 95 | | 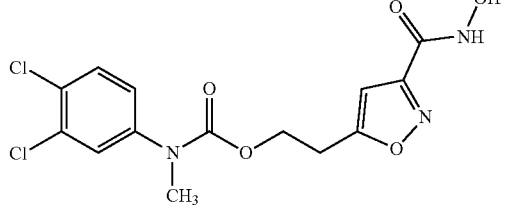 |
| 96 | | 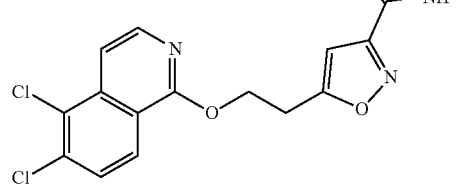 |
| 97 | | 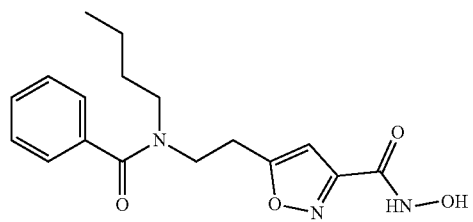 [SMILES: CCCCN(CCc1cc(C(=O)NO)no1)C(=O)c1ccccc1] |

TABLE 1-continued

| Compound | Name of Compound | Structure |
|---|---|---|
| 98 | | |
| 99 | | |
| 100 | | |
| 101 | | |
| 102 | | |
| 103 | | |
| 104 | | |

TABLE 1-continued

| Compound | Name of Compound | Structure |
|---|---|---|
| 105 | | |
| 106 | | |
| 107 | | |
| 108 | Tubacin | |
| 109 | | |
| 110 | | |

TABLE 1-continued

| Compound | Name of Compound | Structure |
|---|---|---|
| 111 | | |
| 112 | | |
| 113 | CAY 10603 | |
| 114 | | |
| 115 | | |
| 116 | | |

TABLE 1-continued

| Compound | Name of Compound | Structure |
|---|---|---|
| 117 | | |
| 118 | | |
| 119 | | |
| 120 | | |
| 121 | | |

TABLE 1-continued

| Compound | Name of Compound | Structure |
|---|---|---|
| 122 | | |
| 123 | | |
| 124 | | |
| 125 | | |
| 126 | | |

TABLE 1-continued

| Compound | Name of Compound | Structure |
|---|---|---|
| 127 | | |
| 128 | | |
| 129 | | |
| 130 | | |
| 131 | | |
| 132 | | |
| 133 | | |

TABLE 1-continued

| Compound | Name of Compound | Structure |
|---|---|---|
| 134 | | |
| 135 | | |
| 136 | | |
| 137 | | |
| 138 | | |

TABLE 1-continued

| Compound | Name of Compound | Structure |
|---|---|---|
| 139 | | |
| 140 | | |
| 141 | HPOB | |
| 142 | MPT0G413 | |
| 143 | CKD-506 | |
| 144 | WT161 | |
| 145 | KA2507 | |

In the present disclosure, the term "macrophage polarizing agent" as used herein refers to an agent that polarizes a macrophage. Macrophage polarization is a process by which macrophages adopt different functional programs in response to the signals from their microenvironment. The polarization of macrophages can give a diverse heterogenic function and phenotypes depending on their activation in respect to their duration of stimulation and spatial localization. Non-limiting exemplary macrophage polarizing agent include, but are not limited to, lipopolysaccharide (LPS), interferon-gamma (IFN-γ), interleukin-2, interleukin-3, interleukin-4, interleukin-5, interleukin-6, interleukin-10, interleukin-12, interleukin-13, interleukin-18, interleukin-23, transforming growth factor beta (TGF-β), glucocorticoids, lipoteichoic acid (LTA), granulocyte-macrophage colony-stimulating factor (GM-CSF), tumor necrosis factor (TNF), immune complexes (IC), interleukin-β, adenosines, or the combination thereof. See, e.g., Rubio et al., *Clinical and Translational Oncology* 21:391-403 (2019).

In the present disclosure, the term "tumor antigen" as used herein refers to an antigenic substance that can be produced in tumor cells and trigger an immune response in the host. Tumor antigens can be classified into two categories. One category is products of mutated oncogenes and tumor suppressor genes, and the other category is products of other mutated genes which include overexpressed or aberrantly expressed cellular proteins, tumor antigens produced by oncogenic viruses, oncofetal antigens, altered cell surface glycolipids and glycoproteins, and cell type-specific differentiation antigens. Non-limiting exemplary tumor antigens include, but are not limited to, Alphafetoprotein (AFP), Carcinoembryonic antigen (CEA), CA-125, MUC-1, Epithelial tumor antigen (ETA), Tyrosinase, Melanoma-associated antigen (MAGE), and p53.

In the present disclosure, the term "halo" or "halogen" as used by itself or as part of another group refers to —Cl, —F, —Br, or —I. In one aspect, the halo is —Cl or —F. In one aspect, the halo is —Cl.

In the present disclosure, the term "nitro" as used by itself or as part of another group refers to —NO$_2$.

In the present disclosure, the term "cyano" as used by itself or as part of another group refers to —CN.

In the present disclosure, the term "hydroxy" as used by itself or as part of another group refers to —OH.

In the present disclosure, the term "alkyl" as used by itself or as part of another group refers to unsubstituted straight- or branched-chain aliphatic hydrocarbons containing from one to twelve carbon atoms, i.e., $C_{1-12}$ alkyl, or the number of carbon atoms designated, e.g., a $C_1$ alkyl such as methyl, a $C_2$ alkyl such as ethyl, a $C_3$ alkyl such as propyl or isopropyl, a $C_{1-3}$ alkyl such as methyl, ethyl, propyl, or isopropyl, and so on. In one aspect, the alkyl is a $C_{1-10}$ alkyl. In another aspect, the alkyl is a $C_{1-6}$ alkyl. In another aspect, the alkyl is a $C_{1-4}$ alkyl. In another aspect, the alkyl is a straight chain $C_{1-10}$ alkyl. In another aspect, the alkyl is a branched chain $C_{3-10}$ alkyl. In another aspect, the alkyl is a straight chain $C_{1-6}$ alkyl. In another aspect, the alkyl is a branched chain $C_{3-6}$ alkyl. In another aspect, the alkyl is a straight chain $C_{1-4}$ alkyl. In another aspect, the alkyl is a branched chain $C_{3-4}$ alkyl. In another aspect, the alkyl is a straight or branched chain $C_{3-4}$ alkyl. Non-limiting exemplary $C_{1-10}$ alkyl groups include methyl, ethyl, propyl, isopropyl, butyl, sec-butyl, tert-butyl, iso-butyl, 3-pentyl, hexyl, heptyl, octyl, nonyl, and decyl. Non-limiting exemplary $C_{1-4}$ alkyl groups include methyl, ethyl, propyl, isopropyl, butyl, sec-butyl, tert-butyl, and iso-butyl.

In the present disclosure, the term "cycloalkyl" as used by itself or as part of another group refers to saturated and partially unsaturated (containing one or two double bonds) cyclic aliphatic hydrocarbons containing one to three rings having from three to twelve carbon atoms, i.e., $C_{3-12}$ cycloalkyl. or the number of carbons designated. In one aspect, the cycloalkyl group has two rings. In one aspect, the cycloalkyl group has one ring. In another aspect, the cycloalkyl group is chosen from a $C_{3-8}$ cycloalkyl group. In another aspect, the cycloalkyl group is chosen from a $C_{3-6}$ cycloalkyl group. Non-limiting exemplary cycloalkyl groups include cyclopropyl, cyclobutyl, cyclopentyl, cyclohexyl, cycloheptyl, cyclooctyl, norbornyl, decalin, adamantyl, cyclohexenyl, cyclopentenyl, and cyclohexenyl.

In the present disclosure, the term "optionally substituted cycloalkyl" as used by itself or as part of another group means that the cycloalkyl as defined above is either unsubstituted or substituted with one, two, or three substituents independently selected from the group consisting of halogen, hydroxy, nitro, cyano, —SCH$_3$, —SCF$_3$, —NR$^a$R$^b$, —C(O)NR$^a$R$^b$, —C(=O)CH$_3$, $C_{1-6}$ alkyl, $C_{2-6}$ alkenyl, $C_{2-6}$ alkynyl, $C_{1-6}$ alkoxy, $C_{1-6}$ haloalkyl, optionally substituted $C_{3-8}$ cycloalkyl, optionally substituted aryl, optionally substituted heteroaryl, and optionally substituted heterocyclo. In one aspect, the optionally substituted cycloalkyl is substituted with two substituents. In another aspect, the optionally substituted cycloalkyl is substituted with one substituent.

In the present disclosure, the term "alkenyl" as used by itself or as part of another group refers to an alkyl group as defined above containing one, two or three carbon-to-carbon double bonds. In one aspect, the alkenyl group is chosen from a $C_{2-6}$ alkenyl group. In another aspect, the alkenyl group is chosen from a $C_{2-4}$ alkenyl group. Non-limiting exemplary alkenyl groups include ethenyl, propenyl, isopropenyl, butenyl, sec-butenyl, pentenyl, and hexenyl.

In the present disclosure, the term "alkynyl" as used by itself or as part of another group refers to an alkyl group as defined above containing one to three carbon-to-carbon triple bonds. In one aspect, the alkynyl has one carbon-to-carbon triple bond. In one aspect, the alkynyl group is chosen from a $C_{2-6}$ alkynyl group. In another aspect, the alkynyl group is chosen from a $C_{2-4}$ alkynyl group. Non-limiting exemplary alkynyl groups include ethynyl, propynyl, butynyl, 2-butynyl, pentynyl, and hexynyl groups.

In the present disclosure, the term "haloalkyl" as used by itself or as part of another group refers to an alkyl group substituted by one or more fluorine, chlorine, bromine and/or iodine atoms. In one aspect, the alkyl group is substituted by one, two, or three fluorine and/or chlorine atoms. In another aspect, the haloalkyl group is a $C_{1-6}$ haloalkyl group. In another aspect, the haloalkyl group is a $C_{1-4}$ haloalkyl group. Non-limiting exemplary haloalkyl groups include fluoromethyl, 2-fluoroethyl, difluoromethyl, trifluoromethyl, pentafluoroethyl, 1,1-difluoroethyl, 2,2-difluoroethyl, 2,2,2-trifluoroethyl, 3,3,3-trifluoropropyl, 4,4,4-trifluorobutyl, and trichloromethyl groups.

In the present disclosure, the term "alkoxy" as used by itself or as part of another group refers to an optionally substituted alkyl, optionally substituted cycloalkyl, optionally substituted alkenyl or optionally substituted alkynyl attached to a terminal oxygen atom. In one aspect, the alkoxy group is chosen from a $C_{1-4}$ alkoxy group. In another aspect, the alkoxy group is chosen from a $C_{1-6}$ alkoxy group. In another aspect, the alkoxy group is chosen from a $C_{1-4}$ alkyl attached to a terminal oxygen atom, e.g., methoxy, ethoxy, and tert-butoxy.

In the present disclosure, the term "haloalkoxy" as used by itself or as part of another group refers to a $C_{1-4}$ haloalkyl attached to a terminal oxygen atom. Non-limiting exemplary haloalkoxy groups include fluoromethoxy, difluoromethoxy, trifluoromethoxy, and 2,2,2-trifluoroethoxy.

In the present disclosure, the term "aryl" as used by itself or as part of another group refers to a monocyclic, bicyclic, or tricyclic aromatic ring system having from six to fourteen carbon atoms, i.e., $C_6$-$C_{14}$ aryl. Non-limiting exemplary aryl groups include phenyl (abbreviated as "Ph"), 1-naphthyl, 1-naphthyl, phenanthryl, anthracyl, indenyl, azulenyl, biphenyl, biphenylenyl, and fluorenyl groups. In one aspect, the aryl group is chosen from phenyl, 1-naphthyl, or 2-naphthyl. In one aspect, the aryl is a bicyclic or tricyclic $C_{10}$-$C_{14}$ aromatic ring system.

In the present disclosure, the term "optionally substituted aryl" as used herein by itself or as part of another group means that the aryl as defined above is either unsubstituted or substituted with one to five substituents independently selected from the group consisting of halogen, hydroxy, nitro, cyano, —$SCH_3$, —$SCF_3$, —$NR^aR^b$, —$C(=O)NR^aR^b$, —$C(=O)R^c$, $C_{1-6}$ alkyl, $C_{2-6}$ alkenyl, $C_{2-6}$ alkynyl, $C_{1-6}$ alkoxy, $C_{1-6}$ haloalkyl, haloalkoxy, optionally substituted $C_{3-12}$ cycloalkyl, optionally substituted $C_6$-$C_{14}$ aryl, optionally substituted 5- to 14-membered heteroaryl, and optionally substituted 3- to 14-membered heterocyclo, wherein $R^a$ and $R^b$ are independently selected from the group consisting of hydrogen and $C_{1-6}$ alkyl; or $R^a$ and $R^b$ taken together with the nitrogen atom to which they are attached form a 3- to 12-membered heterocyclo; and $R^c$ is $C_{1-4}$ alkyl.

In one aspect, the optionally substituted aryl is an optionally substituted phenyl. In one aspect, the optionally substituted phenyl has four substituents. In another aspect, the optionally substituted phenyl has three substituents. In another aspect, the optionally substituted phenyl has two substituents. In another aspect, the optionally substituted phenyl has one substituent. Non-limiting exemplary substituted aryl groups include 2-methylphenyl, 2-methoxyphenyl, 2-fluorophenyl, 2-chlorophenyl, 2-bromophenyl, 3-methylphenyl, 3-methoxyphenyl, 3-fluorophenyl, 3-chlorophenyl, 4-methylphenyl, 4-ethylphenyl, 4-methoxyphenyl, 4-fluorophenyl, 4-chlorophenyl, 2,6-di-fluorophenyl, 2,6-di-chlorophenyl, 2-methyl, 3-methoxyphenyl, 2-ethyl, 3-methoxyphenyl, 3,4-di-methoxyphenyl, 3,5-di-fluorophenyl, 3,4-di-chlorophenyl, 3,5-di-methylphenyl, 3,5-dimethoxy, 4-methylphenyl, 2-fluoro-3-chlorophenyl, and 3-chloro-4-fluorophenyl. The term optionally substituted aryl is meant to include groups having fused optionally substituted cycloalkyl and fused optionally substituted heterocyclo rings. Non-limiting examples include:

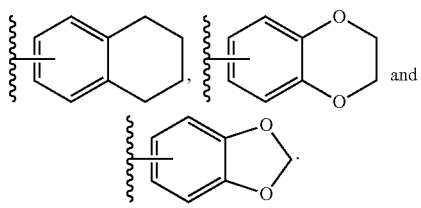

In the present disclosure, the term "heteroaryl" refers to monocyclic, bicyclic, and tricyclic aromatic ring systems having 5 to 14 ring atoms, i.e., a 5- to 14-membered heteroaryl, wherein at least one carbon atom of one of the rings is replaced with a heteroatom independently selected from the group consisting of oxygen, nitrogen and sulfur. In one aspect, the heteroaryl contains 1, 2, 3, or 4 heteroatoms independently selected from the group consisting of oxygen, nitrogen and sulfur. In one aspect, the heteroaryl has three heteroatoms. In another aspect, the heteroaryl has two heteroatoms. In another aspect, the heteroaryl has one heteroatom. Non-limiting exemplary heteroaryl groups include thienyl, benzo[b]thienyl, naphtho[2,3-b]thienyl, thianthrenyl, furyl, benzofuryl, pyranyl, isobenzofuranyl, benzooxazonyl, chromenyl, xanthenyl, 2H-pyrrolyl, pyrrolyl, imidazolyl, pyrazolyl, pyridyl, pyrazinyl, pyrimidinyl, pyridazinyl, isoindolyl, 3H-indolyl, indolyl, indazolyl, purinyl, isoquinolyl, quinolyl, phthalazinyl, naphthyridinyl, cinnolinyl, quinazolinyl, pteridinyl, 4aH-carbazolyl, carbazolyl, β-carbolinyl, phenanthridinyl, acridinyl, pyrimidinyl, phenanthrolinyl, phenazinyl, thiazolyl, isothiazolyl, phenothiazolyl, isoxazolyl, furazanyl, and phenoxazinyl. In one aspect, the heteroaryl is chosen from thienyl (e.g., thien-2-yl and thien-3-yl), furyl (e.g., 2-furyl and 3-furyl), pyrrolyl (e.g., 1H-pyrrol-2-yl and 1H-pyrrol-3-yl), imidazolyl (e.g., 2H-imidazol-2-yl and 2H-imidazol-4-yl), pyrazolyl (e.g., 1H-pyrazol-3-yl, 1H-pyrazol-4-yl, and 1H-pyrazol-5-yl), pyridyl (e.g., pyridin-2-yl, pyridin-3-yl, and pyridin-4-yl), pyrimidinyl (e.g., pyrimidin-2-yl, pyrimidin-4-yl, and pyrimidin-5-yl), thiazolyl (e.g., thiazol-2-yl, thiazol-4-yl, and thiazol-5-yl), isothiazolyl (e.g., isothiazol-3-yl, isothiazol-4-yl, and isothiazol-5-yl), oxazolyl (e.g., oxazol-2-yl, oxazol-4-yl, and oxazol-5-yl), isoxazolyl (e.g., isoxazol-3-yl, isoxazol-4-yl, and isoxazol-5-yl), and indazolyl (e.g., 1H-indazol-3-yl). The term "heteroaryl" is also meant to include possible N-oxides. A non-limiting exemplary N-oxide is pyridyl N-oxide.

In one aspect, the heteroaryl is a 5- or 6-membered heteroaryl. In one aspect, the heteroaryl is a 5-membered heteroaryl, i.e., the heteroaryl is a monocyclic aromatic ring system having 5 ring atoms wherein at least one carbon atom of the ring is replaced with a heteroatom independently selected from nitrogen, oxygen, and sulfur. Non-limiting exemplary 5-membered heteroaryl groups include thienyl, furyl, pyrrolyl, oxazolyl, pyrazolyl, imidazolyl, thiazolyl, isothiazolyl, and isoxazolyl.

In another aspect, the heteroaryl is a 6-membered heteroaryl, e.g., the heteroaryl is a monocyclic aromatic ring system having 6 ring atoms wherein at least one carbon atom of the ring is replaced with a nitrogen atom. Non-limiting exemplary 6 membered heteroaryl groups include pyridyl, pyrazinyl, pyrimidinyl, and pyridazinyl.

In another aspect, the heteroaryl is a 9- to 14-membered bicyclic aromatic ring system, wherein at least one carbon atom of one of the rings is replaced with a heteroatom independently selected from the group consisting of oxygen, nitrogen and sulfur. Non-limiting exemplary 9- to 14-membered bicyclic aromatic ring systems include:

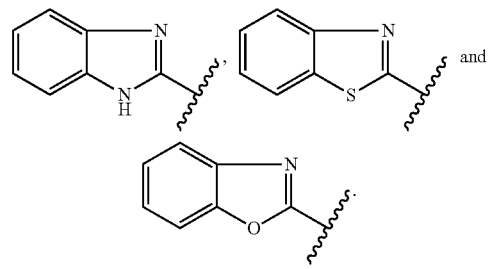

In the present disclosure, the term "optionally substituted heteroaryl" as used by itself or as part of another group means that the heteroaryl as defined above is either unsubstituted or substituted with one to four substituents independently selected from the group consisting of halogen, hydroxy, nitro, cyano, —$SCH_3$, —$SCF_3$, —$NR^aR^b$, —$C(=O)NR^aR^b$, —$C(=O)R^c$, $C_{1-6}$ alkyl, $C_{2-6}$ alkenyl, $C_{2-6}$ alkynyl, $C_{1-6}$ alkoxy, $C_{1-6}$ haloalkyl, haloalkoxy, optionally substituted $C_{3-12}$ cycloalkyl, optionally substituted $C_6$-$C_{14}$ aryl, optionally substituted 5- to 14-membered heteroaryl, and optionally substituted 3- to 14-membered heterocyclo, wherein $R^a$ and $R^b$ are independently selected from the group consisting of hydrogen and $C_{1-6}$ alkyl; or $R^a$ and $R^b$ taken together with the nitrogen atom to which they are attached form a 3- to 12-membered heterocyclo; and $R^c$ is $C_{1-4}$ alkyl. In one aspect, the optionally substituted heteroaryl has one substituent. Any available carbon or nitrogen atom can be substituted.

In the present disclosure, the term "heterocycle" or "heterocyclo" as used by itself or as part of another group refers to saturated and partially unsaturated, e.g., containing one or two double bonds, cyclic groups containing one, two, or three rings having from three to fourteen ring members, i.e., a 3- to 14-membered heterocyclo, wherein at least one carbon atom of one of the rings is replaced with a heteroatom. Each heteroatom is independently selected from the group consisting of oxygen, sulfur, including sulfoxide and sulfone, and/or nitrogen atoms, which can be oxidized or quaternized. The term "heterocyclo" is meant to include groups wherein a ring —$CH_2$— is replaced with a —C(=O)—, for example, cyclic ureido groups such as 2-imidazolidinone and cyclic amide groups such as β-lactam, γ-lactam, δ-lactam, ε-lactam, and piperazin-2-one. The term "heterocyclo" is also meant to include groups having fused optionally substituted aryl groups, e.g., indolinyl. In one aspect, the heterocyclo group is chosen from a 5- or 6-membered cyclic group containing one ring and one or two oxygen and/or nitrogen atoms. The heterocyclo can be optionally linked to the rest of the molecule through any available carbon or nitrogen atom. Non-limiting exemplary heterocyclo groups include dioxanyl, tetrahydropyranyl, 2-oxopyrrolidin-3-yl, piperazin-2-one, piperazine-2,6-dione, 2-imidazolidinone, piperidinyl, morpholinyl, piperazinyl, pyrrolidinyl, and indolinyl.

In the present disclosure, the term "optionally substituted heterocyclo" as used herein by itself or part of another group means the heterocyclo as defined above is either unsubstituted or substituted with one to four substituents independently selected from the group consisting of halogen, hydroxy, nitro, cyano, —$SCH_3$, —$SCF_3$, —$NR^aR^b$, —C(=O)$NR^aR^b$, —C(=O)$R^c$, $C_{1-6}$ alkyl, $C_{2-6}$ alkenyl, $C_{2-6}$ alkynyl, $C_{1-6}$ alkoxy, $C_{1-6}$ haloalkyl, haloalkoxy, optionally substituted $C_{3-12}$ cycloalkyl, optionally substituted $C_6$-$C_{14}$ aryl, optionally substituted 5- to 14-membered heteroaryl, and optionally substituted 3- to 14-membered heterocyclo, wherein $R^a$ and $R^b$ are independently selected from the group consisting of hydrogen and $C_{1-6}$ alkyl; or $R^a$ and $R^b$ taken together with the nitrogen atom to which they are attached form a 3- to 12-membered heterocyclo; and $R^c$ is $C_{1-4}$ alkyl.

In the present disclosure, the term "aralkyl" as used by itself or as part of another group refers to an alkyl group substituted with one, two, or three optionally substituted aryl groups. In one aspect, the optionally substituted aralkyl group is a $C_{1-4}$ alkyl substituted with one optionally substituted aryl group. In one aspect, the aralkyl group is a $C_1$ or $C_2$ alkyl substituted with one optionally substituted aryl group. In one aspect, the aralkyl group is a $C_1$ or $C_2$ alkyl substituted with one optionally substituted phenyl group. Non-limiting exemplary aralkyl groups include benzyl, phenethyl, —$CHPh_2$, —$CH_2$(4-F-Ph), —$CH_2$(4-Me-Ph), —$CH_2$(4-$CF_3$-Ph), and —CH(4-F-Ph)$_2$.

In the present disclosure, the term "heteroaralkyl" as used by itself or as part of another group refers to an alkyl group substituted with one, two, or three optionally substituted heteroaryl groups. In one aspect, the heteroaralkyl group is a $C_{1-4}$ alkyl substituted with one optionally substituted heteroaryl group. In one aspect, the aralkyl group is a $C_1$ or $C_2$ alkyl substituted with one optionally substituted heteroaryl group. In one aspect, the heteroaralkyl group is a $C_1$ or $C_2$ alkyl substituted with one optionally substituted heteroaryl group. Non-limiting exemplary heteroaralkyl groups include:

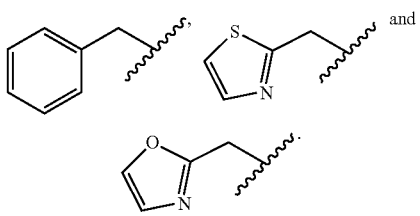

The term "HDAC" refers to a family of enzymes that remove acetyl groups from a protein, for example, the ε-amino groups of lysine residues at the N-terminus of a histone. The HDAC can be any human HDAC isoform including, HDAC1, HDAC2, HDAC3, HDAC4, HDAC5, HDAC6, HDAC7, HDAC8, HDAC9, HDAC10, and HDAC11. The HDAC also can be derived from a protozoal or fungal source.

The terms "treat," "treating," "treatment," and the like refer to eliminating, reducing, relieving, reversing, and/or ameliorating a disease or condition and/or symptoms associated therewith. Although not precluded, treating a disease or condition does not require that the disease, condition, or symptoms associated therewith be completely eliminated, including the treatment of acute or chronic signs, symptoms and/or malfunctions. As used herein, the terms "treat," "treating," "treatment," and the like may include "prophylactic treatment," which refers to reducing the probability of redeveloping a disease or condition, or of a recurrence of a previously-controlled disease or condition, in a subject who does not have, but is at risk of or is susceptible to, redeveloping a disease or condition or a recurrence of the disease or condition, "treatment" therefore also includes relapse prophylaxis or phase prophylaxis. The term "treat" and synonyms contemplate administering a therapeutically effective amount of a compound of the disclosure to an individual, e.g., a mammalian patient including, but not limited to, humans and veterinary animals, in need of such treatment. A treatment can be orientated symptomatically, for example, to suppress symptoms. It can be effected over a short period, be oriented over a medium term, or can be a long-term treatment, for example within the context of a maintenance therapy.

The term "therapeutically effective amount" or "therapeutic dose" as used herein refers to an amount of the active ingredient(s) that, when administered, is (are) sufficient, to efficaciously deliver the active ingredient(s) for the treatment of condition or disease of interest to an individual, e.g., human patient, in need thereof. In the case of a cancer or other proliferation disorder, the therapeutically effective amount of the agent may reduce (i.e., retard to some extent and preferably stop) unwanted cellular proliferation; reduce the number of cancer cells; reduce the tumor size; inhibit (i.e., retard to some extent and preferably stop) cancer cell infiltration into peripheral organs; inhibit (i.e., retard to some extent and preferably stop) tumor metastasis; inhibit, to some extent, tumor growth; reduce HDAC signaling in the target cells; and/or relieve, to some extent, one or more of the symptoms associated with the cancer. To extent the administered compound or composition prevents growth and/or kills existing cancer cells, it may be cytostatic and/or cytotoxic.

The use of the terms "a", "an", "the", and similar referents in the context of describing the disclosure (especially in the context of the claims) are to be construed to cover both the singular and the plural, unless otherwise indicated. Recitation of ranges of values herein merely serve as a shorthand method of referring individually to each separate value falling within the range, unless otherwise indicated herein, and each separate value and subrange is incorporated into the specification as if it were individually recited herein. The use of any and all examples, or exemplary language (e.g., "such as" and "like") provided herein, is intended to better illustrate the disclosure and is not a limitation on the scope of the disclosure unless otherwise claimed. No language in the specification should be construed as indicating any non-claimed element as essential to the practice of the disclosure.

The term "about," as used herein, includes the recited number±10%. Thus, "about 10" means 9 to 11.

The term "subject" as used herein refers to any human or mammal that is in need of or might benefit from treatment with HDAC6-activated macrophages. Foremost among such subjects are humans, although the methods and compositions provided herein are not intended to be so limited. Other subjects include veterinary animals, e.g., cows, sheep, pigs, horses, dogs, cats and the like. In one embodiment, the subject is a human. In one embodiment, the subject is a mammal.

Selective HDAC6 inhibitors can exist as salts. As used herein, the term "pharmaceutically acceptable salt" refers to salts or zwitterionic forms of the present compounds. Salts of the present compounds can be prepared during the final isolation and purification of the compounds or separately by reacting the compound with an acid having a suitable cation. The pharmaceutically acceptable salts of the present compounds can be acid addition salts formed with pharmaceutically acceptable acids. Examples of acids which can be employed to form pharmaceutically acceptable salts include inorganic acids such as nitric, boric, hydrochloric, hydrobromic, sulfuric, and phosphoric, and organic acids such as oxalic, maleic, succinic, tartaric, and citric. Nonlimiting examples of salts of selective HDAC6 inhibitors include, but are not limited to, the hydrochloride, hydrobromide, hydroiodide, sulfate, bisulfate, 2-hydroxyethansulfonate, phosphate, hydrogen phosphate, acetate, adipate, alginate, aspartate, benzoate, bisulfate, butyrate, camphorate, camphorsulfonate, digluconate, glycerolphosphate, hemisulfate, heptanoate, hexanoate, formate, succinate, fumarate, maleate, ascorbate, isethionate, salicylate, methanesulfonate, mesitylenesulfonate, naphthylenesulfonate, nicotinate, 2-naphthalenesulfonate, oxalate, pamoate, pectinate, persulfate, 3-phenylproprionate, picrate, pivalate, propionate, trichloroacetate, trifluoroacetate, phosphate, glutamate, bicarbonate, paratoluenesulfonate, undecanoate, lactate, citrate, tartrate, gluconate, methanesulfonate, ethanedisulfonate, benzene sulphonate, and p-toluenesulfonate salts. In addition, available amino groups present in selective HDAC6 inhibitors can be quaternized with methyl, ethyl, propyl, and butyl chlorides, bromides, and iodides; dimethyl, diethyl, dibutyl, and diamyl sulfates; decyl, lauryl, myristyl, and stearyl chlorides, bromides, and iodides; and benzyl and phenethyl bromides. Any reference to compounds of the present disclosure appearing herein is intended to include selective HDAC6 inhibitors as well as pharmaceutically acceptable salts, solvates, or hydrates thereof.

EXAMPLES

General Methods

Cell culture: SM1 murine melanoma cells were obtained from Dr. A. Ribas at the University of California, Los Angeles, and cultured in an incubator in RPMI 1640, 1% penicillin-streptomycin, and 10% fetal bovine serum at 37° C. with 5% $CO_2$.

Quantitative analysis of gene expression. Total RNA was isolated from cells following the manufacturer's instructions of QIAzol lysis reagent (Qiagen, 79306). RNA quantification was done using a NanoDrop One spectrophotometer (NanoDrop Technologies). Samples with absorbance at 260/280 nm ratios over 1.9 were used for cDNA synthesis with the iScript cDNA synthesis kit (Bio-Rad, 1708891). Synthesized cDNA from 1 µg of total RNA was diluted 1:10 with nuclease-free water. The quantitative PCR analysis was performed using iQ SYBR Green Supermix (Bio-Rad, 1708882) on a CFX96 real-time system (Bio-Rad). Gene expression analysis was performed using the $2^{-\Delta\Delta Ct}$ method, and target mRNA levels were normalized to GAPDH expression. Cycling conditions were used as per the manufacturer's instructions. Single PCR product amplification was confirmed by melting curve analysis in all the experiments performed.

Mice. Animal experiments involving mice were performed in accordance with the protocol (#A354) approved by the Institutional Care and Use Committee (IACUC) at The George Washington University. C57BL/6 female mice were purchased from the Charles River Laboratories (Wilmington, Massachusetts, USA). In vivo studies were performed using SM1 tumor cells that were passaged in vivo from mouse to mouse for a minimum of five times before tumor implantation. Mice were injected subcutaneously with $1.0 \times 10^6$ in vivo passaged SM1 melanoma cells suspended in 100 µL phosphate-buffered saline (PBS) (Corning, 21-040-CV). The pre-treatment arm was started once the tumors were palpable, which was about 5 days post tumor implantation. Cages were randomly assigned to different treatment groups, and mice were treated with the test article or vehicle control. Mice were treated until tumors in the control group reached maximum size according to our IACUC protocol. Tumor volume measurements were taken on alternate days using caliper measurements and calculated using the formula $L \times W^2 / 2$. All animal studies were performed with consideration for toxicity, and we routinely monitored for early signs of toxicity. Emphasis was given to mortality, body weight, and food consumption. At the endpoint, a postmortem evaluation, including gross visual examination of organs such as the liver for hepatotoxicity, splenomegaly, and lung metastatic nodules, was done for each condition. Shen et al., *J Med Chem.* 62:8557-8577 (2019).

Bone marrow derived macrophages: For macrophage isolation, bone marrow from 6-12 weeks old C57BL/6 mouse was used following an IACUC approved protocol. Briefly, femurs and tibia bones were isolated after removing the skeletal muscles. The bone marrow was flushed with RPMI complete medium supplemented with non-essential amino acids. A single-cell suspension of bone marrow was prepared with repeated pipetting and incubated with 20 ng/mL of mouse recombinant M-CSF (Biolegend) at 37° C. for 4 days to differentiate into macrophages.

Flow cytometry: Flow cytometry was performed following the protocol described previously. Knox et al., *Sci Rep.* 2019 Oct. 10; 9(1):14824. doi: 10.1038/s41598-019-51403-6. Briefly, mice were euthanized following the IACUC protocol, and tumor cells were processed into a single cell suspension for analysis by flow cytometry with tumor digestion buffer. The following antibodies were used to stain cell surface markers expressed by different immune cells. All the antibodies were purchased from Biolegend (San Diego, CA) unless otherwise specified. Myeloid cell surface markers are as follows: APC anti-mouse CD80 (clone 16-10A1), PE/Cy7 anti-mouse CD206 (MMR) (clone C068C2), APC/Fire™ 750 anti-mouse CD45.2 (clone 104), FITC anti-mouse H-2 (clone M1/42), Brilliant Violet 785™ anti-mouse F4/80 (clone BM8), and Alexa Fluor® 700 anti-mouse CD3 (clone 17A2). To distinguish between MHCI and MHCI-bound to SIINFEKL, we used APC anti-mouse H-2Kb bound to SIINFEKL antibody (clone 25-D1.16). Multi-color flow data acquisition was performed on BD Celesta, and data analysis was performed with FlowJo software (version 10.3). Statistical analyses were performed with GraphPad Prism Software (version 7.03).

Example 1

Efficiency of SIINFEKL Peptide Presentation and XPT

Endogenous peptides are usually presented through MHC-I to CD8 T-cells and exogenous (from other cells such as tumors) peptides through MHC-II to CD4 T-cells. However, when exogenous peptides are presented through MHC-I, it leads to anti-tumor immunity by activation of CD8 T-cells. This mechanism is called cross-presentation (XPT). Cross-presentation is highly relevant to radiation therapy, where a plethora of neoantigens is generated. To understand the role of HDAC6 inhibition on antigen XPT, the SIINFEKL (SEQ ID NO. 1) peptide model was used SIINFEKL is an 8 amino acid peptide generated by proteolytic cleavage of ovalbumin which is loaded on MHC-I in the endoplasmic reticulum and transported to the cell surface for presentation to T-cell receptors (TCR). Taking advantage of a highly specific antibody recognizing MHC-I loaded with SIINFEKL peptide, efficiency of antigen XPT was determined.

Figure 2:
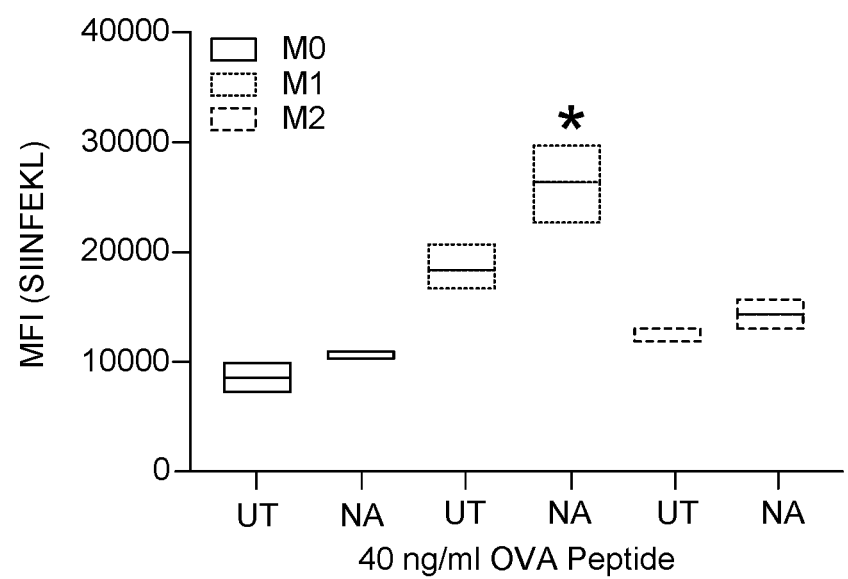
FIG. 2 is a graph showing the MHCI-SIINFEKL levels in polarized macrophages derived from wild-type mice pre-treated with NextA and incubated with OVA peptide for 24 hours.
Figure 3:
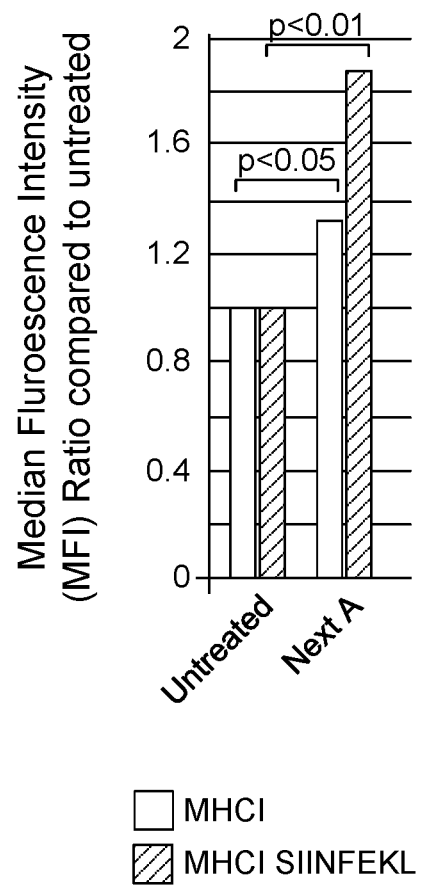
FIG. 3 is a bar graph showing the MHCI and MHCI-SIINFEKL levels after SM1-OVA (SM1 cells expressing OVA peptide) melanoma cells were treated with 5 µM NextA for 24 hours. MHCI and MHCI-SIINFEKL levels were measured by FACS.

When polarized macrophages were exposed to increasing concentrations of ova peptide, M1 macrophages were better at cross-presenting the SIINFEKL peptide by MHC-I compared to M0 and M2 macrophages. Macrophages derived from HDAC6 knock out mice showed a similar increase in SIINFEKL XPT albeit with higher efficiency. FIG. 1. Pre-treatment NextA increased M1 XPT. FIG. 2. Also, the presence of MHC I and SIINFEKL-loaded MHC-I increased in SM1-OVA murine melanoma cells treated with NextA. FIG. 3.

Example 2

HDAC Inhibitors Decrease Polarization of Macrophages Towards the M2 Phenotype

Figure 4:
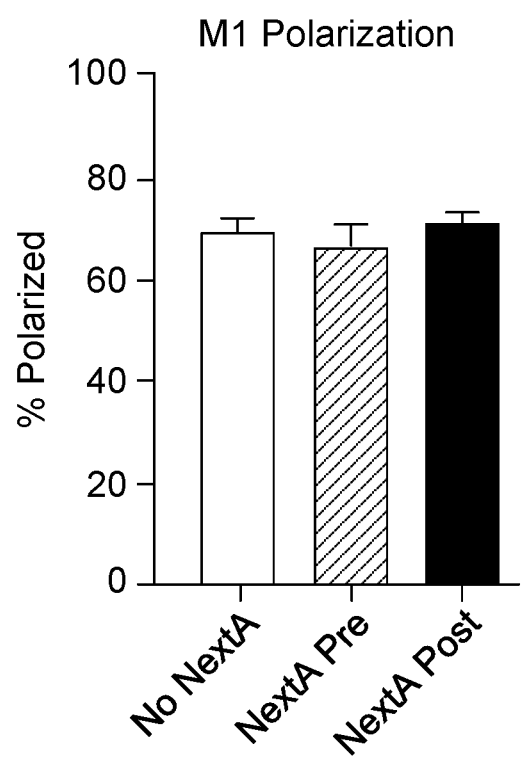
FIG. 4 is a bar graph showing the polarization level in the M1 phenotype with no treatment, pre-treatment, and post-treatment with NextA.
Figure 5:
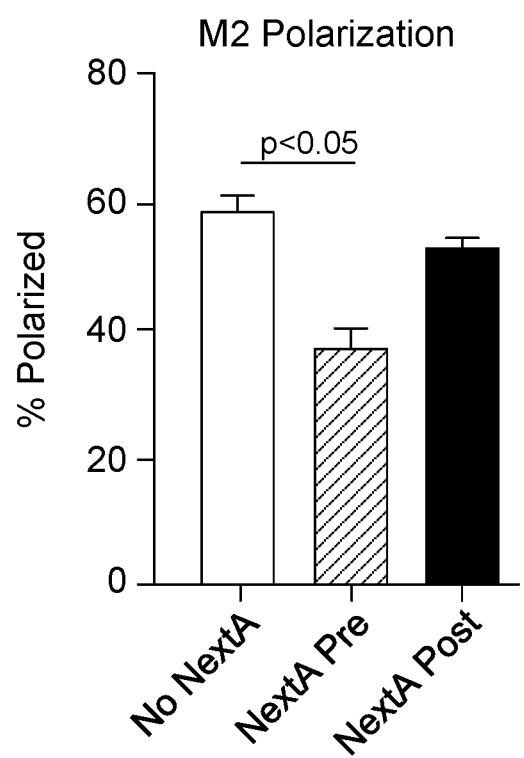
FIG. 5 is a bar graph showing the polarization level in the M2 phenotype with no treatment, pre-treatment, or post-treatment with NextA.
Figure 6:
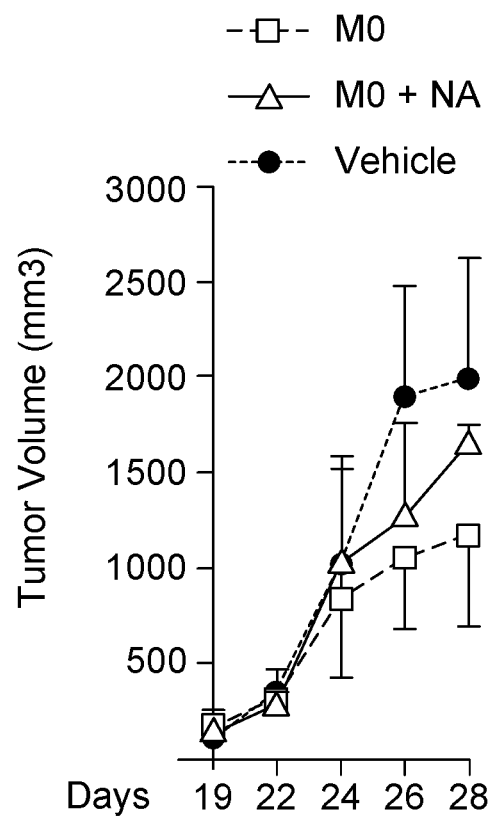
FIG. 6 is a line graph showing the tumor size in intratumoral transfer therapy in the SM1 murine melanoma model with naïve macrophages (M0) that were either pre-treated or untreated with NextA.

Bone marrow derived macrophages (BMDMs) isolated from femur and tibia of $C_{57}BL/6$ mouse were differentiated into macrophages with M-CSF. These naïve macrophages were pre-treated with NextA and polarized to M1 macrophages with LPS/IFNγ or M2 macrophages with IL4/IL13. NextA pre-treatment decreased polarization of M2 macrophages but did not affect M1 macrophages as indicated by flow cytometry. See FIG. 5 and FIG. 4.

Figure 9:
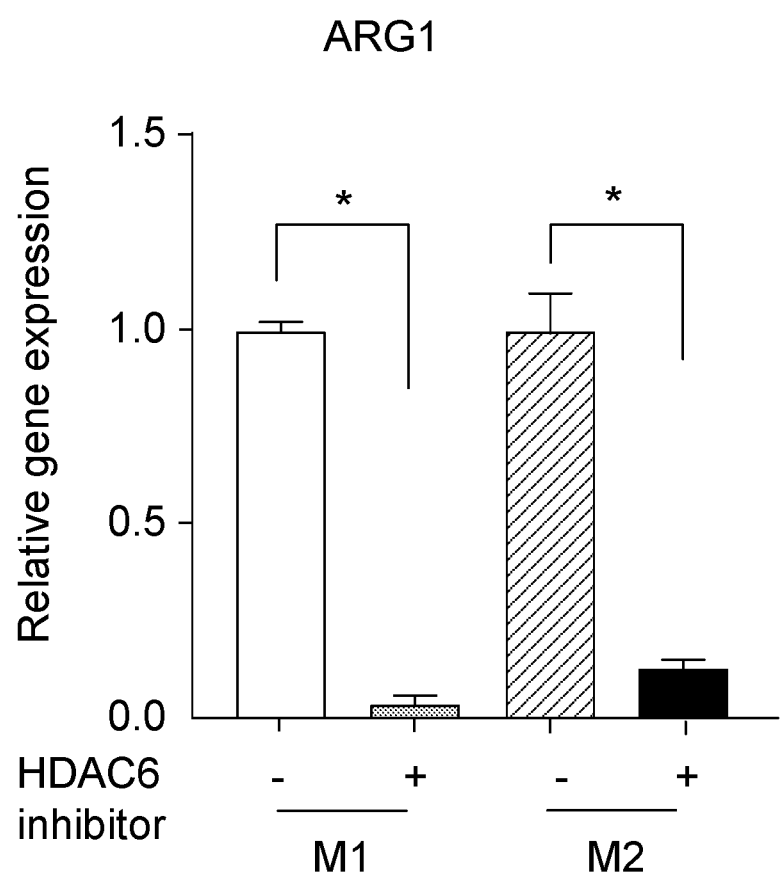
FIG. 9 is a bar graph showing the gene expression level of M2 phenotype marker Arg1 with M1 and M2 macrophages which were either untreated or pre-treated with a HDAC6 inhibitor. Gene expression levels were tested by quantitative real-time PCR.
Figure 10:
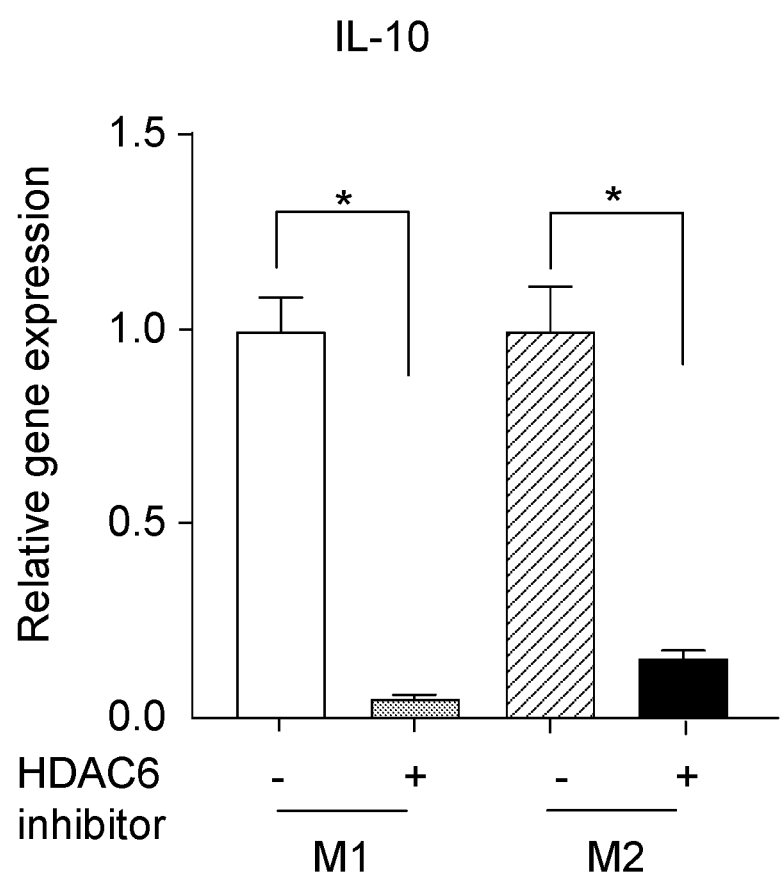
FIG. 10 is a bar graph showing gene expression level of M2 anti-inflammatory cytokine IL-10 with M1 and M2 macrophages which were either untreated or pre-treated with a HDAC6 inhibitor. Gene expression levels were tested by quantitative real-time PCR.
Figure 11:
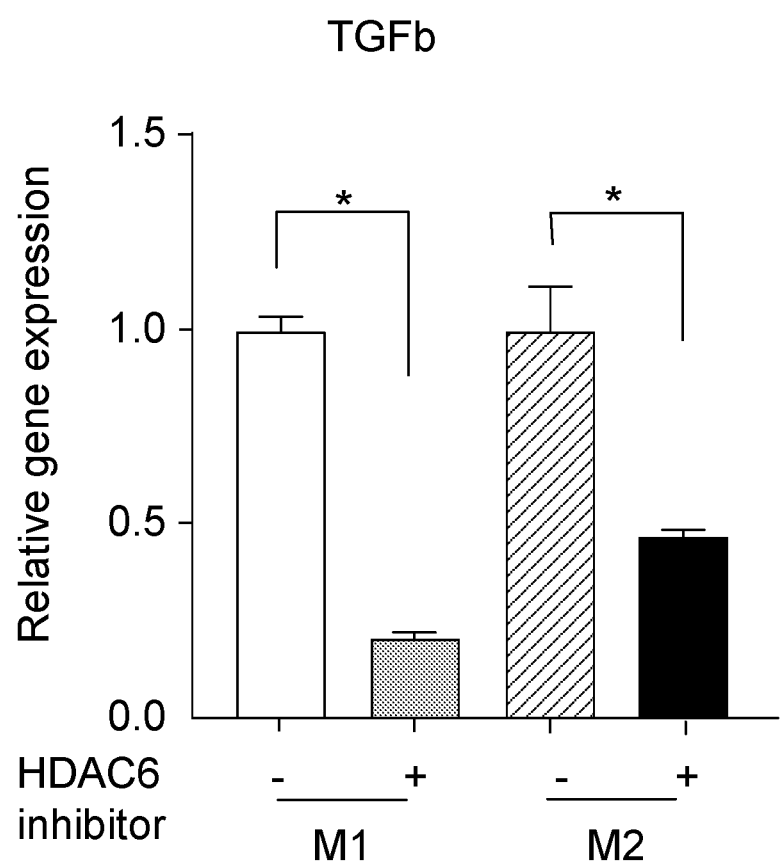
FIG. 11 is a bar graph showing gene expression level of M2 anti-inflammatory cytokine TGFβ with M1 and M2 macrophages which were either untreated or pre-treated with a HDAC6 inhibitor. Gene expression levels were tested by quantitative real-time PCR.
Figure 12:
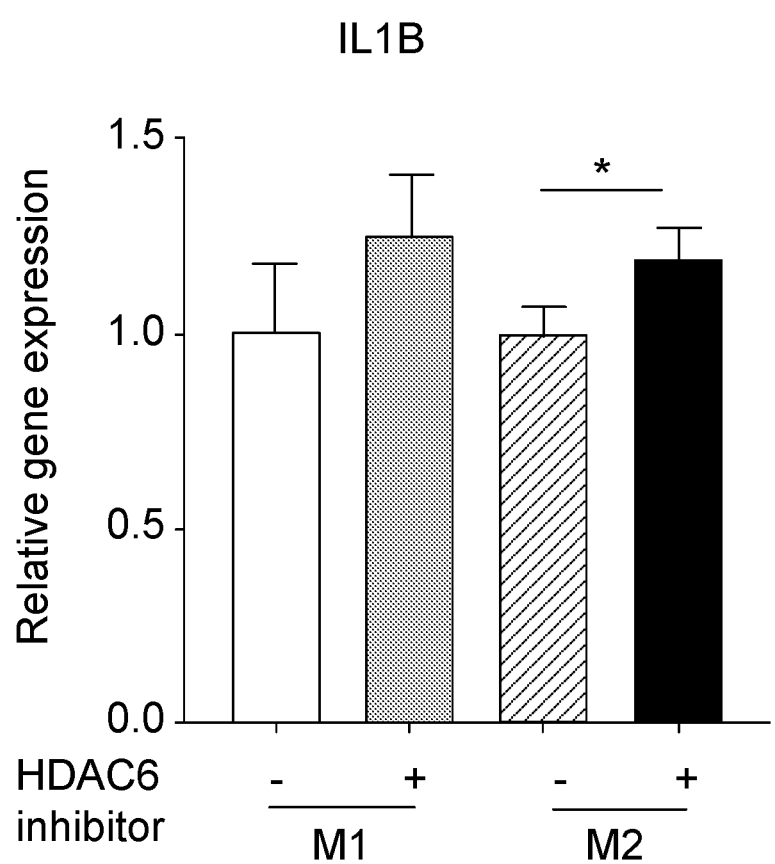
FIG. 12 is a bar graph showing gene expression level of M1 pro-inflammatory cytokine IL-1B with M1 and M2 macrophages which were either untreated or pre-treated with a HDAC6 inhibitor. Gene expression levels were tested by quantitative real-time PCR.
Figure 13:
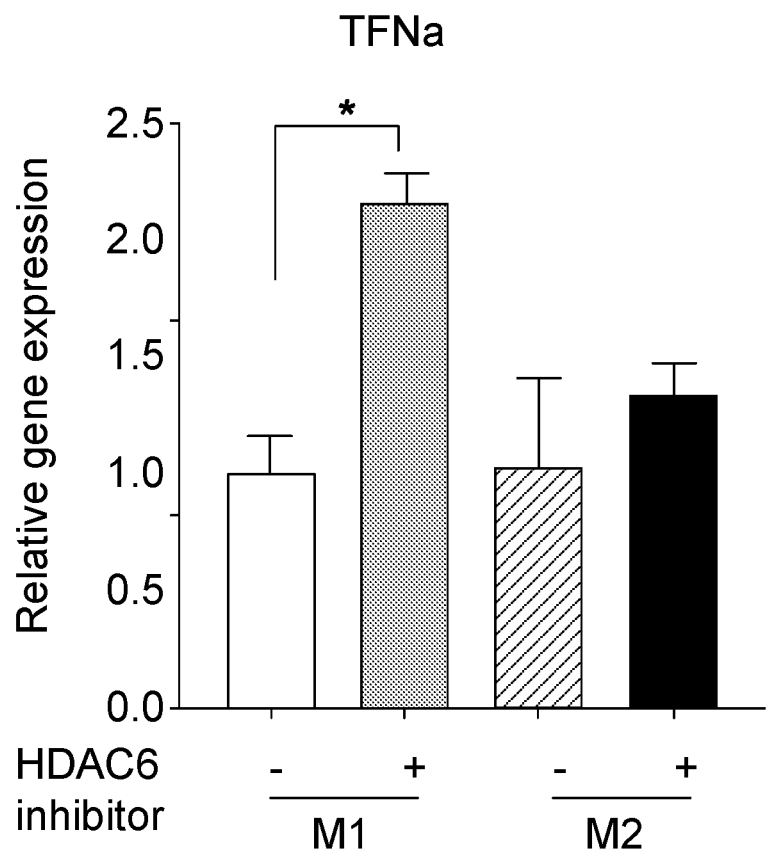
FIG. 13 is a bar graph showing gene expression level of M1 pro-inflammatory cytokine TNFα with M1 and M2 macrophages which were either untreated or pre-treated with a HDAC6 inhibitor. Gene expression levels were tested by quantitative real-time PCR.
Figure 14:
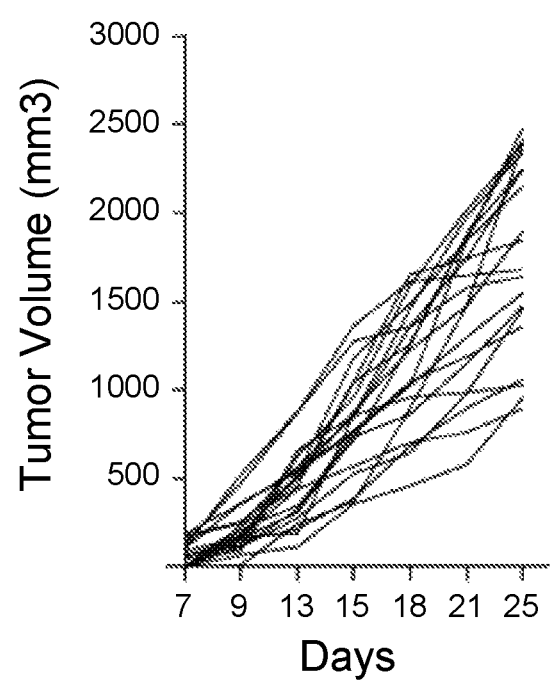
FIG. 14 is a line graph showing tumor growth curves of twenty mice engrafted with SM1 melanoma monitored for 25 days.

Further validation of M2 polarization markers at gene expression levels by quantitative real-time PCR indicate that Arginase I, IL-10 and TGFβ, which are tumor-promoting factors, were decreased. FIG. 9, FIG. 10, and FIG. 11. The expression of M1 polarization markers and anti-tumor, pro-inflammatory cytokines such as TNFα and IL-1B were increased. FIG. 12 and FIG. 13. These data suggest that pre-treatment with NextA affects cellular signaling and programming of naïve macrophages in response to polarizing factors in the tumor microenvironment (TME).

Example 3

Adoptive Transfer Therapy in the Syngeneic SM1 Murine Melanoma Model

Ex vivo polarization of naïve macrophages isolated from mouse bone marrow towards M1 phenotype with or without HDAC6 inhibitor pre-treatment was performed. Three treatment groups which include intra-tumor implantation of phosphate buffered saline (control group), $1\times10^6$ M1 macrophages with HDAC6 inhibitor pre-treatment and $1\times10^6$ M1 macrophages without HDAC6 inhibitor pre-treatment. Similar treatment groups were set up for naïve and M2 macrophages. A syngeneic SM1 murine melanoma model was used for these for these studies, which retains the tumor immune system. Also, SM1 murine melanoma cells resemble human melanoma tumors in terms of mutational burden. Adoptive transfer therapy with murine naïve, M1, and M2 macrophages when the tumor size was 5×5 mm was performed, and the tumors were allowed to grow till the endpoint, which is a tumor size of 2 cm diameter. See FIG. 6, FIG. 7, FIG. 8, and FIG. 14.

Figure 7:
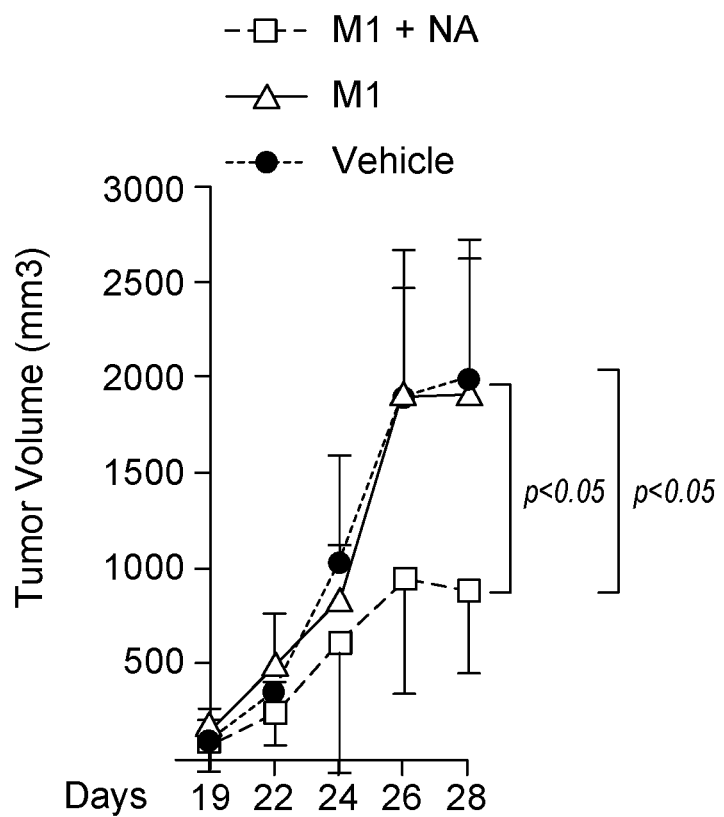
FIG. 7 is a line graph showing the tumor size in intratumoral transfer therapy in the SM1 murine melanoma model with M1 macrophages that were either pre-treated or untreated with NextA.
Figure 8:
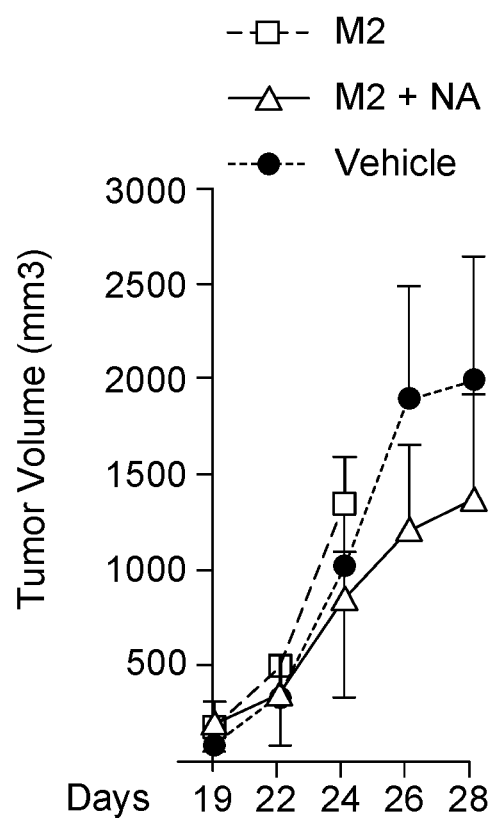
FIG. 8 is a line graph showing tumor size in intratumoral transfer therapy in the SM1 murine melanoma model with M2 macrophages that were either pre-treated or untreated with NextA.
Figure 15:
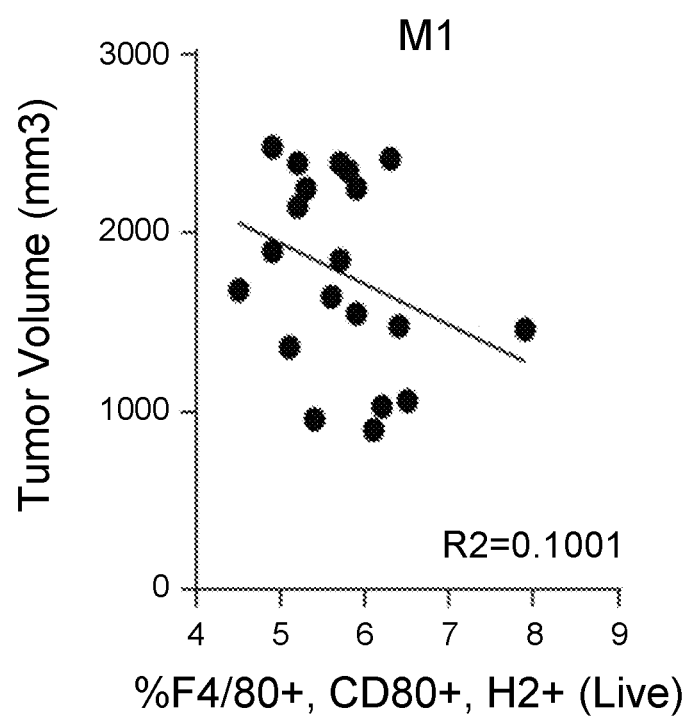
FIG. 15 is a scatter graph showing negative correlation of tumor size with anti-tumor M1 macrophages.
Figure 16:
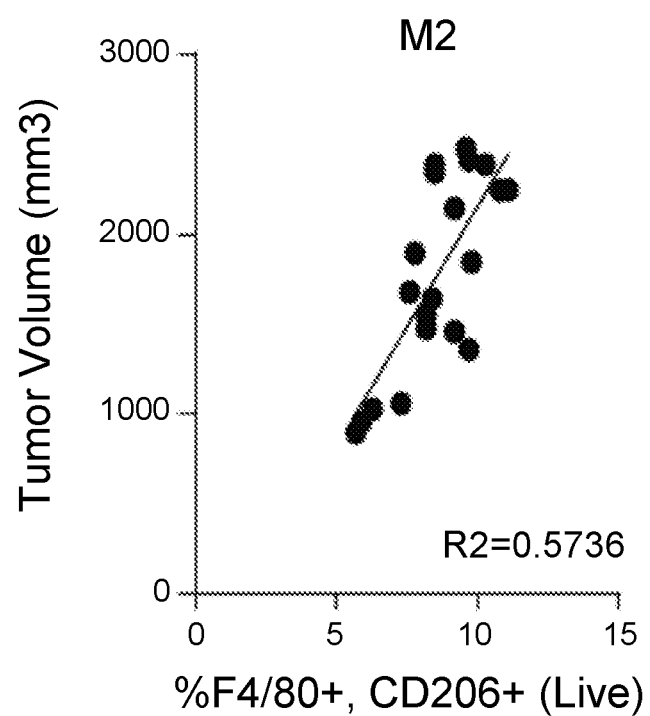
FIG. 16 is a scatter graph showing positive correlation of tumor size with pro-tumor M2 macrophages.
Figure 17:
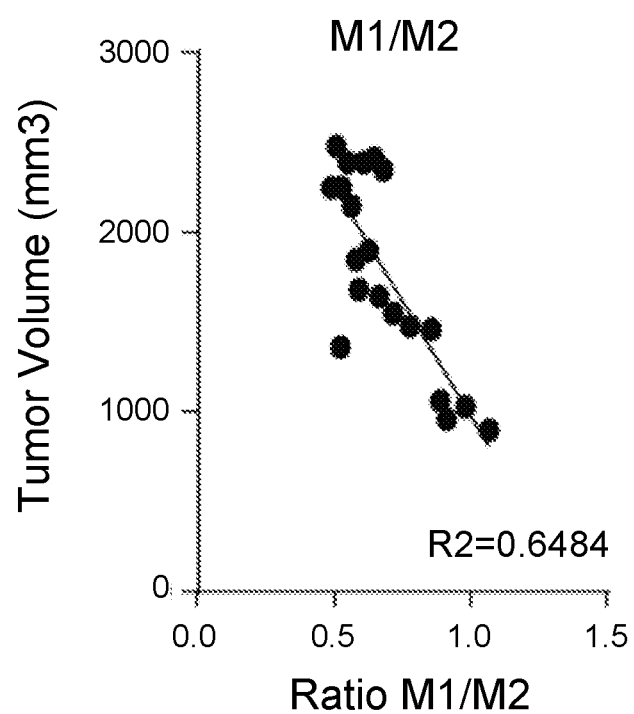
FIG. 17 is a scatter graph showing tumor size with M1/M2 Macrophage ratio. M1/M2 Macrophage ratio is an indicative of the immune status of tumor microenvironment (TME).

In the M1 macrophage therapy group, pre-treatment with NextA suppressed the tumor growth compared to M1 macrophages without NextA pre-treatment and control groups. FIG. 7. In the M2 macrophage therapy group, the growth of the tumor was detrimental to the mice and had to be sacrificed due to large tumor sizes. FIG. 8. Also, FIG. 15 and FIG. 16 show that the M1/M2 macrophage ratio is indicative of the immune status of TME. There is a negative correlation of anti-tumor M1 macrophages with tumor size and positive correlation of tumor size with pro-tumor M2 macrophages. FIG. 17 shows M1/M2 ratio correlation to tumor size. These studies demonstrate that HDAC6 inhibitor pre-treatment of macrophages before intra-tumoral adoptive therapy results in anti-tumor immunity.

Figure 18:
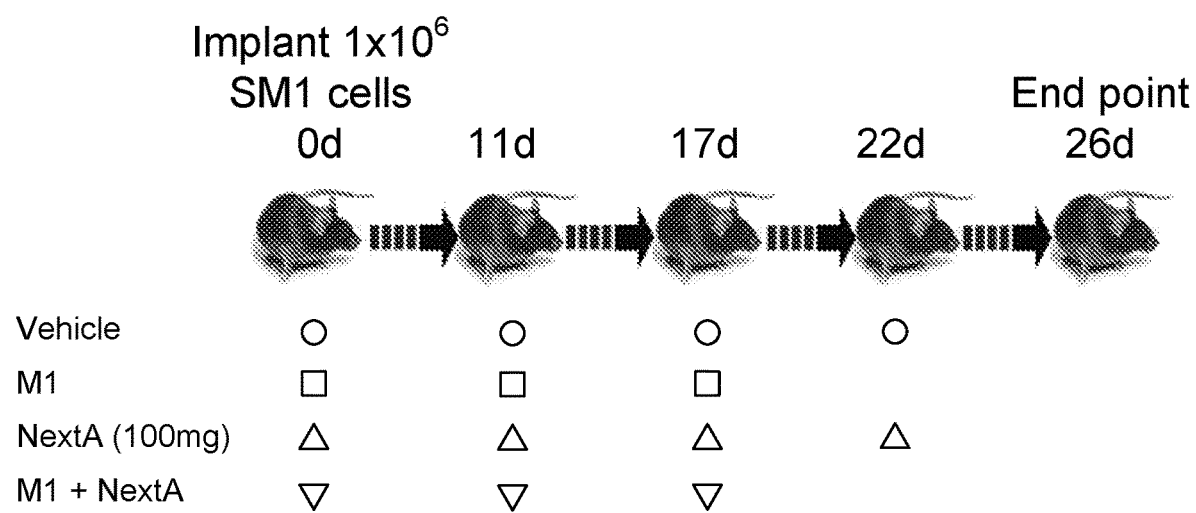
FIG. 18 is a schematic illustration showing the dosing regimen in the SM1 murine melanoma model.
Figure 19:
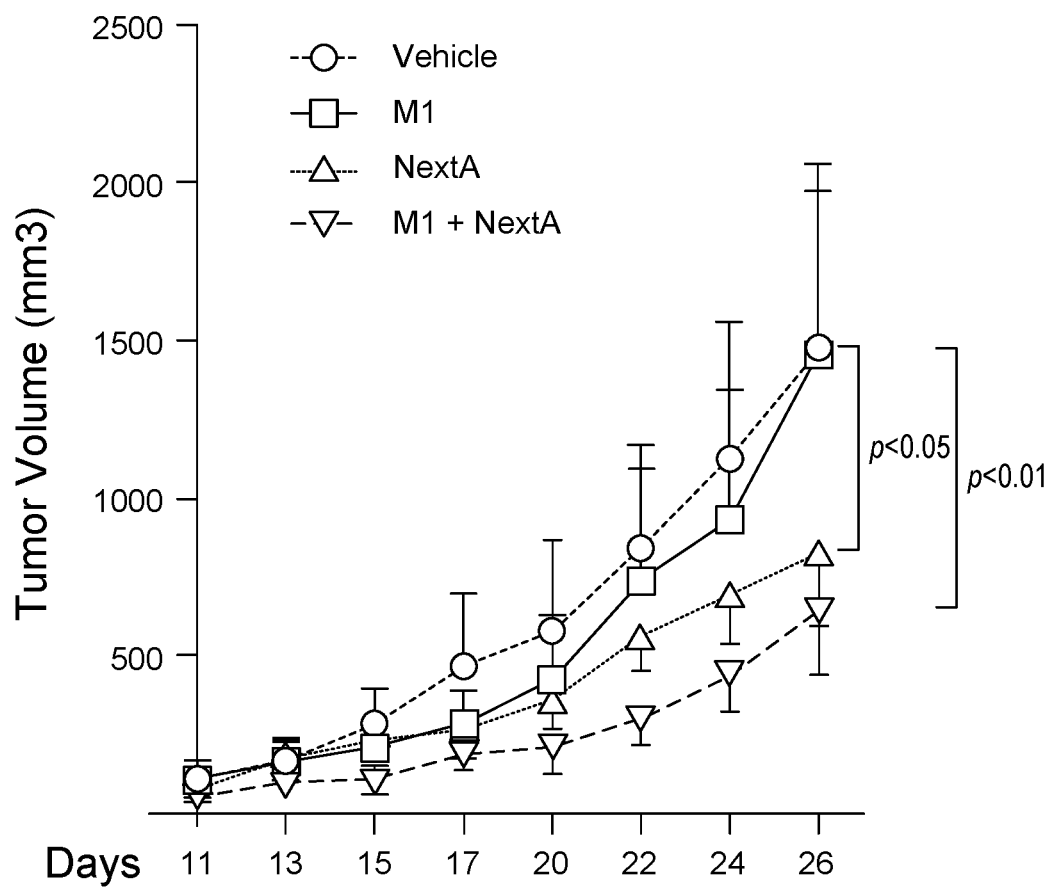
FIG. 19 is a line graph showing the tumor size after treatment with vehicle, M1 macrophages, a NextA, and M1 macrophages pre-treated with NextA in the SM1 murine melanoma model.
Figure 20:
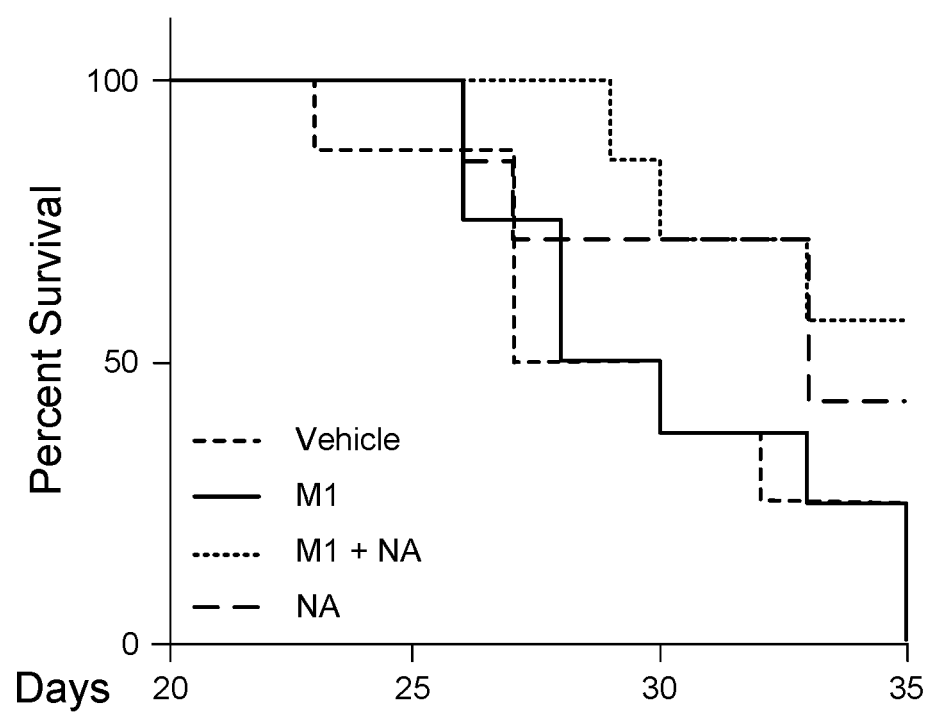
FIG. 20 is a Kaplan-Meier survival graph showing a survival percentage after treatment with vehicle, M1 macrophages, NextA, and M1 macrophages pre-treated with NextA in the SM1 murine melanoma model.
Figure 21:
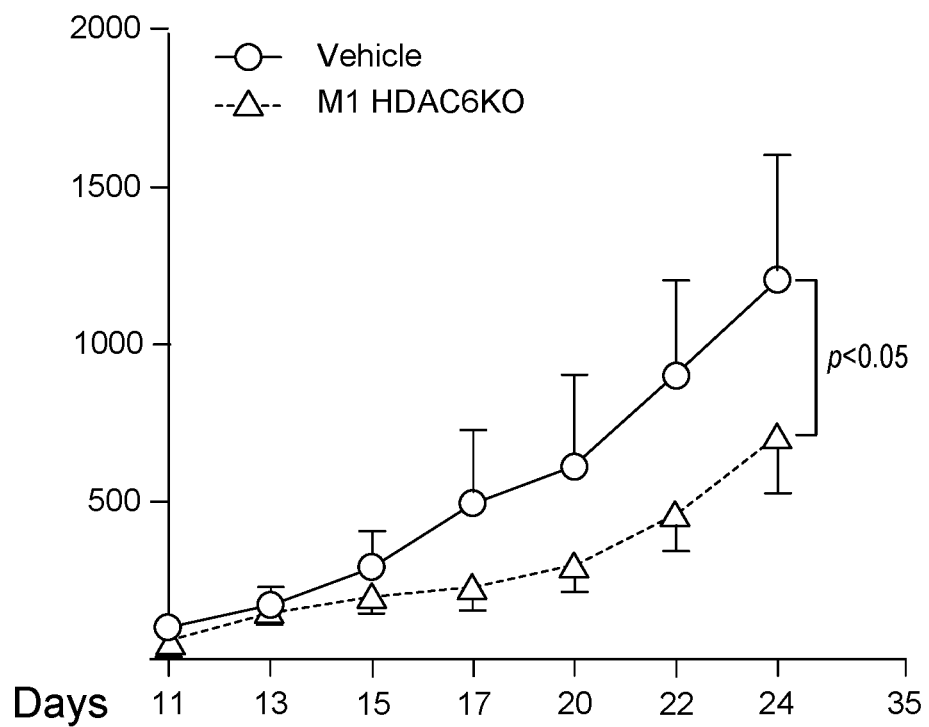
FIG. 21 is a line graph showing tumor size after treatment with vehicle and M1 macrophages derived from HDAC6KO (knockout) mice in the SM1 murine melanoma model.

A schematic showing the therapy regime in a separate SM1 murine melanoma experiment is shown in FIG. 18. M1+NextA shows a decrease in tumor size compared to vehicle group. FIG. 19. Survival analysis indicates that the M1+NextA group has better survival compared to the other treatment groups. FIG. 20. M1 macrophages derived from HDAC6KO also show a decrease in tumor growth suggesting a major role of HDAC6 in macrophage function. FIG. 21.

Example 4

M0 Macrophages Treated with a Selective HDAC6 Inhibitor are Like M1 Macrophages

Figure 22:
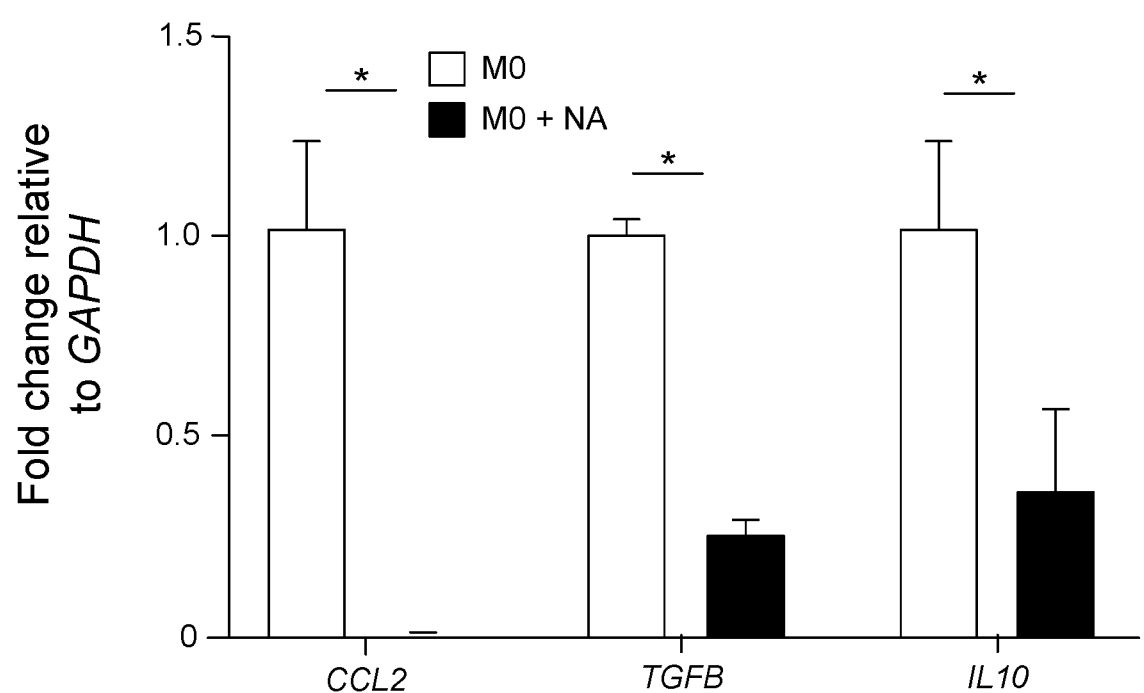
FIG. 22 is a bar graph showing gene expression level of M2 anti-inflammatory cytokines CCL2, TGF-β and IL-10 with naïve macrophages M0 which were either untreated or pre-treated with a HDAC6 inhibitor (NextA).
Figure 23:
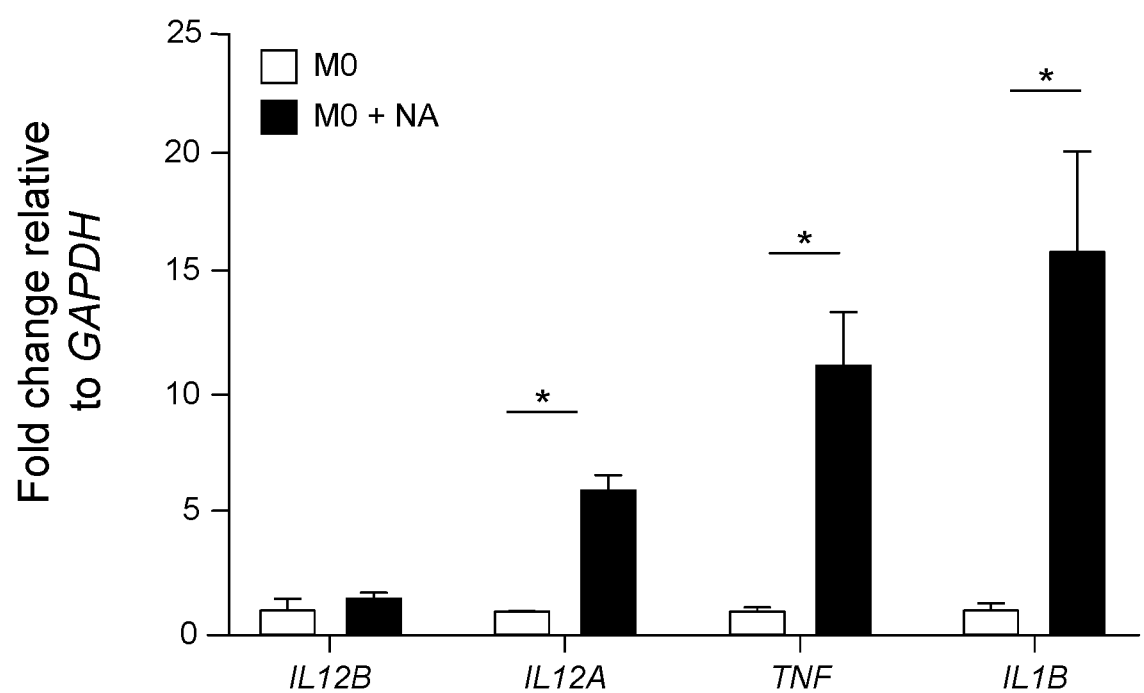
FIG. 23 is a bar graph showing gene expression level of M1 pro-inflammatory cytokines IL-12, TNF-α and IL-1B with naïve macrophages M0 which were either untreated or pre-treated with a HDAC6 inhibitor (NextA).

M0 macrophages treated with a selective HDAC6 inhibitor are like M1 macrophages with respect to their cytokine profile. FIG. 22 shows that the expression of M2 anti-inflammatory cytokines TGF beta and IL10 are decreased in M0 macrophages treated with a selective HDAC6 inhibitor. FIG. 23 shows that M1 pro-inflammatory cytokines such as IL12, TNF alpha and IL1 beta expression increases after treatment with NextA.

Example 5

Upregulation of Antigen Presentation and Processing Genes

Figure 24:
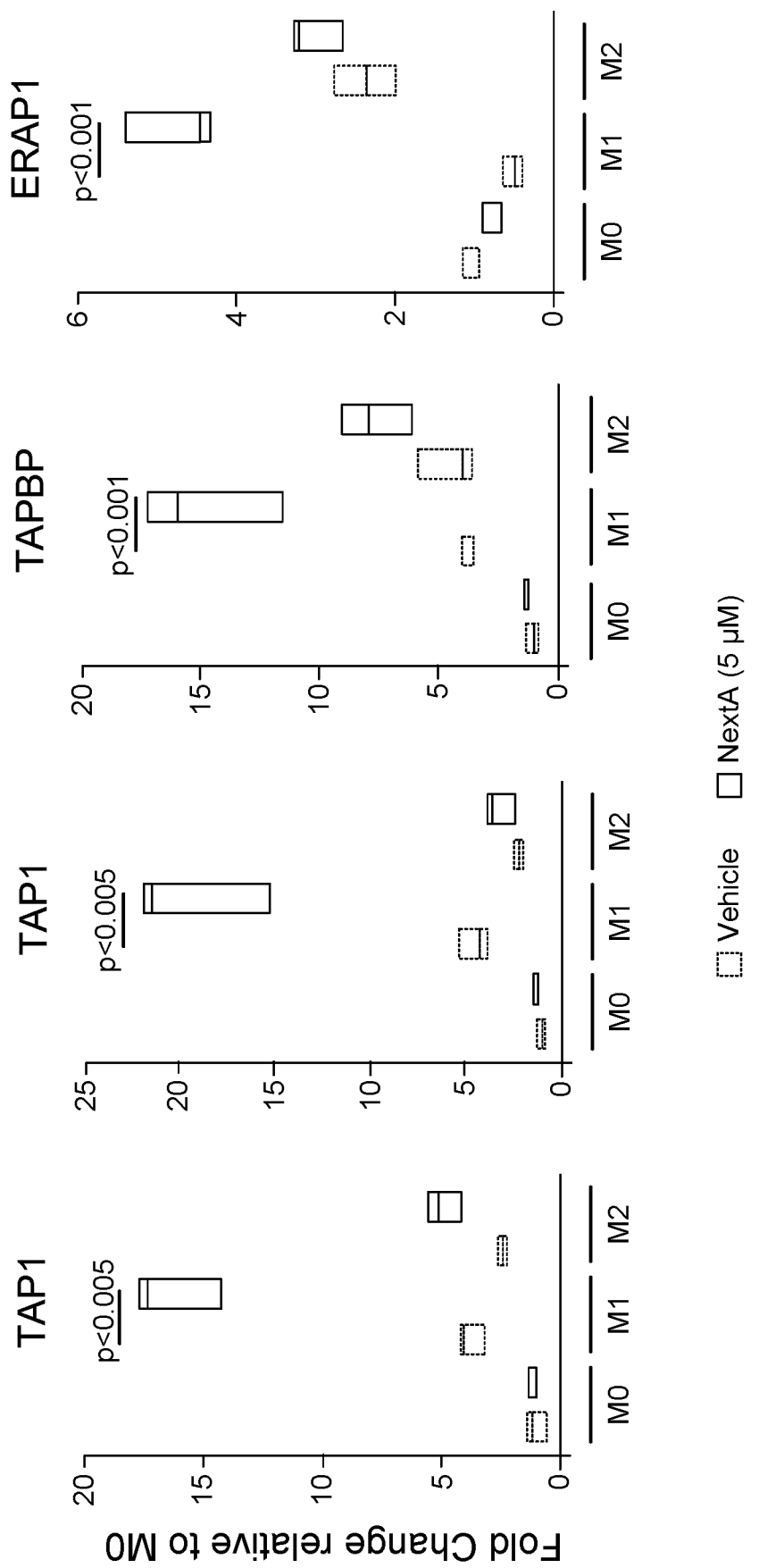
FIG. 24 is a panel of four graphs showing antigen presentation and processing genes TAP1, TAP2, TAPBP and ERAP1 with naïve macrophages M0, M1, M2 either untreated or pre-treated with NextA.

FIG. 24 shows that antigen presentation and processing genes such as TAP1, TAP2, TAPBP, and ERAP1 are increased in M1 macrophages compared to M0 after treatment with a NextA.

Example 6

HDAC6 Inhibition in Combination with Radiation

Figure 25:
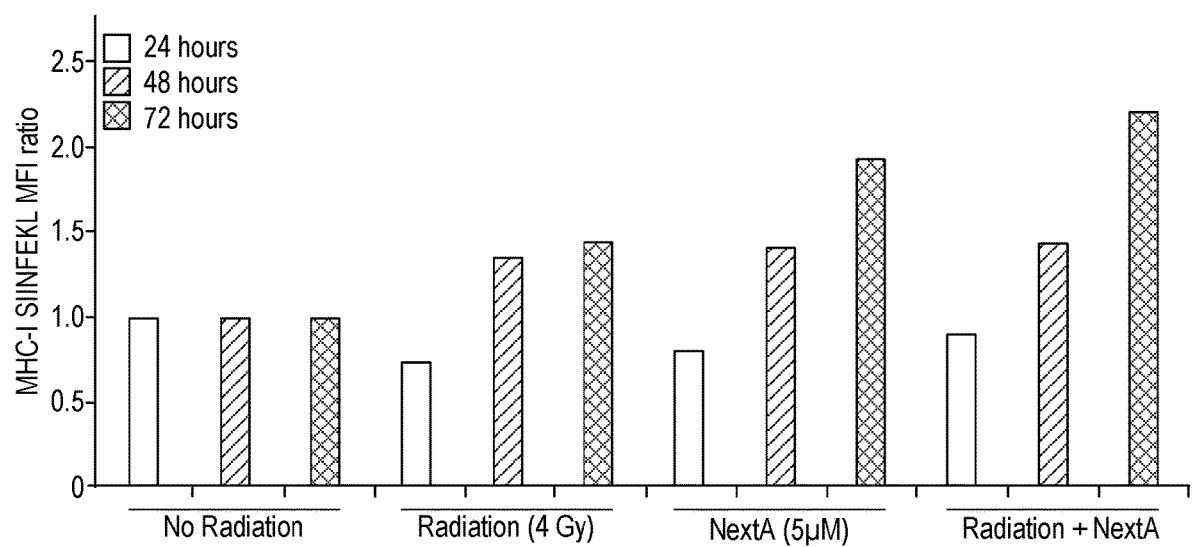
FIG. 25 is a panel of four bar graphs showing the MHCI-SIINFEKL levels when SM1 cells stably expressing OVA (SM1-OVA cells) peptide are exposed to 4 Gy of radiation, NextA, or a combination at the times indicated. MHC-I mediated SIINFEKL antigen presentation was measured by flow cytometry.
Figure 26:
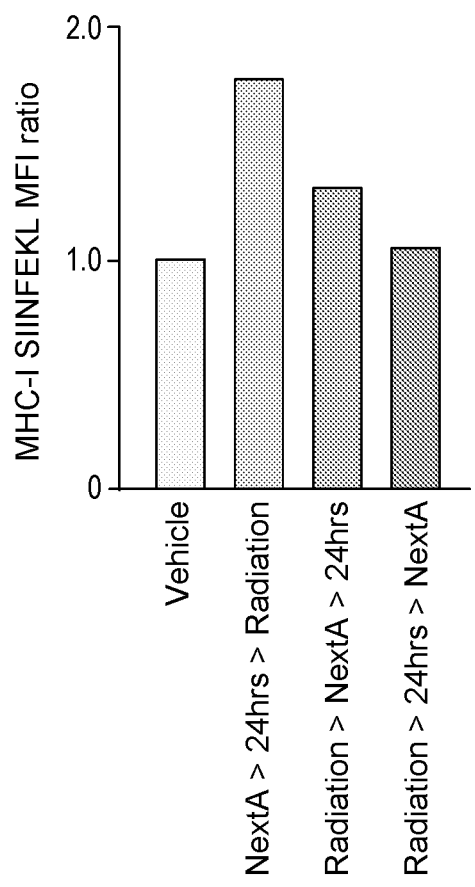
FIG. 26 is a bar graph showing MHCI-SIINFEKL levels when SM1 cells stably expressing OVA peptide (SM1-OVA cells) are exposed to Vehicle, a sequencing of a HDAC6 inhibitor (NextA) and radiation treatment. MHC-I mediated SIINFEKL antigen presentation was measured by flow cytometry.

The combination of radiation and HDAC6 inhibition increases antigen presentation in a time dependent manner. SM1 cells stably expressing Ova peptide when exposed to 4 Gy of radiation, NextA, or a combination of both show a time dependent increases in presentation of MHC-I mediated SIINFEKL antigen presentation measured by flow cytometry. Radiation with HDAC6 inhibition increases antigen presentation in tumor cells. FIG. 25. The sequencing of NextA and radiation treatment for effective antigen presentation in tumor cells is show in FIG. 26.

Example 7

Antigen Cross Presentation in Macrophages

Figure 27:
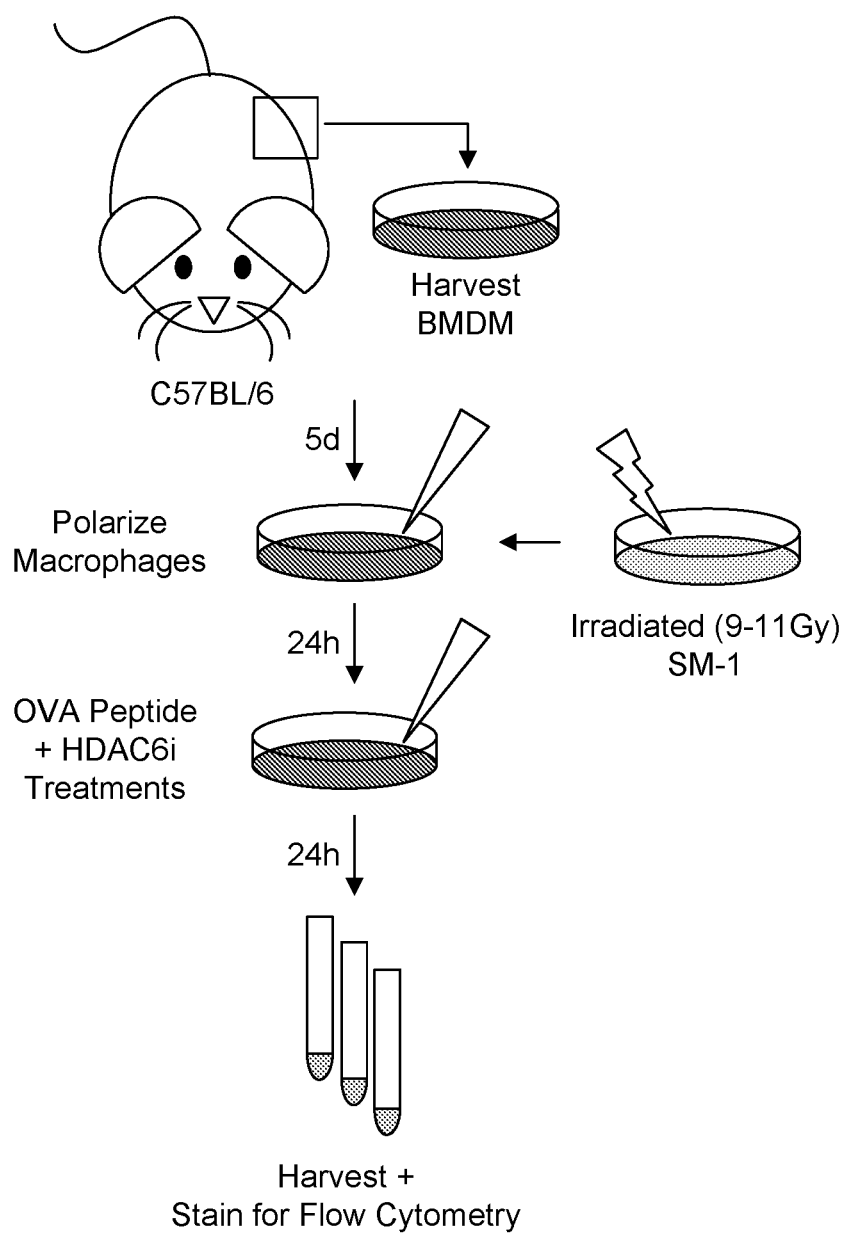
FIG. 27 is a schematic illustration showing the work flow for antigen cross presentation by macrophages.

A schematic showing the work flow for antigen cross presentation by macrophages where SM1-OVA cells are exposed to 9-11 Gy of radiation which releases OVA peptide into the medium HDAC6 inhibition increases antigen cross presentation in macrophages is shown in FIG. 27.

Figure 28:
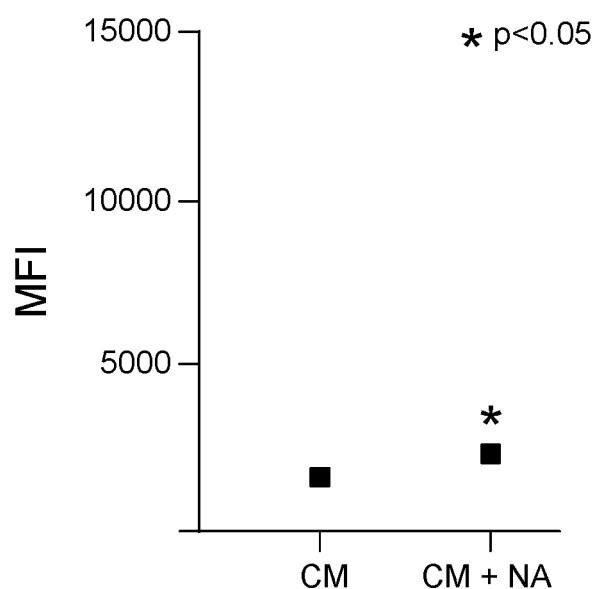
FIG. 28 is a graph showing the SIINFEKL antigen levels derived from OVA peptide and detected by MHCI-SIINFEKL specific antibody as measured by FACS when bone marrow derived M0 (naïve) macrophages were exposed to conditioned medium (CM) from radiation exposed SM1-OVA cells.
Figure 29:
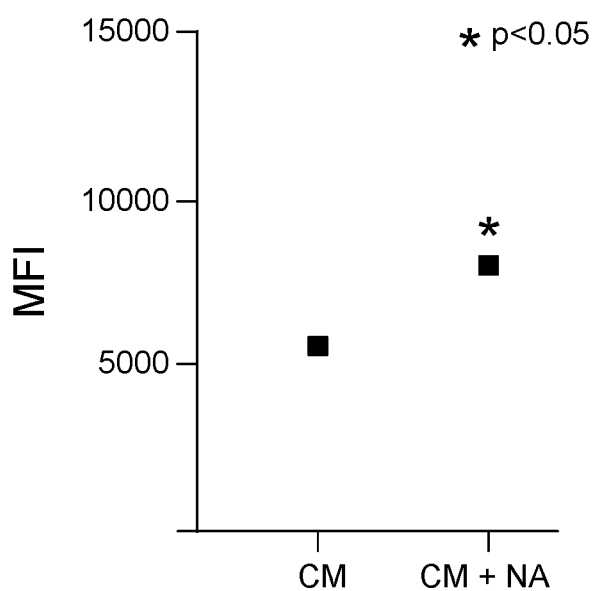
FIG. 29 is a graph showing the SIINFEKL antigen levels derived from OVA peptide and detected by MHCI-SIINFEKL specific antibody as measured by FACS when bone marrow derived M1 macrophages exposed to conditioned medium (CM) from radiation exposed SM1-OVA cells.
Figure 30:
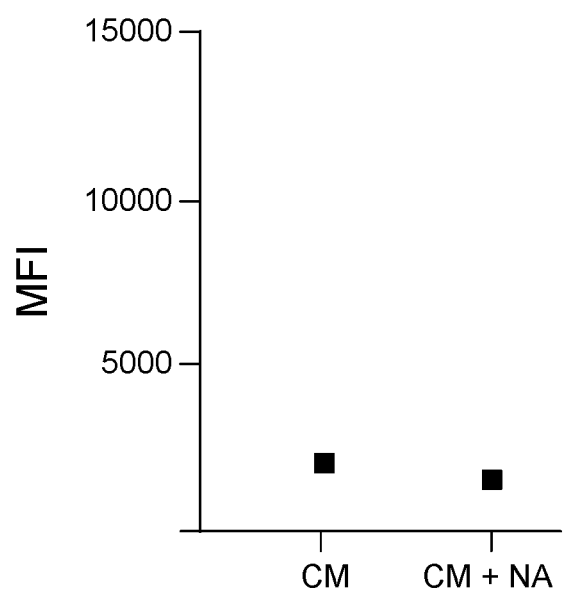
FIG. 30 is a graph showing the SIINFEKL antigen levels derived from OVA peptide and detected by MHCI-SIINFEKL specific antibody as measured by FACS when bone marrow derived M2 macrophages exposed to conditioned medium (CM) from radiation exposed SM1-OVA cells.

The cross presentation of M0, M1 and M2 BMDMs (bone marrow derived macrophages) exposed to conditioned medium from radiation exposed SM1-OVA cells and antigen presentation measured by APC-MHC-I SIINFEKL antibody by flow cytometry is shown in FIG. 28, FIG. 29, and FIG. 30. Treatment with a HDAC6 inhibitor increases antigen cross presentation in macrophages.

Example 8

Selective HDAC6 Inhibitors Induce Functional Changes in Macrophages

Figure 32:
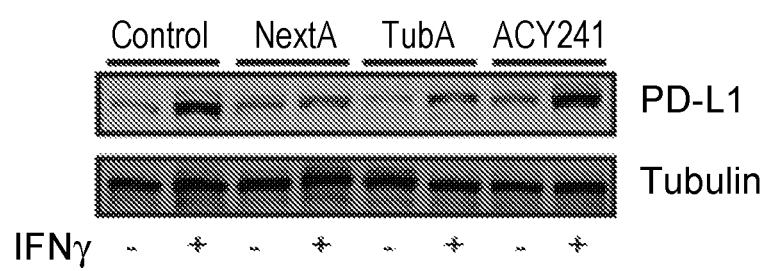
FIG. 32 is a Western blot of showing PD-L1 expression after treatment with HDAC inhibitors.
Figure 33:
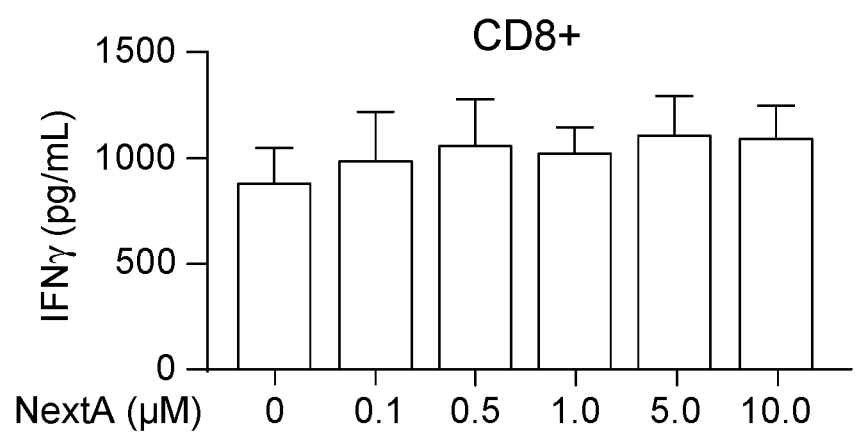
FIG. 33 is a bar graph showing IFN levels from CD8+ T-cells after treatment with NextA as measured by ELISA.
Figure 34:
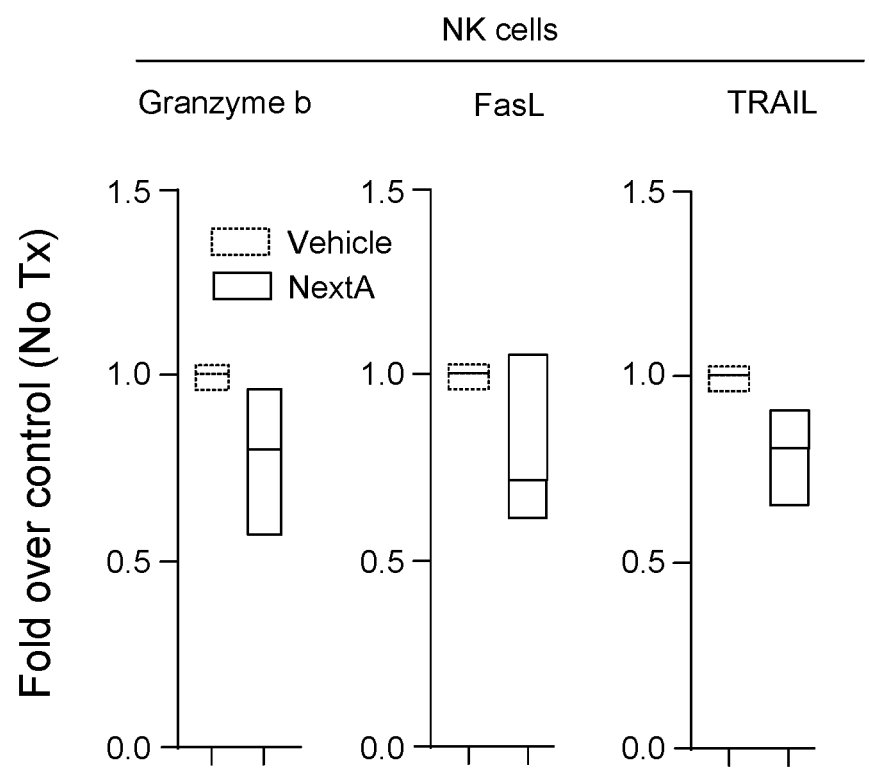
FIG. 34 is a panel of three bar graphs showing the expression of cell death inducing Granyme B, FasL and TRAIL from NK cells after treatment with Vehicle or NextA.

HDAC inhibitors with low selectivity toward HDAC6 do not induce as many immunological changes in tumor or immune cells as compared to HDAC inhibitors with high selectivity toward HDAC6. For example, ACY1215 and ACY241, with 12- and 13-fold HDAC6 selectivity, respectively (FIG. 31; see Bergman et al., *J Med Chem.* 55:9891-9899 (2012); Santo et al., *Blood* 119:2579-2589 (2012); Huang et al., *Oncotarget* 8:2694-2707 (2017); Jochems et al., *Neuropsychopharmacology* 39:389-400 (2014)), do not reduce the expression of PD-L1 (FIG. 32). The selective HDAC6 inhibitor NextA reduced the pro-tumoral M2 phenotype of macrophages, but the partially selective HDAC6 inhibitor, ACY241, did not reduce the M2 (data not shown). In contrast to the strong effect of HDAC6 inhibitors on macrophages, their role in dendritic cells, T cells, and natural killer cells seem to be minimal based on the lack of production of activation markers after in vitro treatment. FIG. 33 and FIG. 34.

Figure 35:
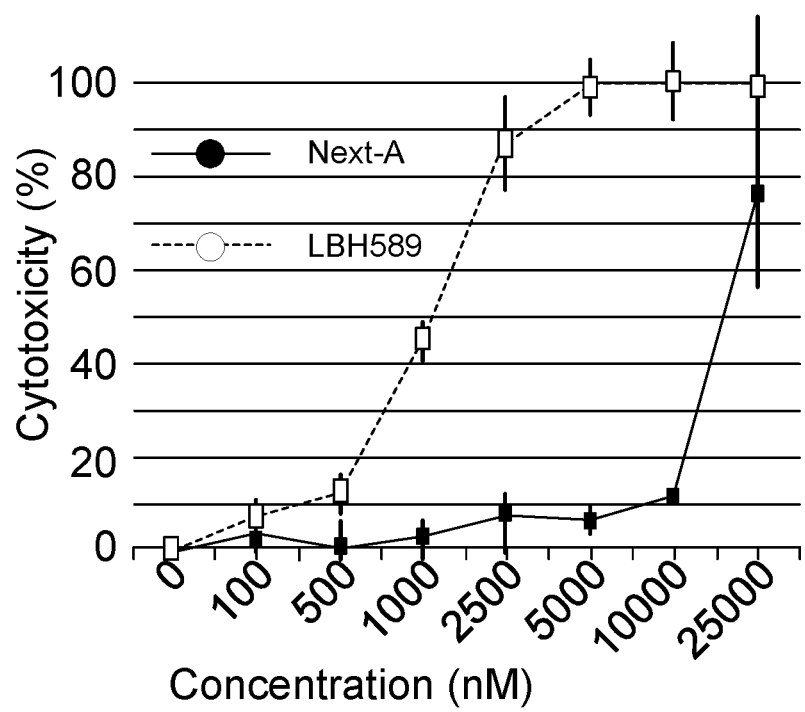
FIG. 35 is a line graph showing the cytotoxicity of HDAC inhibitors at the concentrations indicated.
Figure 36:
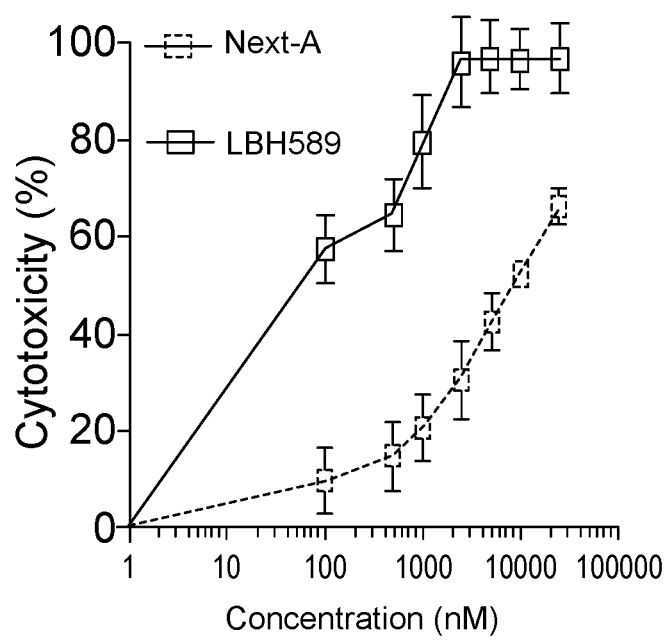
FIG. 36 is a line graph showing the cytotoxicity of HDAC inhibitors at the concentrations indicated.

Selective HDAC6 inhibitors have lower cellular cytotoxicity as compared to pan-HDAC inhibitors, e.g., LBH589, which could induce undesired toxicity in non-transformed cells. FIG. 35. Macrophages are particularly susceptible to HDAC inhibition. However, NextA induced high cytotoxicity over 5 μM. FIG. 36.

All of the features described herein (including any accompanying claims, abstract and drawings), and/or all of the steps of any method so disclosed, may be combined with any of the above aspects in any combination, except combinations where at least some of such features and/or steps are mutually exclusive.

It is to be understood that the foregoing aspects and exemplifications are not intended to be limiting in any respect to the scope of the disclosure, and that the claims presented herein are intended to encompass all aspects, embodiments, and exemplifications whether or not explicitly presented herein.

All patents, patent applications, and publications cited herein are fully incorporated by reference in their entirety

What is claimed is:

1. A method of treating a subject in need thereof, the method comprising administering to the subject a therapeutically effective amount of macrophages, or a composition thereof, activated with the HDAC6 inhibitor:

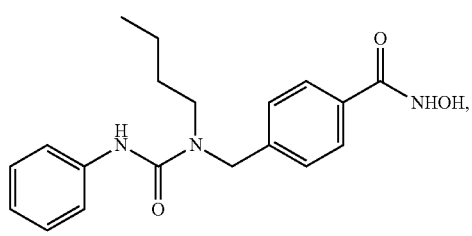

or a pharmaceutically acceptable salt thereof, wherein the subject has cancer, pulmonary fibrosis, liver fibrosis, or heart fibrosis.

2. The method of claim 1, wherein the subject has cancer.

3. The method of claim 2, further comprising administering to the subject one or more of radiation therapy, immune checkpoint blockade therapy, photothermal therapy, or chemotherapy.

4. The method of claim 1, wherein the subject has pulmonary fibrosis.

5. The method of claim 1, wherein the subject has liver fibrosis.

6. The method of claim 1, wherein the subject has heart fibrosis.

7. The method of claim 1, wherein the macrophages are produced from naive macrophages that have been isolated from the subject and treated ex vivo with:

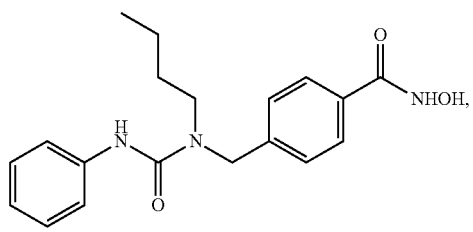

or a pharmaceutically acceptable salt thereof.

8. The method of claim 7, wherein the ex vivo treatment of the isolated naive macrophages further comprises treatment with one or more macrophage polarizing agents.

9. The method of claim 7, wherein the ex vivo treatment of the isolated naive macrophages further comprises treatment with one or more tumor antigens.

10. The method of claim 1, wherein the subject is human.

* * * * *

```
                       SEQUENCE LISTING

<160> NUMBER OF SEQ ID NOS: 1

<210> SEQ ID NO 1
<211> LENGTH: 8
<212> TYPE: PRT
<213> ORGANISM: Artificial Sequence
<220> FEATURE:
<223> OTHER INFORMATION: synthetic construct

<400> SEQUENCE: 1

Ser Ile Ile Asn Phe Glu Lys Leu
1               5
```